(12) United States Patent
Anisimovich et al.

(10) Patent No.: US 9,053,090 B2
(45) Date of Patent: Jun. 9, 2015

(54) TRANSLATING TEXTS BETWEEN LANGUAGES

(75) Inventors: Konstantin Anisimovich, Moscow (RU); Vladimir Selegey, Moscow (RU); Konstantin Zuev, Moscow (RU)

(73) Assignee: ABBYY InfoPoisk LLC (RU)

( * ) Notice: Subject to any disclaimer, the term of this patent is extended or adjusted under 35 U.S.C. 154(b) by 126 days.

(21) Appl. No.: 13/528,716

(22) Filed: Jun. 20, 2012

(65) Prior Publication Data
US 2012/0259621 A1    Oct. 11, 2012

Related U.S. Application Data

(63) Continuation-in-part of application No. 13/288,953, filed on Nov. 3, 2011, which is a continuation-in-part of application No. 11/548,214, filed on Oct. 10, 2006, now Pat. No. 8,078,450.

(51) Int. Cl.
*G06F 17/28* (2006.01)
*G06F 17/27* (2006.01)

(52) U.S. Cl.
CPC .......... *G06F 17/277* (2013.01); *G06F 17/2755* (2013.01); *G06F 17/2785* (2013.01); *G06F 17/2872* (2013.01); *G06F 17/271* (2013.01)

(58) Field of Classification Search
CPC ............................................ G06F 17/27–17/28
USPC ........................................................ 704/2-8
See application file for complete search history.

(56) References Cited

U.S. PATENT DOCUMENTS

| 5,268,839 | A | 12/1993 | Kaji |
| 5,301,109 | A | 4/1994 | Landauer et al. |
| 5,386,556 | A | 1/1995 | Hedin et al. |
| 5,418,717 | A | 5/1995 | Su et al. |

(Continued)

FOREIGN PATENT DOCUMENTS

| EP | 2400400 A1 | 12/2001 |
| WO | 2011160204 A1 | 12/2011 |

OTHER PUBLICATIONS

Mitamura, T., et al. "An Efficient Interlingua Translation System for Multi-lingual Document Production," Proceedings of Machine Translation Summitt III, Washington DC, Jul. 2-4, 1991.

(Continued)

*Primary Examiner* — Jesse Pullias
(74) *Attorney, Agent, or Firm* — LeighAnn Weiland; Veronica Weinstein

(57) ABSTRACT

Methods and computer systems for translating sentences between languages from an intermediate language-independent semantic representation are provided. Based on a comprehensive understanding about languages and semantics, exhaustive linguistic descriptions are used to analyze sentences, build syntactic structures and language independent semantic structures and representations, and synthesize one or more sentences in a natural or artificial language. A computer system is also provided to analyze and synthesize various linguistic structures and perform translation of a wide spectrum of various sentence types. As result, a generalized data structure, such as a semantic structure, is generated from a sentence of an input language and can be transformed into a natural sentence expressing its meaning correctly in an output language. The methods and systems can be applied to automated abstracting, machine translation, natural language processing, control systems, Internet information retrieval, etc.

20 Claims, 29 Drawing Sheets

(56) References Cited

U.S. PATENT DOCUMENTS

| | | | |
|---|---|---|---|
| 5,426,583 A | 6/1995 | Uribe-Echebarria Diaz De Mendibil | |
| 5,497,319 A * | 3/1996 | Chong et al. ............... | 704/2 |
| 5,677,835 A | 10/1997 | Carbonell et al. | |
| 5,678,051 A | 10/1997 | Aoyama | |
| 5,687,383 A | 11/1997 | Nakayama et al. | |
| 5,715,468 A | 2/1998 | Budzinski | |
| 5,752,051 A | 5/1998 | Cohen | |
| 5,768,603 A * | 6/1998 | Brown et al. ............... | 704/9 |
| 5,787,410 A | 7/1998 | McMahon | |
| 5,794,050 A | 8/1998 | Dahlgren et al. | |
| 5,826,219 A | 10/1998 | Kutsumi | |
| 5,884,247 A | 3/1999 | Christy | |
| 6,006,221 A | 12/1999 | Liddy et al. | |
| 6,055,528 A | 4/2000 | Evans | |
| 6,076,051 A | 6/2000 | Messerly et al. | |
| 6,081,774 A | 6/2000 | de Hita et al. | |
| 6,161,083 A * | 12/2000 | Franz et al. ............... | 704/4 |
| 6,182,028 B1 | 1/2001 | Karaali et al. | |
| 6,233,544 B1 | 5/2001 | Alshawi | |
| 6,233,546 B1 * | 5/2001 | Datig ............... | 704/7 |
| 6,243,670 B1 | 6/2001 | Bessho et al. | |
| 6,246,977 B1 | 6/2001 | Messerly et al. | |
| 6,275,789 B1 | 8/2001 | Moser et al. | |
| 6,356,864 B1 | 3/2002 | Foltz et al. | |
| 6,381,598 B1 | 4/2002 | Williamowski et al. | |
| 6,442,524 B1 | 8/2002 | Ecker et al. | |
| 6,463,404 B1 | 10/2002 | Appleby | |
| 6,601,026 B2 | 7/2003 | Appelt et al. | |
| 6,604,101 B1 | 8/2003 | Chan et al. | |
| 6,622,123 B1 | 9/2003 | Chanod et al. | |
| 6,658,627 B1 * | 12/2003 | Gallup et al. ............... | 715/236 |
| 6,778,949 B2 | 8/2004 | Duan et al. | |
| 6,871,199 B1 | 3/2005 | Binnig et al. | |
| 6,901,402 B1 | 5/2005 | Corston-Oliver et al. | |
| 6,928,448 B1 | 8/2005 | Franz et al. | |
| 6,937,974 B1 | 8/2005 | d'Agostini | |
| 6,947,923 B2 | 9/2005 | Cha et al. | |
| 6,965,857 B1 | 11/2005 | Decary | |
| 6,983,240 B2 | 1/2006 | Ait-Mokhtar et al. | |
| 7,146,358 B1 | 12/2006 | Gravano et al. | |
| 7,200,550 B2 | 4/2007 | Menezes et al. | |
| 7,263,488 B2 | 8/2007 | Chu et al. | |
| 7,475,015 B2 | 1/2009 | Epstein et al. | |
| 7,672,831 B2 | 3/2010 | Todhunter et al. | |
| 7,739,102 B2 | 6/2010 | Bender | |
| 8,078,450 B2 | 12/2011 | Anisimovich et al. | |
| 8,145,473 B2 | 3/2012 | Anisimovich et al. | |
| 8,214,199 B2 | 7/2012 | Anismovich et al. | |
| 8,229,730 B2 | 7/2012 | Van Den Berg et al. | |
| 8,229,944 B2 | 7/2012 | Latzina et al. | |
| 8,271,453 B1 | 9/2012 | Pasca et al. | |
| 8,285,728 B1 | 10/2012 | Rubin | |
| 8,301,633 B2 | 10/2012 | Cheslow | |
| 8,402,036 B2 | 3/2013 | Blair-Goldensohn et al. | |
| 8,577,907 B1 | 11/2013 | Singhal et al. | |
| 2001/0029442 A1 * | 10/2001 | Shiotsu et al. ............... | 704/4 |
| 2003/0176999 A1 | 9/2003 | Calcagno et al. | |
| 2004/0034520 A1 * | 2/2004 | Langkilde-Geary et al. ..... | 704/1 |
| 2005/0155017 A1 | 7/2005 | Berstis et al. | |
| 2005/0209844 A1 | 9/2005 | Wu et al. | |
| 2005/0240392 A1 | 10/2005 | Munro, Jr. et al. | |
| 2007/0083505 A1 | 4/2007 | Ferrari et al. | |
| 2008/0319947 A1 | 12/2008 | Latzina et al. | |
| 2009/0063472 A1 | 3/2009 | Pell et al. | |
| 2011/0055188 A1 | 3/2011 | Gras | |
| 2011/0072021 A1 | 3/2011 | Lu et al. | |
| 2011/0301941 A1 | 12/2011 | De Vocht | |
| 2012/0023104 A1 | 1/2012 | Johnson et al. | |
| 2012/0030226 A1 | 2/2012 | Holt et al. | |
| 2012/0131060 A1 | 5/2012 | Heidasch | |
| 2012/0197885 A1 | 8/2012 | Patterson | |
| 2012/0203777 A1 | 8/2012 | Laroco, Jr. et al. | |
| 2012/0221553 A1 | 8/2012 | Wittmer et al. | |
| 2012/0246153 A1 | 9/2012 | Pehle | |
| 2012/0296897 A1 | 11/2012 | Xin-Jing et al. | |
| 2013/0013291 A1 | 1/2013 | Bullock et al. | |
| 2013/0054589 A1 | 2/2013 | Cheslow | |
| 2013/0091113 A1 | 4/2013 | Gras | |
| 2013/0254209 A1 | 9/2013 | Kang et al. | |

OTHER PUBLICATIONS

Hutchins, Machine Translation: Past, Present, Future, Ellis Horwood, Chichester, UK, 1986.

Bolshakov, I.A. "Co-Ordinative Ellipsis in Russian Texts: Problems of Description and Restoration" Proceedings of the 12th conference on Computational linguistics—vol. 1, pp. 65-67. Association for Computational Linguistics 1988.

* cited by examiner

TRANSLATING TEXTS BETWEEN LANGUAGES

CROSS-REFERENCE TO RELATED APPLICATIONS

For purposes of the USPTO extra-statutory requirements, the present application constitutes a continuation-in-part of U.S. patent application Ser. No. 13/288,953 that was filed on 3 Nov. 2011. application Ser. No. 13/288,953 claims priority as a continuation-in-part of U.S. patent application Ser. No. 11/548,214 filed on 10 Oct. 2006. The '214 application is now U.S. Pat. No. 8,078,450. At least the above-referenced applications are Related Applications.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field

Embodiments of the invention generally relate to the field of automated translation of natural-language texts using linguistic descriptions and various applications in such areas as automated abstracting, machine translation, natural language processing, control systems, information search (including on the Internet), semantic Web, computer-aided learning, expert systems, speech recognition/synthesis and others.

2. Related Art

The ability to understand, speak and write one or more languages is an integral part of human development to interact and communicate within a society. Various language analysis/synthesis approaches have been used to dissect a given language, analyze its linguistic structure in order to understand the meanings of a word, a sentence in the given language, extract information from the word, the sentence, and, if necessary, translate into another language or synthesize into another sentence, which expresses the same semantic meaning in some natural or artificial language.

Prior machine translation (MT) systems differ in the approaches and methods that they use and also in their abilities to recognize various complex language constructs and produce quality translation of texts from one language into another. According to their core principles, these systems can be divided into the following groups.

One of the traditional approaches is based on translation rules or transformation rules and is called Rule-Based MT (RBMT). This approach, however, is rather limited when it comes to working with complex language phenomena. In the recent years no significant breakthroughs have been achieved within this field. The best known systems of this type are SYSTRAN (SYSTRAN S. A., Paris, France), PROMT (PROMT OOO, Sankt Petersburg, Russian Federation) and ETAP-3 (Institute For Information Transmission Problems, Moscow, Russian Federation). The known RBMT systems, however, usually possess restricted syntactic models and simplified dictionary descriptions where language ambiguities are artificially removed.

Rule-based concept has evolved into Model-Based MT (MBMT) which is based on linguistic models. Implementing a MBMT system to produce quality translation demands considerable effort to create linguistic models and corresponding descriptions for specific languages. Evolution of MBMT systems is connected with developing complex language models on all levels of language descriptions. The need in today's modern world requires translation between many different languages. Creating such MBMT systems is only possible within a large-scale project to integrate the results of engineering and linguistic research.

Another traditional approach is Knowledge-Based MT (KBMT) which uses semantic descriptions. While the MBMT approach is based on knowledge about a language, the KBMT approach considers translation as a process of understanding based on real knowledge about the World. Presently, interest in Knowledge-Based Machine Translation (KBMT) has been waning.

Example-Based MT (EBMT) relates to machine translation systems using automated analysis of "examples", which is very similar to Statistics-Based MT (SBMT). The best known systems of this type is Google-translator (Google, Inc., Mountain View, Calif., USA), as well as translation engines with language-specific rules-based elements, such as Microsoft Bing Translator (Microsoft, Inc., Redmond, Wash., USA) and Yahoo Babelfish (Yahoo! Inc., Sunnyvale, Calif., USA). In recent years, the SBMT approach has received a strong impetus from the following factors: appearance of Translation Memory (TM) systems and availability of powerful and relatively affordable bilingual electronic resources, such as TM databases created by corporations and translation agencies, electronic libraries, and specialized Internet corpora. The TM systems have demonstrated their practical efficiency when translating recurrent text fragments on the basis of minimal knowledge about languages such that researchers and developers are encouraged to try and create advanced and relatively exhaustive SBMT and HBMT (Hybrid Based MT) systems.

Most machine translation systems, both rule-based and statistics-based, concentrate on proper transfer of language information directly between a source sentence and an output sentence and usually do not require any full-fledged intermediary data structures to explicate the meaning of the sentence being translated. For example, a system based on linguistic models would know how to build thousands of syntactic variants of verb phrases-constituents. A system which is based on purely statistical approach would not know anything about the connections between these variants and would not be able to obtain a correct translation of one phrase on the basis of another. In addition, most-used probabilistic (statistic) approaches and statistics-based systems have a common drawback of taking no consideration of semantics. As a result, there is no guarantee that the translated (or generated) sentence has the same meaning as the original sentence.

Thus, even though some linguistic approaches have been proposed, most of them have not resulted in any useful algorithms or industrial applications because of poor performance in translating complete sentences. Complex sentences, which may express different shades of meaning, or the author's attitude and/or have different styles or genre, or which may be very long and contain various punctuation marks and other special symbols, have not been successfully generated/translated by prior art systems, language generation programs, or machine translation systems. It is especially difficult to translate or generate complex sentences, such as those found in technical texts, documentation, internet articles, journals, and the like and is yet to be done.

Accordingly, there are many ways to improve the methods and systems for translating natural language sentences between languages.

SUMMARY

The present invention generally relates to methods, computer-readable media, devices and systems for translating texts from an input natural language into an output language. In one embodiment, a method of translating a text from one source language into another output language includes analyzing each sentence of the text using information from linguistic descriptions of the source language, constructing a language-independent semantic structure to represent the meaning of the source sentence, and generating an output sentence from the language-independent semantic structure to represent the meaning of the source sentence in the output language using information from linguistic descriptions of the output language.

In another embodiment, a method of representing the meaning of sentences in a source language into an output language includes analyzing the meaning of the source sentences using information from linguistic descriptions of the source language, constructing a language-independent semantic structure to represent the meaning of the source sentences, and building a syntactic structure in the output language from the language-independent semantic structure using syntactic descriptions and morphological descriptions of the output language. An output sentence to represent the meaning of the source sentence is synthesized from the syntactic structure in the output language.

Other details and features will be apparent from the detailed description.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings. Throughout, like numerals refer to like parts with the first digit of each numeral generally referring to the figure which first illustrates the particular part. The appended drawings illustrate only typical embodiments of this invention and are therefore not to be considered limiting of its scope, for the invention may admit to other equally effective embodiments.

DETAILED DESCRIPTION

Figure 1:
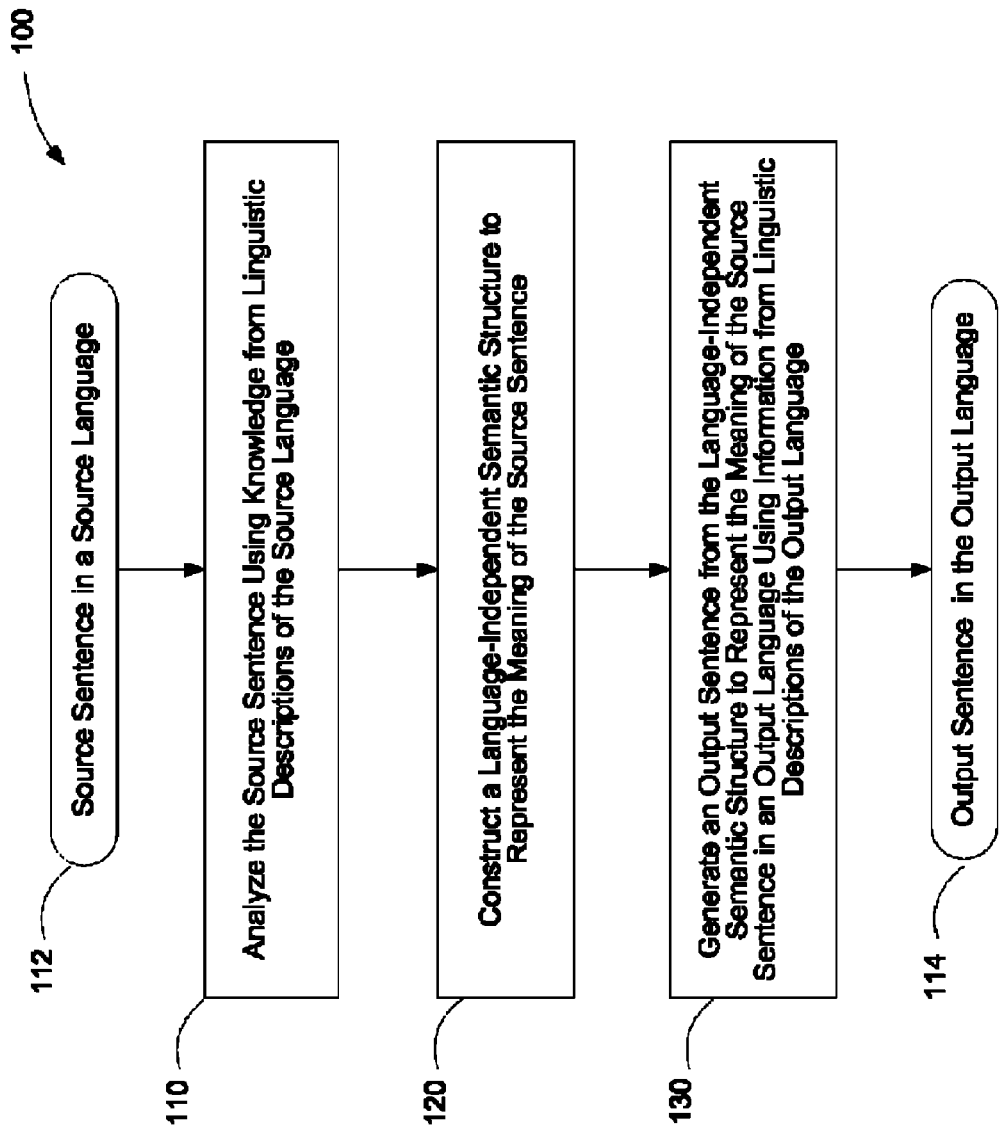
FIG. 1 illustrates one embodiment of a method for translating a source sentence in a source language into an output sentence in an output language.

In the following description, for purposes of explanation, numerous specific details are set forth in order to provide an understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the invention provide methods, computer-readable media, and computer systems configured to efficiently and completely translate texts in an input language into an output language with using language-independent, universal semantic concepts and structures. The surface syntactical structures and language-independent semantic structures as described herein are very useful for translating sentences between languages. Exhaustive linguistic descriptions are used to analyze a sentence and generate language-independent semantic structures for a source sentence. Problems of syntactical and semantic ambiguities which may appear during the process of transition and translation can be reliably handled.

The language-independent semantic structures are generated for the source sentences in an input language and are transformed into surface syntactic structures in an output language to generate an output sentence in the output language. The input and output languages can be any natural or artificial languages for which all necessary linguistic descriptions can be created.

In one embodiment, syntactical and semantic descriptions are joined into common semantic structures using linguistic descriptions to translate and generate the output sentence. These linguistic descriptions may include morphological descriptions, lexical descriptions, syntactic descriptions, which are language-specific, as well as semantic descriptions which are language-independent. Semantic descriptions are used to describe language-independent semantic features of various languages to express a meaning of any sentence in language-independent semantic terms.

In another embodiment, language-independent semantic structures are efficiently transitioned to surface syntactical structures between the input and output languages, which can be the same or different languages. All possible syntactic structures without any restrictions on the syntax of the source sentence and output sentence can be generated. Output sentences that can be generated in the output language include a wide spectrum of sentences from simple sentences to very complex ones. Linguistic knowledge is taken into consideration to make sure that all the information and meanings represented by a semantic structure of a source sentence are truly and faithfully expressed from the source sentence in an input language into an output sentence in an output language.

The syntactic structures generated for a source sentence and/or an output sentence are limited only by the syntax of an input language or output language without any other artificial language restrictions. Maximal use of linguistic knowledge and natural language descriptions is employed to generate a language-independent semantic structure which contains a large amount of various data information about the meaning of the source sentence. The natural language descriptions may be sufficiently comprehensive to cover all of language phenomena manifested in written discourse. In one aspect, the linguistic descriptions and computer systems disclosed herein may be employed to exhaustively and comprehensively generate the most probable, most suitable and syntactically correct surface structures through a language-independent semantic structure for sentences between input and output languages.

Embodiments of the invention include methods and computer readably storage media to execute the methods for constructing a linguistic knowledge based model of a natural language to create all required language descriptions; for generating a language-independent semantic structure and/or representation to express the meaning of the source sentences in an input language; for transforming the semantic structure into output sentences in an output language. Embodiments of the invention also provide computer readable media, language translation computer systems, instructions and means for carrying out methods of the invention. An environment for monitoring the sentence analysis and generation process is also provided. Embodiments of the invention may be provided to be implemented in various forms, formats, and also adapted to be stored on a computer-readable medium, executed as a computer program, or as part of a device for generating a sentence of a given language from a language-independent semantic structure.

FIG. 1 illustrates a flow chart of a method 100 for translating a source sentence 112 in a source language into an output sentence 114 in an output language. At step 110, the source sentence is analyzed using information from linguistic descriptions of the source language. The linguistic descriptions useful for analyzing the source sentence may include morphological descriptions, syntactic descriptions, lexical descriptions, and semantic descriptions of various languages. In some cases, all available linguistic models and knowledge about natural languages may arranged in database and applied as for analyzing a source sentence as for synthesizing an output sentence when all available exhaustive linguistic descriptions are used. Integral models for describing the syntax and semantics of the source language are used in order to recognize the meanings of the source sentence, analyze and translate complex language structures, and correctly convey information encoded in the source sentence.

The invention is superior to the known art as it uses various linguistic descriptions of a given natural language to reflect all the real complexities of the natural language, rather than simplified or artificial descriptions, without the danger of a combinatorial explosion. A principle of integral and purpose-driven recognition, i.e., hypotheses about the structure of the part of a sentence are verified within the hypotheses about the structure of the whole sentence, is implemented as during the analysis stage as during the synthesis stage. It allows one to avoid analyzing numerous parsing of anomalous variants. All available information from linguistic descriptions of the output language is used.

At step 120, after the source sentence is analyzed, a language-independent semantic structure is constructed to represent the meaning of the source sentence. The language-independent semantic structure is a generalized data structure in language-independent form/format as an intermediate language-independent semantic representation when translating the source sentence from the source language into the output language. Such a novel language-independent semantic structure generated for each source sentence to be analyzed can be used to accurately describe the meaning of the source sentence and can be easily applied to various applications, including, but not limited to automated abstracting, machine translation, control systems, internet information retrieval, etc. As a result, the maximum accuracy in conveying the meanings of the source sentence during translation from one language into the same or another language is achieved.

At step 130, after the language-independent semantic structure is constructed, the output sentence is generated from the language-independent semantic structure in order to represent the meaning of the source sentence in the output language. Accordingly, a high level of accuracy in translating an input natural-language sentence into the same or another natural-language is achieved.

Figure 2:
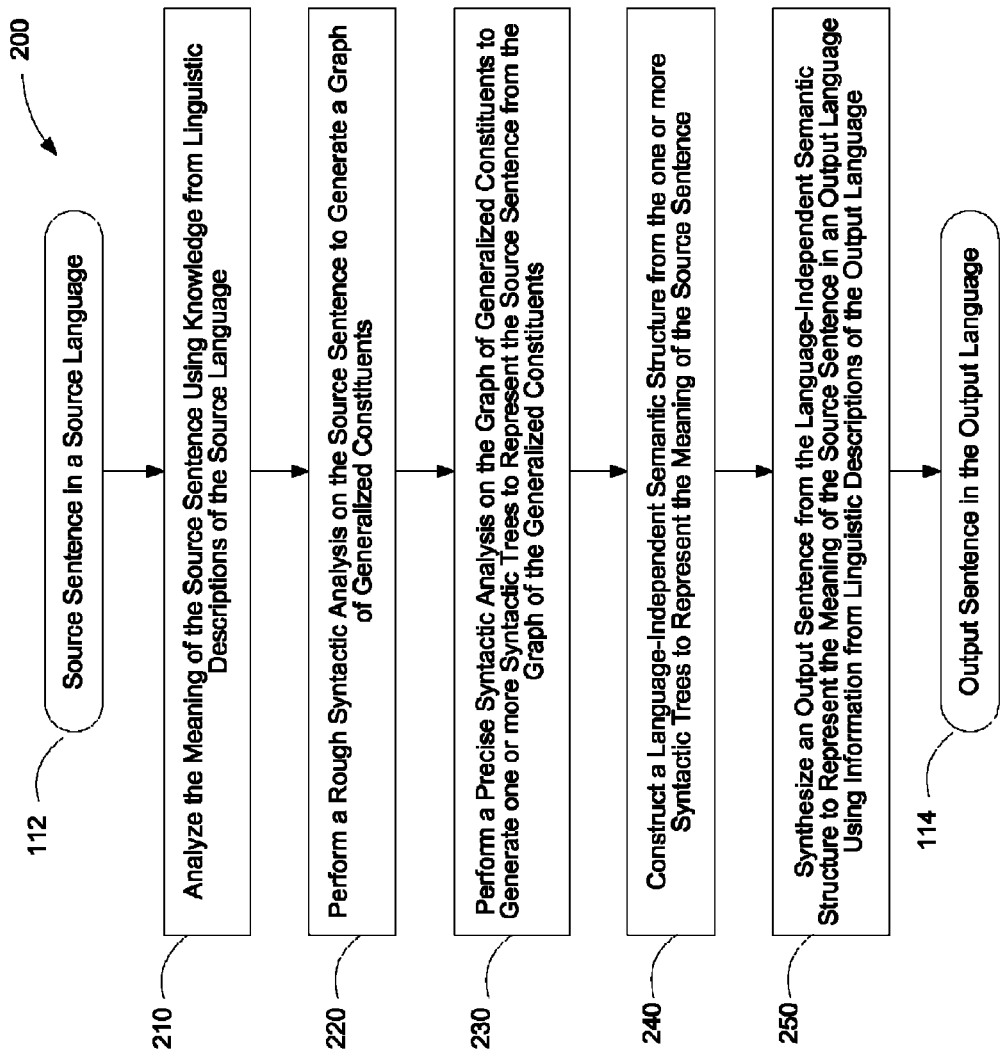
FIG. 2 illustrates another embodiment of a method for translating a source sentence in a source language into an output sentence in an output language.

FIG. 2 illustrates another example of a method 200 for translating the source sentence 112 in a source language into the output sentence 114 in an output language. At step 210, the source sentence is analyzed using information from linguistic descriptions of the source language.

When analyzing the meaning of the source sentence, a two-step analysis algorithm (e.g., rough syntactic analysis and precise syntactic analysis) is implemented to make use of linguistic models and knowledge at various levels to calculate probability ratings and to generate the most probable syntactic structure, e.g., a best syntactic structure. Accordingly, at step 220, a rough syntactic analysis is performed on the source sentence to generate a graph of generalized constituents for further syntactic analysis.

At step 230, a precise syntactic analysis is performed on the graph of generalized constituents to generate one or more syntactic trees to represent the source sentence from the graph of the generalized constituents. This novel two-step syntactic analysis approach ensures the meaning of the source sentence to be accurately represented into a best syntactic structure which is chosen from the one or more syntactic trees. In addition, hypotheses for a portion of a sentence for analyzing its meaning and generating an appropriate language structure using available linguistic descriptions are verified within the hypotheses about the language structure for the whole sentence. This approach avoids analyzing numerous parsing variants, which are known to be invalid, such that one or more syntactic trees are rated, each syntactic tree representing the whole sentence, in order to select the best syntactic structure.

At step 240, after the source sentence is analyzed, a language-independent semantic structure is constructed to represent the meaning of the source sentence. At step 250, after the language-independent semantic structure is constructed, the output sentence is generated from the language-independent semantic structure using information from linguistic descriptions of the output language in order to represent the meaning of the source sentence in the output language.

Figure 3:
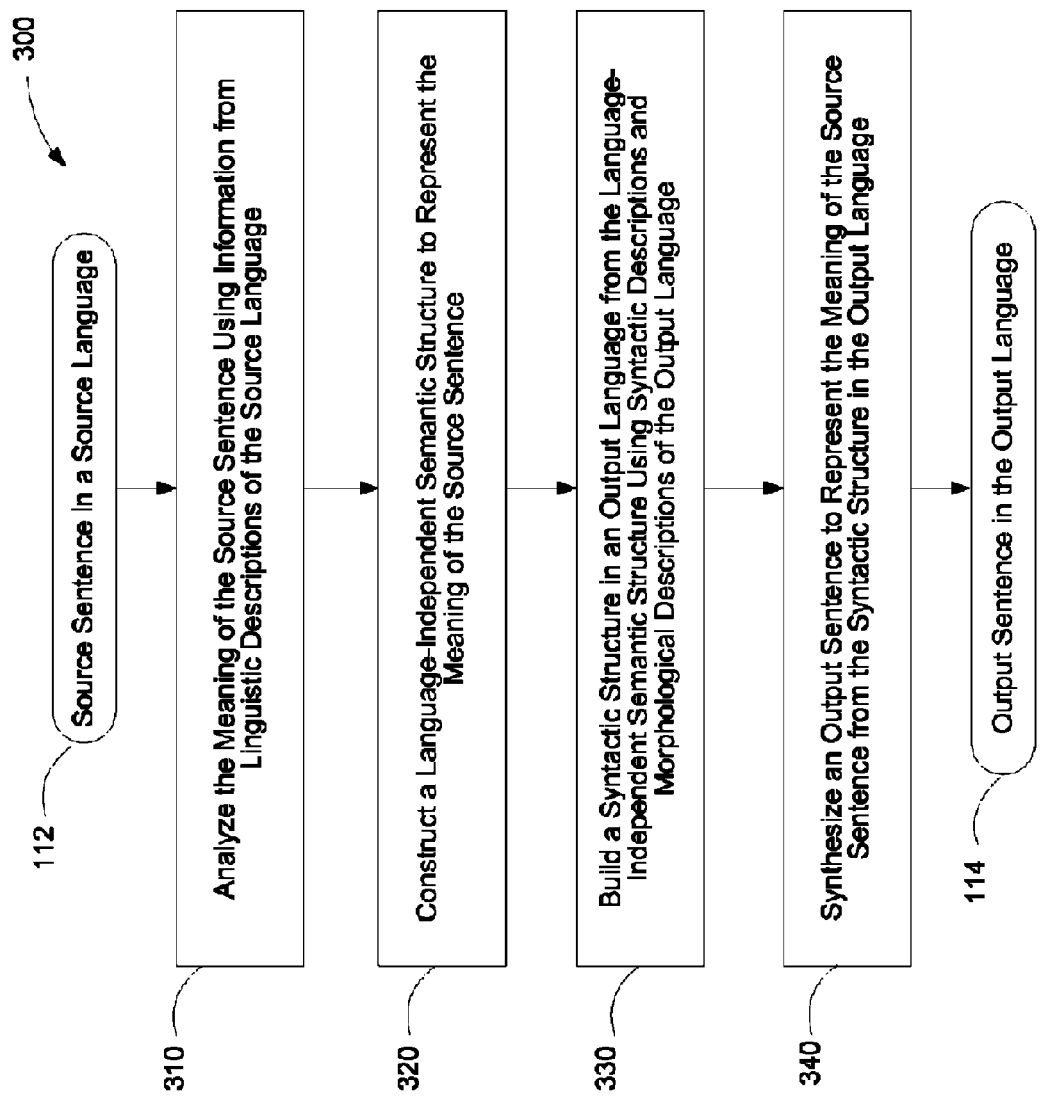
FIG. 3 illustrates still another embodiment of a method for translating a source sentence in a source language into an output sentence in an output language.

FIG. 3 illustrates another example of a method 300 for translating the source sentence 112 in a source language into the output sentence 114 in an output language. At step 310, the source sentence is analyzed using information from linguistic descriptions of the source language and after the source sentence is analyzed, at step 320, a language-independent semantic structure is constructed to represent the meaning of the source sentence.

At step 330, a syntactic structure in an output language is built from the language-independent semantic structure using syntactic descriptions and lexical descriptions of the output language. At step 340, the output sentence is generated from the syntactic structure in the output language.

Figure 4:
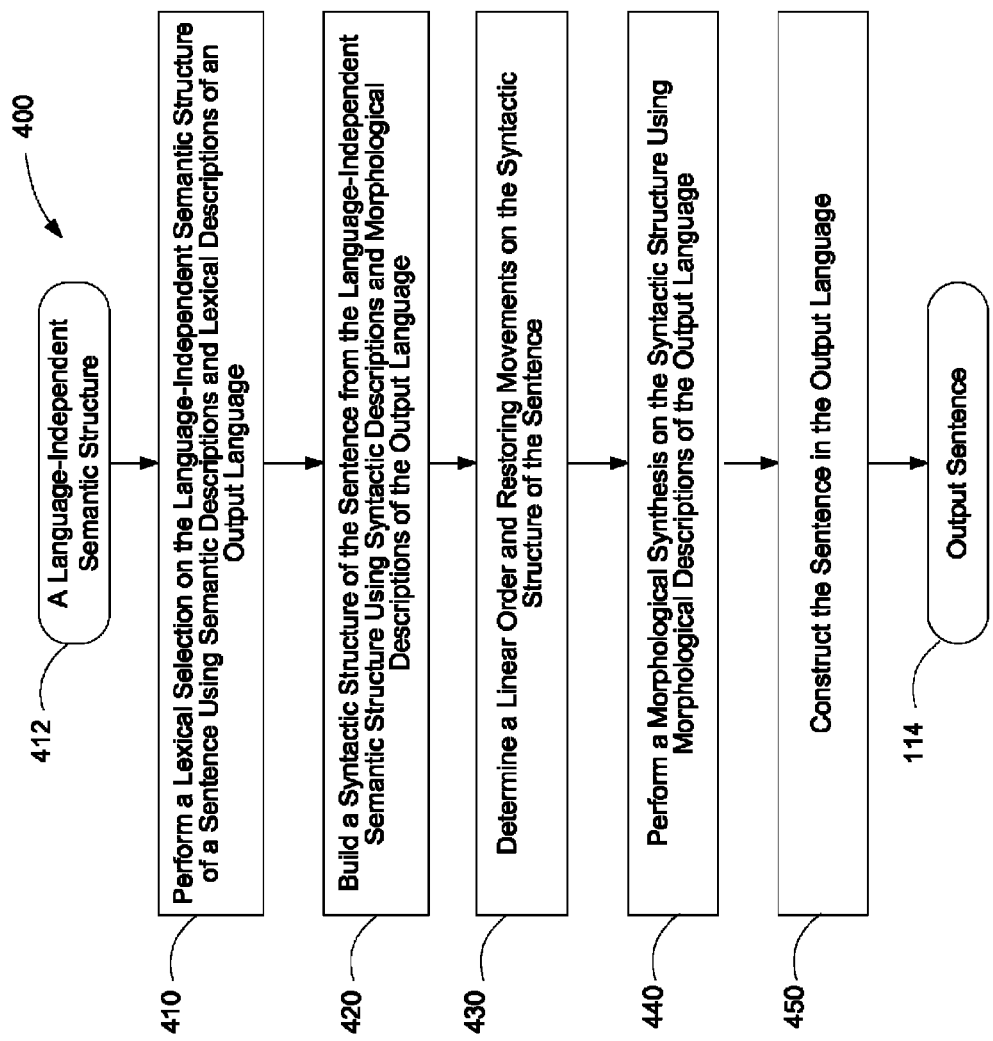
FIG. 4 illustrates still another embodiment of a method for transforming a language-independent semantic structure into the output sentence 114 in an output language.

FIG. 4 illustrates another example of a method 400 for transforming a language-independent semantic structure 412 into the output sentence 114 in an output language. At step 410, a lexical selection is performed on the language-independent semantic structure of a sentence using semantic descriptions and lexical descriptions of the output language. At step 420, a syntactic structure of the sentence is built from the language-independent semantic structure using syntactic descriptions and lexical descriptions of the output language.

At step 430, a linear order on the syntactic structure of the sentence is determined and restoring movements is executed. At step 440, a morphological synthesis is performed on the syntactic structure using morphological descriptions of the output language before the output sentence 114 is constructed in the output language at step 450.

Figure 5A:
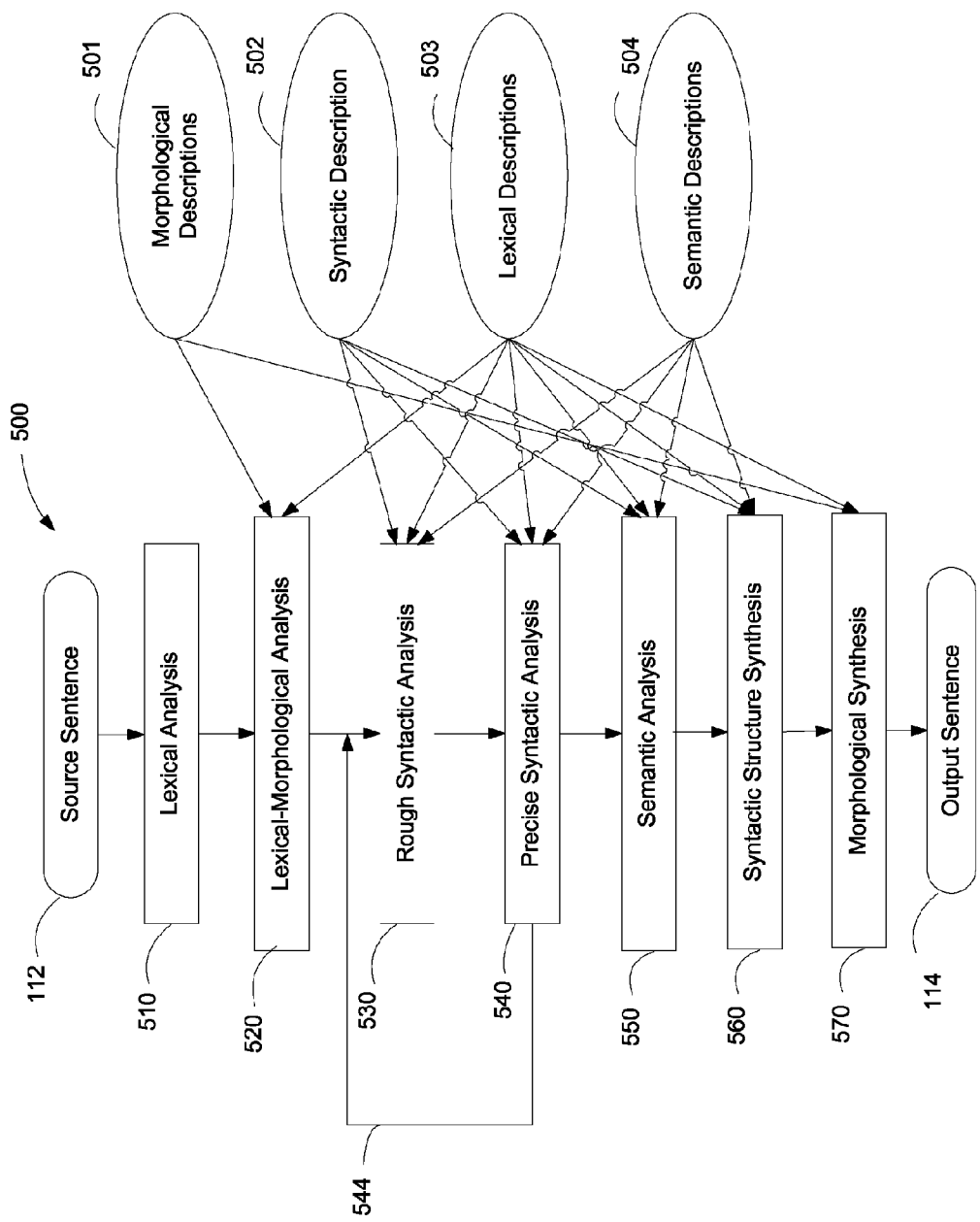
FIG. 5A illustrates a flow diagram of a method according to one embodiment of the invention.
Figure 5B:
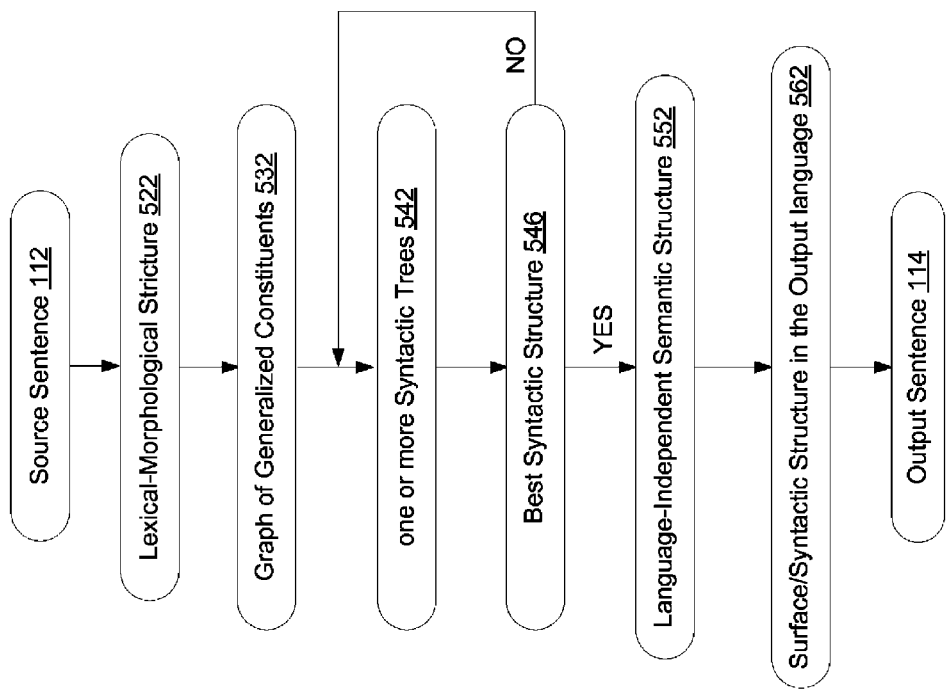
FIG. 5B illustrates converting of the source sentence 112 into the output sentence 114 through various structures according to an exemplary embodiment of the invention.

FIG. 5A illustrates a method 500 for translating the source sentence 112 from a source language into the output sentence 114 in an output language via a language-independent semantic structure according to an exemplary embodiment of the invention. FIG. 5B illustrates transforming of the source sentence 112 into the output sentence 114 through various structures according to an exemplary embodiment of the invention.

As shown in FIGS. 5A and 5B, the method 500 for translating a source sentence 112 in a source/input language into an output sentence 114 includes using linguistic descriptions adapted to perform various steps of analysis and synthesis. The linguistic descriptions may include morphological descriptions 501, syntactic descriptions 502, lexical descriptions 503, and semantic descriptions 504.

At step 510, a lexical analysis is performed on the source sentence 112 in a source/input language. At step 520, a lexical-morphological analysis is also performed on the source sentence 112 to generate a lexical-morphological structure 522 of the source sentence 112 using information from the morphological descriptions 501 and the lexical descriptions 501 of the source language.

Then, a syntactic analysis is performed on the lexical-morphological structure 522 of the source sentence 112. In one embodiment of the invention, the syntactic analysis includes a rough syntactic analysis and a precise syntactic analysis.

At step 530, the rough syntactic analysis is performed on the lexical-morphological structure 522 of the source sentence 112 to generate a graph of generalized constituents 532. Performing the rough syntactic analysis may require the use of the syntactical descriptions 502, the lexical descriptions 503 of the source language, and the semantic descriptions 504.

At step 540, the precise analysis is performed on the graph of generalized constituents 532. The precise analysis may include, but not limited to, generating one or more syntactic trees, obtaining rating scores for the one or more syntactic trees, generating non-tree links, and building a best syntactic structure 546. Performing the precise syntactic analysis may require the use of the syntactical descriptions 502, the lexical descriptions 503, and the semantic descriptions 504. Step 544 indicates that the syntactic analysis is performed repeatedly if the best syntactic structure 546 is not successfully built.

At step 550, a semantic analysis is performed to transition the best syntactic structure 546 of the source sentence in the natural language into a language-independent semantic structure 552. The language-independent semantic structure 552 is generated to fully convey the meaning of the source sentence in the source natural language and represent the source sentence in a language-independent form.

At step 560, syntactic structure synthesis is performed on the language-independent semantic structure 552 to build a surface/syntactic structure 562. The syntactic structure synthesis may include, but not limited to, performing a lexical selection on the language-independent semantic structure 552 using the linguistic descriptions of the output language. The syntactic structure synthesis may require the use of the syntactical descriptions 502, the lexical descriptions 503, and the semantic descriptions 504 of the output language.

At step 570, morphological synthesis is performed on the surface/syntactic structure 562 to generate the output sentence 114. The morphological synthesis may require the use of the morphological descriptions 501 and the lexical descriptions 503 of the output language.

Figure 6:
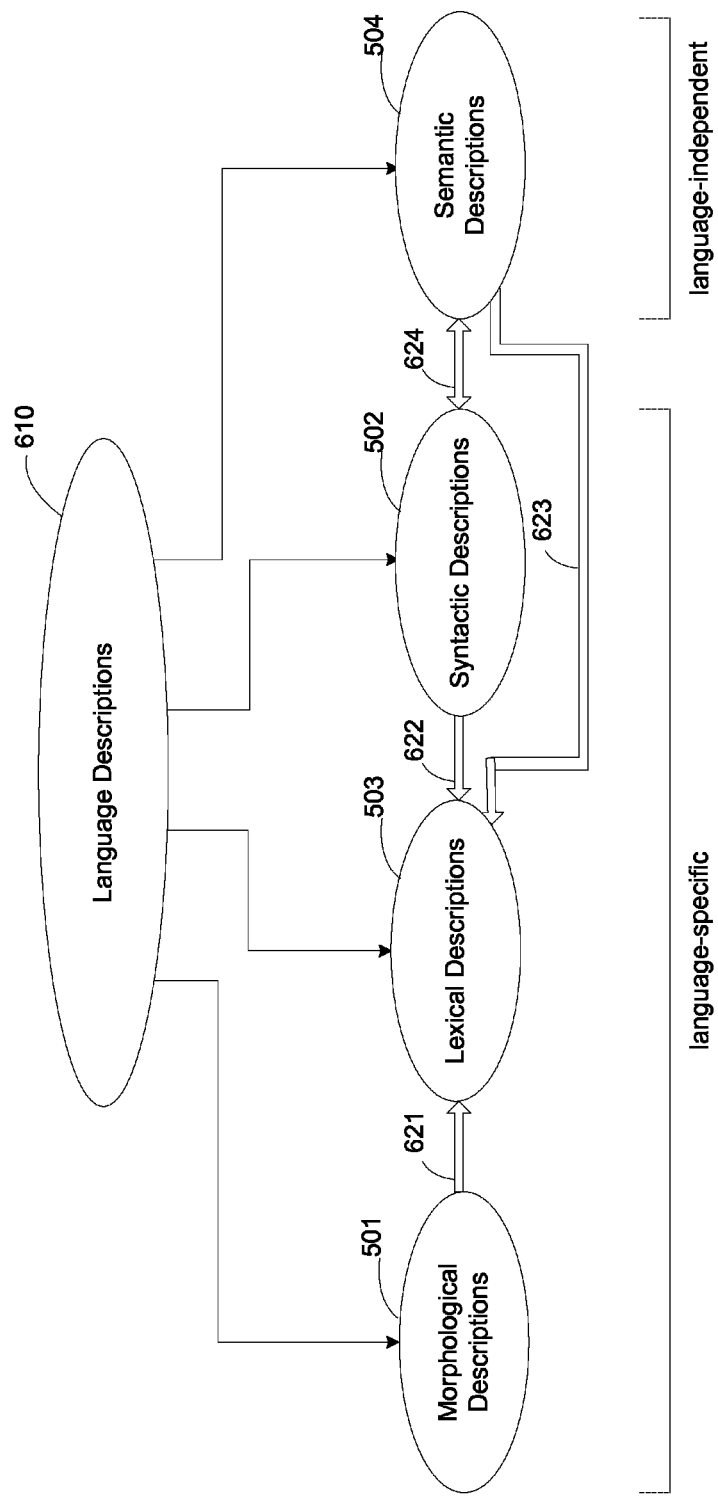
FIG. 6 is a diagram illustrating language descriptions according to one exemplary embodiment of the invention.

FIG. 6 illustrates language descriptions 610 including morphological descriptions 501, lexical descriptions 503, syntactic descriptions 502, and semantic descriptions 504, and interrelationship between them. Among them, the morphological descriptions 501, the lexical descriptions 503, and the syntactic descriptions 502 are language-specific. Each of these language descriptions 610 can be created for each source language and, taken together, they represent a model of the source language. The semantic descriptions 504, however, are language-independent and are used to describe language-independent semantic features of objects, meanings, processes, events, etc., in various languages and to construct language-independent semantic structures.

As shown in FIG. 6, the morphological descriptions 501, the lexical descriptions 503, the syntactic descriptions 502, and the semantic descriptions 104 are related. More specifically, lexical descriptions 504 and morphological descriptions 501 are related by a link 621, because a specified lexical meaning in the lexical description 503 may have a morphological model represented as one or more grammatical values for the specified lexical meaning. For example, one or more grammatical values can be represented by different sets of grammemes in a grammatical system of the morphological descriptions 501.

In addition, as shown by a link 622, a lexical meaning in the lexical descriptions 503 may also have one or more surface models corresponding to the syntactic descriptions 502 for the given lexical meaning. As represented by a link 623, the lexical descriptions 503 can be connected with the semantic descriptions 504. Therefore, the lexical descriptions 503 and the semantic descriptions 504 may be combined into "lexical-semantic descriptions", such as a lexical-semantic dictionary 1004.

As shown by a link 624, the syntactic descriptions 502 and the semantic descriptions 504 are also related. For examples, diatheses of the syntactic descriptions 502 can be considered as the "interface" between the language-specific surface models and language-independent deep models of the semantic description 504. Examples of diatheses and deep models are further described in conjunction with FIGS. 8 and 9.

Figure 7:
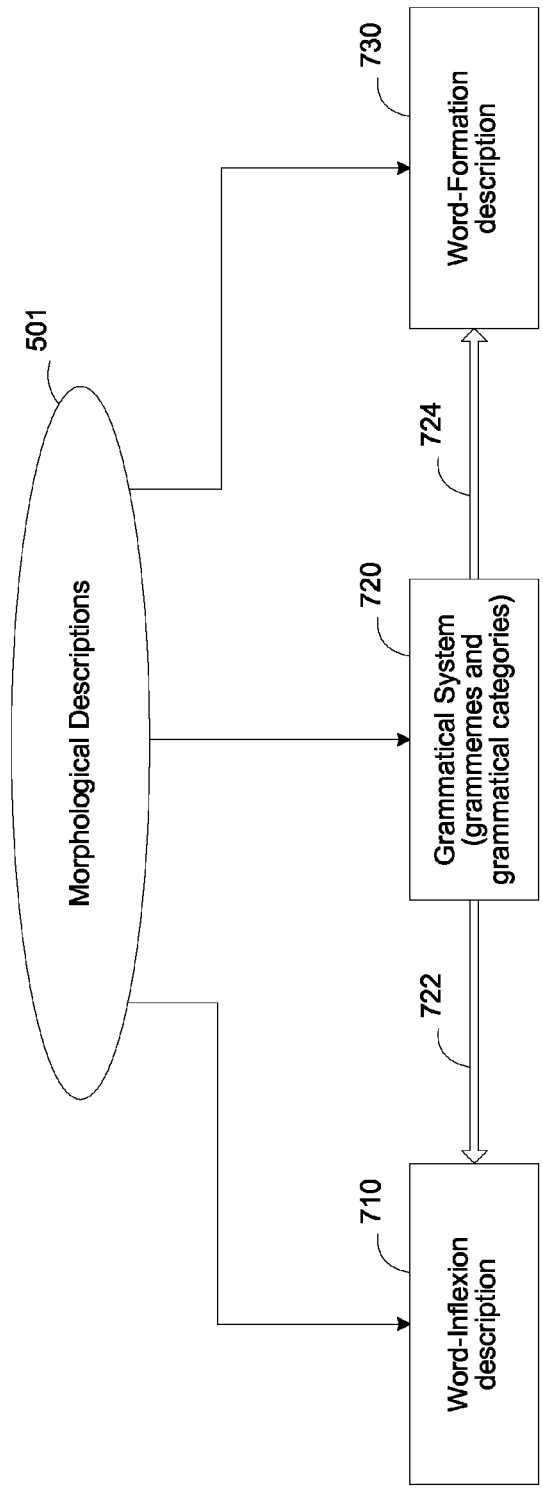
FIG. 7 is a diagram illustrating morphological descriptions according to one exemplary embodiment of the invention.

FIG. 7 illustrates exemplary morphological descriptions. As shown, the components of the morphological descriptions 501 include, but are not limited to, word-inflexion description 710, grammatical system 720 (e.g., grammemes), and word-formation description 730. In one embodiment, grammatical system 720 includes a set of grammatical categories, such as, "Part of speech", "Case", "Gender", "Number", "Person", "Reflexivity", "Tense", "Aspect", etc. and their meanings, hereafter referred to as "grammemes". For example, part of speech grammemes may include "Adjective", "Noun", "Verb", etc.; case grammemes may include "Nominative", "Accusative", "Genitive", etc.; and gender grammemes may include "Feminine", "Masculine", "Neuter", etc.

Word-inflexion description 710 describes how the main form of a word form may change according to its case, gender, number, tense, etc. and broadly includes all possible forms for a given word. Word-formation 730 describes which new words may be generated involving a given word. The grammemes are units of the grammatical systems 720 and, as shown by a link 722 and a link 724, the grammemes can be used to build the word-inflexion description 710 and the word-formation description 730.

According to one aspect of the invention, when establishing syntactic relationships for elements of a source sentence, one or more constituent models are used. A constituent may include a contiguous group of words from the source sentence and behaves as one entity. Each constituent may include a core word and can include child constituents at lower levels. A child constituent is a dependent constituent and may be attached to other constituents (as parent constituents) for building the syntactic structure of a source sentence.

Figure 8:
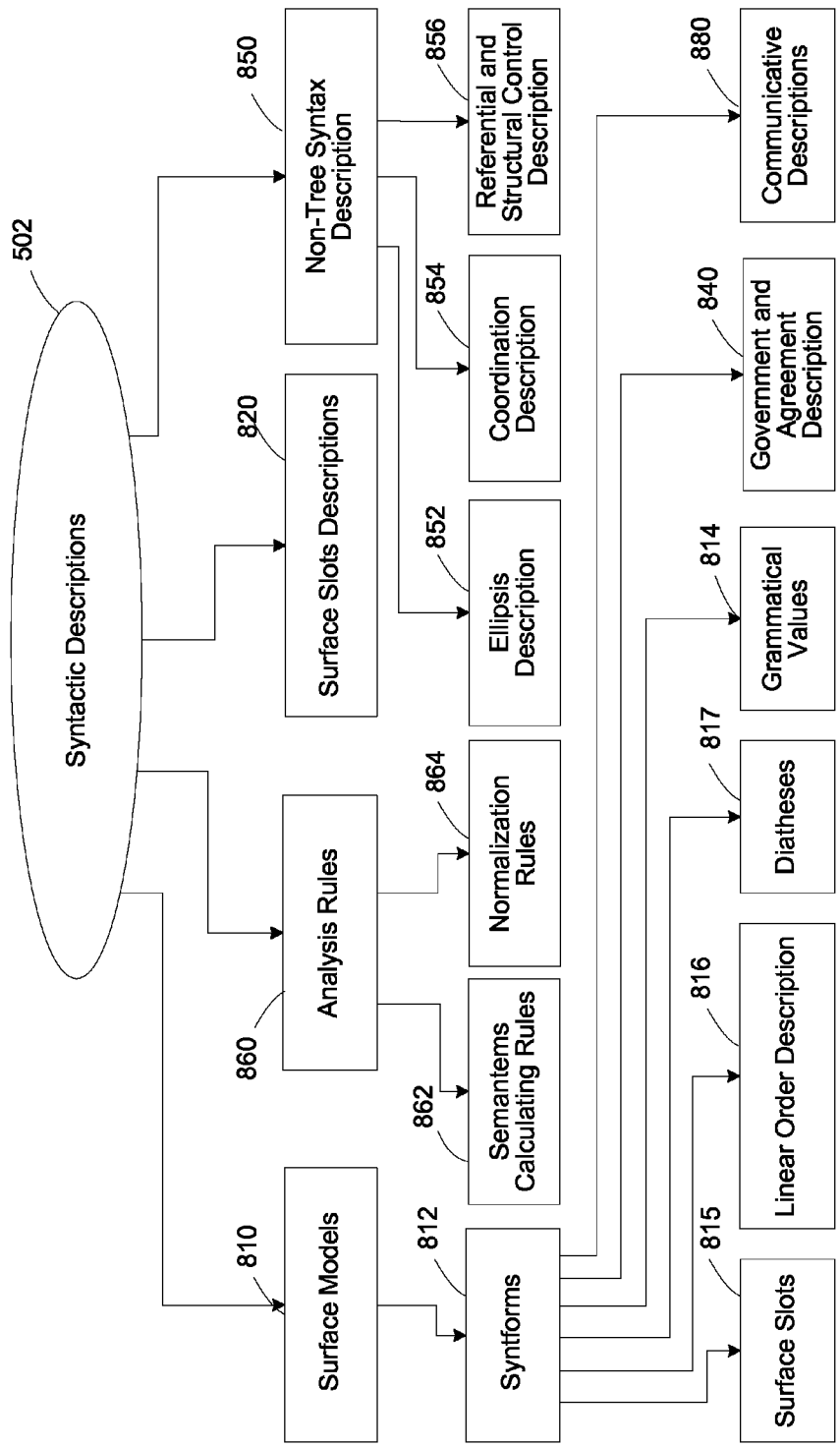
FIG. 8 is a diagram illustrating syntactic descriptions according to one exemplary embodiment of the invention.

FIG. 8 illustrates exemplary syntactic descriptions. The components of the syntactic descriptions 502 may include, but are not limited to, surface models 810, surface slot descriptions 820, referential and structural control description 830, government and agreement description 840, non-tree syntax description 850, and analysis rules 860. The syntactic descriptions 502 are used to construct possible syntactic structures of a source sentence from a given source language, taking into account free linear word order, non-tree syntactic phenomena (e.g., coordination, ellipsis, etc.), referential relationships, and other considerations.

The surface models 810 are represented as aggregates of one or more syntactic forms ("syntforms" 812) in order to describe possible syntactic structures of sentences in a given language. In general, any lexical meaning of a language is linked to their surface (i.e., syntactic) models 810, which represent constituents which are possible when the lexical meaning functions as a "core" and includes a set of surface slots of child elements, a description of the linear order, diatheses, among others.

While the surface models 810 may be represented by syntforms 812, each syntform 812 may include a certain lexical meaning which functions as a "core" and may further include a set of surface slots 815 of its child constituents, a linear order description 816, diatheses 817, grammatical values 814, government and agreement descriptions 840, communicative descriptions 880, among others, in relationship to the core of the constituent.

The surface slot descriptions 820 as a part of syntactic descriptions 502 are used to describe the general properties of the surface slots 815 that are used in the surface models 810 of various lexical meanings in the source language. The surface slots 815 are used to express syntactic relationships between the constituents of the sentence. Examples of the surface slot 815 may include "Subject", "Object_Direct", "Object_Indirect", "Relative Clause", among others.

Figure 9:
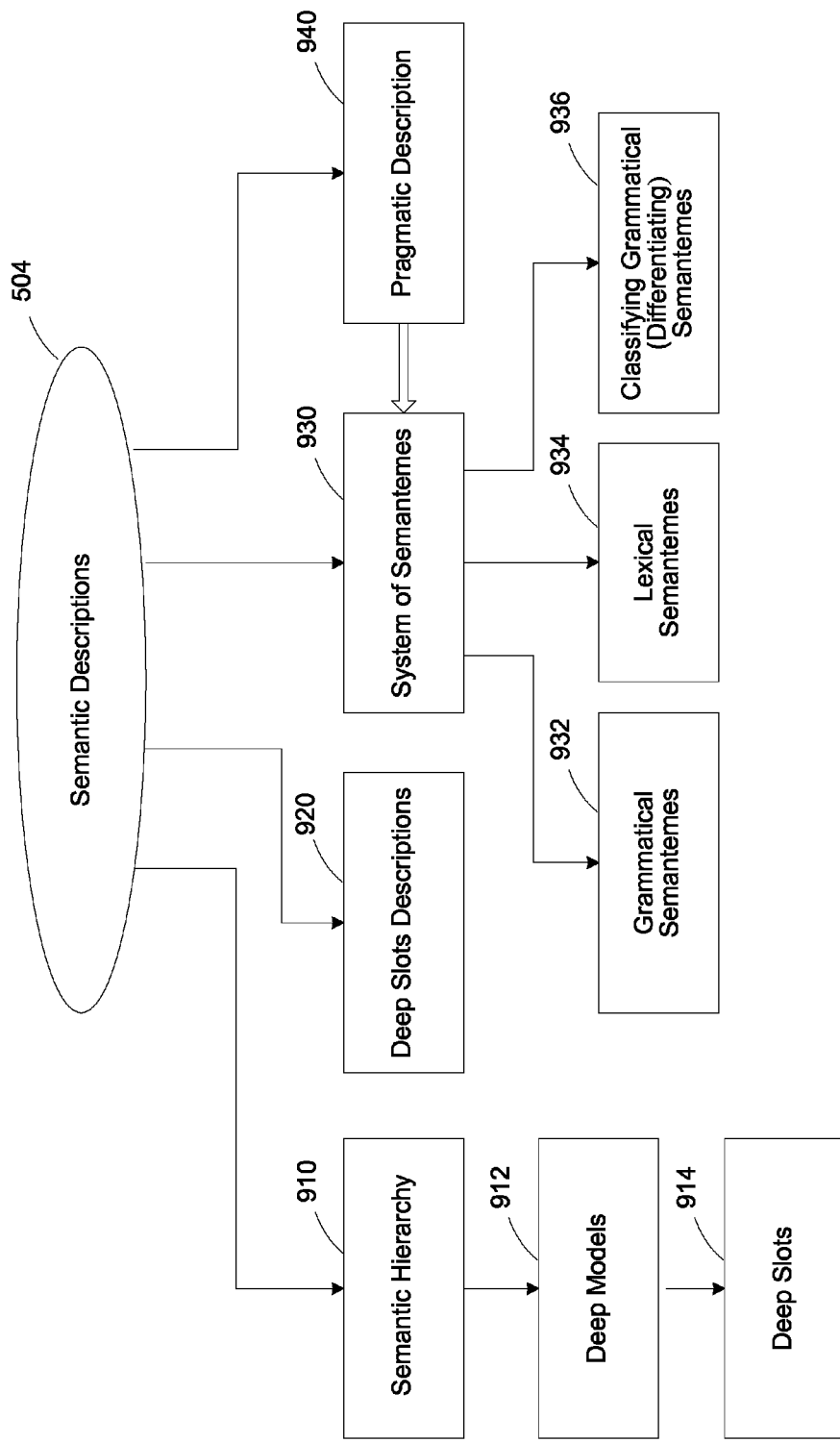
FIG. 9 is a diagram illustrating semantic descriptions according to one exemplary embodiment of the invention.

As part of a syntactic description, any constituent model uses a plurality of surface slots 815 of child constituents along with their linear order descriptions 816 to describe the grammatical values 814 of possible fillers of these surface slots 815. The diatheses 817 represent correspondences between the surface slots 815 and deep slots 914 (as shown in FIG. 9). The diatheses 817 are represented by the link 624 between syntactic descriptions 502 and semantic descriptions 504 (as shown in FIG. 6). The communicative descriptions 880 describe communicative order of the words in a sentence.

Any syntactic form, syntform 812, is a set of surface slots 815 coupled with the linear order descriptions 816. One or more possible constituents for a lexical meaning of a word form of a source sentence may be represented by surface syntactic models, e.g., the surface models 810. Each constituent is viewed as the realization of the constituent model by means of selecting a corresponding syntform 812. The selected syntactic forms, the syntforms 812, are sets of surface slots 815 with a specified linear order. Further, each surface slot in a syntform can have grammatical and semantic restrictions on their fillers.

Linear order description 816 is represented as linear order expressions which are built to express a sequence in which various surface slots 815 can occur in the sentence. The linear order expressions may include names of variables, names of surface slots, parenthesis, grammemes, ratings, and the "or" or "and" operators, etc. For example, a linear order description for the sentence, "Boys play football." may be represented as "Subject Core Object_Direct", where "Subject, Object_Direct" are names of surface slots 815 corresponding to the word order. Fillers of the surface slots 815 are present by symbols in the same order as in the linear order expression.

Different surface slots 815 may be in a strict and/or variable relationship in the syntform 812. For example, parenthesis may be used to build the linear order expressions and describe strict linear order relationships between different surface slots 815. SurfaceSlot1 SurfaceSlot2 or (SurfaceSlot1 SurfaceSlot2) means that both surface slots are located in the same linear order expression, but only one order of these surface slots relative to each other is possible; namely, SurfaceSlot2 follows after SurfaceSlot1.

As another example, square brackets may be used to describe variable linear order relationships between different surface slots 815 of the syntform 812 in the linear order expressions. As such, [SurfaceSlot1 SurfaceSlot2] indicates that any linear order of surface slots denoted by the variables SurfaceSlot1 and SurfaceSlot2 is possible.

The linear order expressions of the linear order description 816 may contain grammatical values 814, expressed by grammemes, to which child constituents correspond. In addition, two linear order expressions can be joined by the operator| (<<OR>>. For example: (Subject Core Object)|[Subject Core Object].

Communicative descriptions 880 describe a word order in the syntform 812 from the point of view of communicative acts to be represented as communicative order expressions, which are similar to linear order expressions. The government and agreement description 840 contains rules and restrictions on grammatical values of attached constituents which are used during syntactic analysis.

Non-tree syntax descriptions 850 are related to processing various linguistic phenomena, such as, ellipsis and coordination, and are used in syntactic structures transformations which are generated during various steps of analysis according to embodiments of the invention. The non-tree syntax description 850 includes ellipsis description 852, coordination description 854, as well as, referential and structural control description 856, among others.

Analysis rules 860, as a part of the syntactic descriptions 502, may include, but are not limited to, semantemes calculating rules 862 and normalization rules 864. Although analysis rules 860 are used during the step of semantic analysis 550, the analysis rules 860 generally describe properties of a specific language and are related to the syntactic descriptions 502. The normalization rules 864 are generally used as transformational rules to describe transformations of semantic structures which may be different in various languages.

FIG. 9 illustrates exemplary semantic descriptions. As stated above in reference to FIG. 5, semantic descriptions provide language-independent descriptions of deep constituents, deep slots, and semantemes, etc. The components of the semantic descriptions 504 are also language-independent and may include, but are not limited to, a semantic hierarchy 910, deep slots descriptions 920, a system of semantemes 930, and pragmatic descriptions 940.

Semantic hierarchy 910 may include semantic notions or semantic entities named semantic classes, arranged into hierarchical parent-child relationships. In general, a child semantic class inherits most properties of its direct parent and all ancestral semantic classes. For example, semantic class SUBSTANCE is a child of semantic class ENTITY and at the same time it is a parent of semantic classes GAS, LIQUID, METAL, WOOD_MATERIAL, etc.

Each semantic class in the semantic hierarchy 910 is supplied with a deep model 912. The deep model 912 of the semantic class is a set of the deep slots 914, which reflect the semantic roles of child constituents in various sentences with objects of the semantic class as the core of a parent constituent and the possible semantic classes as fillers of deep slots. The deep slots 914 express semantic relationships between constituents, including, for example, "agent", "addressee", "instrument", "quantity", etc. A child semantic class inherits and adjusts the deep model 912 of its direct parent semantic class Deep slots descriptions 920 are used to describe the properties of the deep slots 914 and reflect the semantic roles of child constituents in the deep models 912. The deep slots descriptions 920 also contain grammatical and semantic restrictions on what could be the possible fillers of the deep slots 914. The properties and restrictions for the deep slots 914 and their possible fillers are very similar and oftentimes identical among different languages. Thus, the deep slots 914 are language-independent.

System of semantemes 930 represents a set of semantic categories and semantemes, which represent the meanings of the semantic categories. As an example, a semantic category "DegreeOfComparison", can be used to describe the degrees of comparison expressed by various forms of adjectives, for example, "easy", "easier" and "easiest". So, the semantic category "DegreeOfComparison" may include such semantemes as, for example, "Positive", "ComparativeHigherDegree", "SuperlativeHighestDegree", among others. As another example, a semantic category "RelationToReferencePoint" can be used to describe an order as before or after a reference point relative to some event or object, etc., and its semantemes may include, "Previous", "Subsequent", and the order may be spatial or temporal in a broad sense. As yet another example, "EvaluationObjective", as a semantic category, may describe an objective assessment, such as "Bad", "Good", etc.

The systems of semantemes 930 include language-independent semantic attributes which express semantic characteristics as well as stylistic, pragmatic and communicative characteristics. Semantemes can also be used to express an atomic meaning which finds a regular grammatical and/or lexical expression in a language. By purpose and usage, the system of semantemes 930 may be divided into various kinds, including, but not limited to, grammatical semantemes 932, lexical semantemes 934, and classifying grammatical (differentiating) semantemes 936.

Grammatical semantemes 932 are used to describe grammatical properties of constituents when transforming a syntactic tree (a language dependent object) into a semantic structure (a language independent object) and backwards during syntactic structure synthesis 560 from the semantic structure. Lexical semantemes 934 describe specific properties of objects (for example, "being flat" or "being liquid") and are used in the deep slot descriptions 920 as restriction for deep slot fillers (for example, for the verbs "face (with)" and "flood", respectively). Classifying grammatical (differentiating) semantemes 936 express differentiating properties of objects within a single semantic class. For example, in the semantic class "HAIRDRESSER" the semanteme <<RelatedToMen>> is assigned to the lexical meaning "barber", unlike other lexical meanings which also belong to this class, such as "hairdresser", "hairstylist", etc.

Pragmatic descriptions 940 are used to assign a corresponding theme, style or genre to texts and objects of the semantic hierarchy 910. For example, "Economic Policy", "Foreign Policy", "Justice", "Legislation", "Trade", "Finance", etc. Pragmatic properties can also be expressed by semantemes. For example, pragmatic context may be considered when generating natural language sentences.

Figure 10:
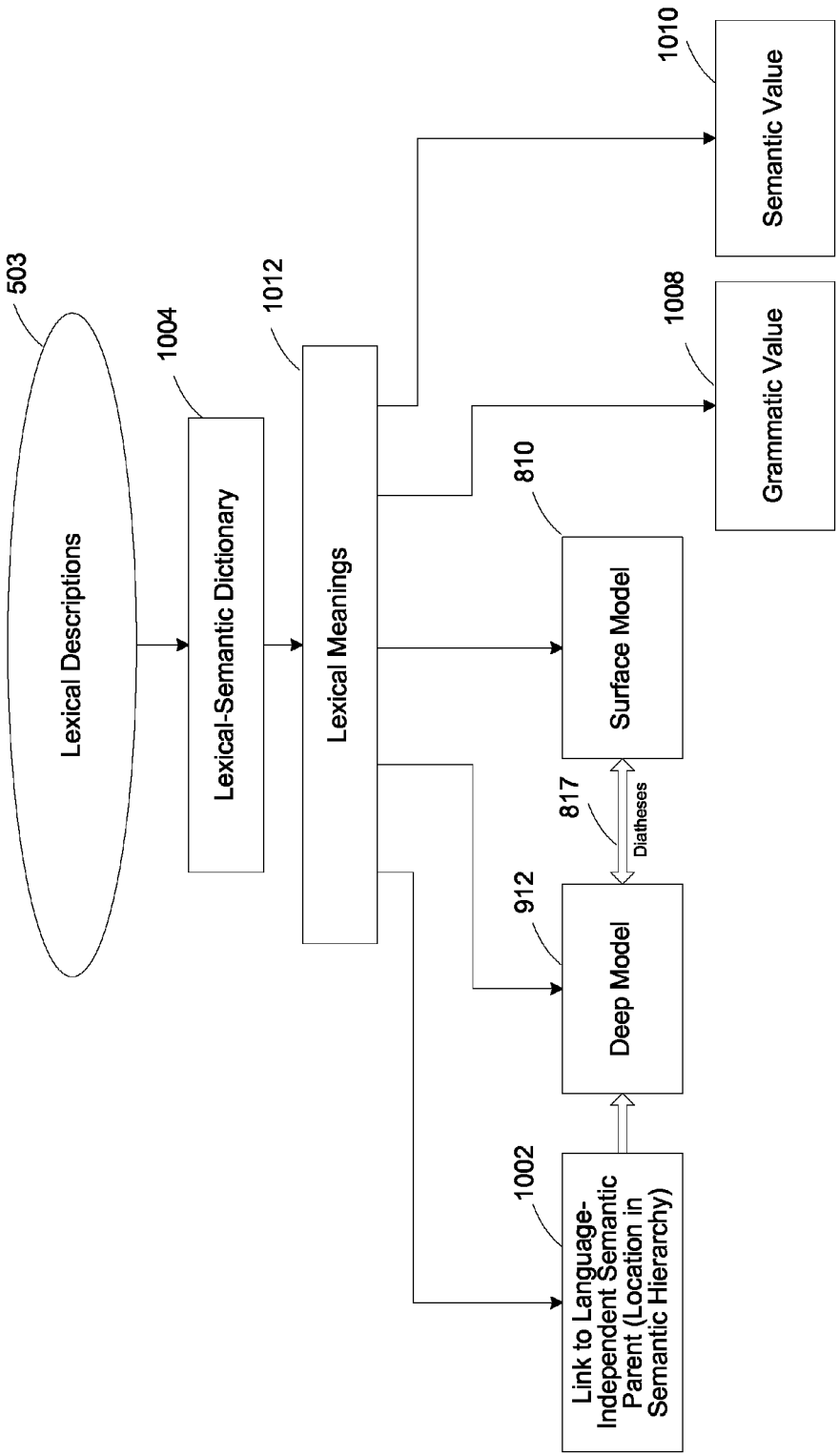
FIG. 10 is a diagram illustrating lexical descriptions according to one exemplary embodiment of the invention.

FIG. 10 illustrates exemplary lexical descriptions. The lexical descriptions 503 represent a plurality of lexical meanings 1012 in a specific language. For each lexical meaning 1012, a link 1002 to its language-independent semantic parent may be established to indicate the location of a given lexical meaning in the semantic hierarchy 910.

Each lexical meaning 1012 is connected with its deep model 912, which is described in language-independent terms, and surface model 810, which is language-specific. Diatheses can be used as the interface between the surface models 810 and the deep models 912 for each lexical meaning 1012 or for a part of speech with some specific grammatical value. One or more diatheses 817 can be assigned to each surface slot 815 in each syntform 812 of the surface models 810.

While the surface model 810 describes the syntactic roles of surface slots and their fillers, the deep model 912 generally describes the semantic roles of the surface slots and the fillers. A deep slot description 920 expresses the semantic types of possible fillers and/or the properties or attributes of the objects denoted by the words of any natural language.

Deep slot descriptions 920 are language-independent since different languages may use the same deep slot to describe similar semantic relationships or to express similar aspects of a real-life situation. Typically, the fillers of the deep slots 914 have the same semantic properties even in different languages. Lexical meanings 1012 of a lexical description of a language inherit properties of semantic class from its parent and adjust its deep model 912.

In addition, lexical meanings 1012 may contain their own characteristics as well as inherit other characteristics from language-independent parent semantic class. These characteristics of the lexical meanings 1012 may include grammatical values 1008 and semantic value 1010, which can be expressed as grammemes and semantemes, respectively.

Each surface model 810 of a lexical meaning includes one or more syntforms 812. Every syntform 812 of a surface model 810 may include one or more surface slots 815 with their linear order description 816, one or more grammatical values 814 expressed as a set of grammatical characteristics (grammemes), one or more semantic restrictions on surface slot fillers, and one or more of the diatheses 817. Semantic restrictions on a surface slot filler are a set of semantic classes, whose objects can fill a given surface slot. The diatheses 817 are a part of relationship 624 between syntactic descriptions 502 and semantic descriptions 504, and represent correspondences between the surface slots 815 and the deep slots 914 of the deep model 912.

Lexical Analysis and Lexical Morphological Analysis

Referring back to FIG. 5, the lexical analysis 510 is performed on the source sentence 112 represented in a source/input language, which may be any natural language. In one embodiment, all the necessary language descriptions for the source sentence 112 are created. The source sentence 112 may be divided into a number of lexemes, elements, or units, including all the words, word forms, gaps, spaces, and punctuators, etc. present in the source sentence for building a lexical structure of the sentence. A lexeme is a meaningful linguistic unit that is an item in the vocabulary, such as the lexical-semantic dictionary 1004 of a language.

As shown in FIG. 5, the lexical-morphological analysis 520 is performed on the source sentence 112. During the lexical-morphological analysis 520 each element of the source sentence 112 are searched in order to find one or more word forms, which is not a space or a punctuator, assign one or more pairs of "lexical meaning-grammatical value" corresponding to each word form, and generate a lexical-morphological structure for the source sentence 112. The lexical-morphological structure of a sentence contains a complete set of pairs of "lexical meaning-grammatical value" for each unit of the lexical structure which is not a space or a punctuator.

The morphological descriptions 501 for the source language (e.g., the word-inflexion description 710 and the word-formation description 730, etc.) are used to provide a set of lexemes for each word form. Each lexeme may correspond to one or more (usually multiple) word forms, one or more corresponding lexical meanings 1012 and grammatical values 1008 obtained from the lexical description 503, and their corresponding grammatical values 1008 obtained from the morphological descriptions 501. The grammatical values 1008 are represented as a set of values of grammatical attributes (expressed in grammemes) of a word form. Examples of these grammatical attributes include, but are not limited to, the part of speech, number, gender, case, etc. A complete set of pairs of "lexical meaning-grammatical value" is generated for each word form in the source sentence 112 and used to build the lexical-morphologic structure for the source sentence 112.

Figure 11:
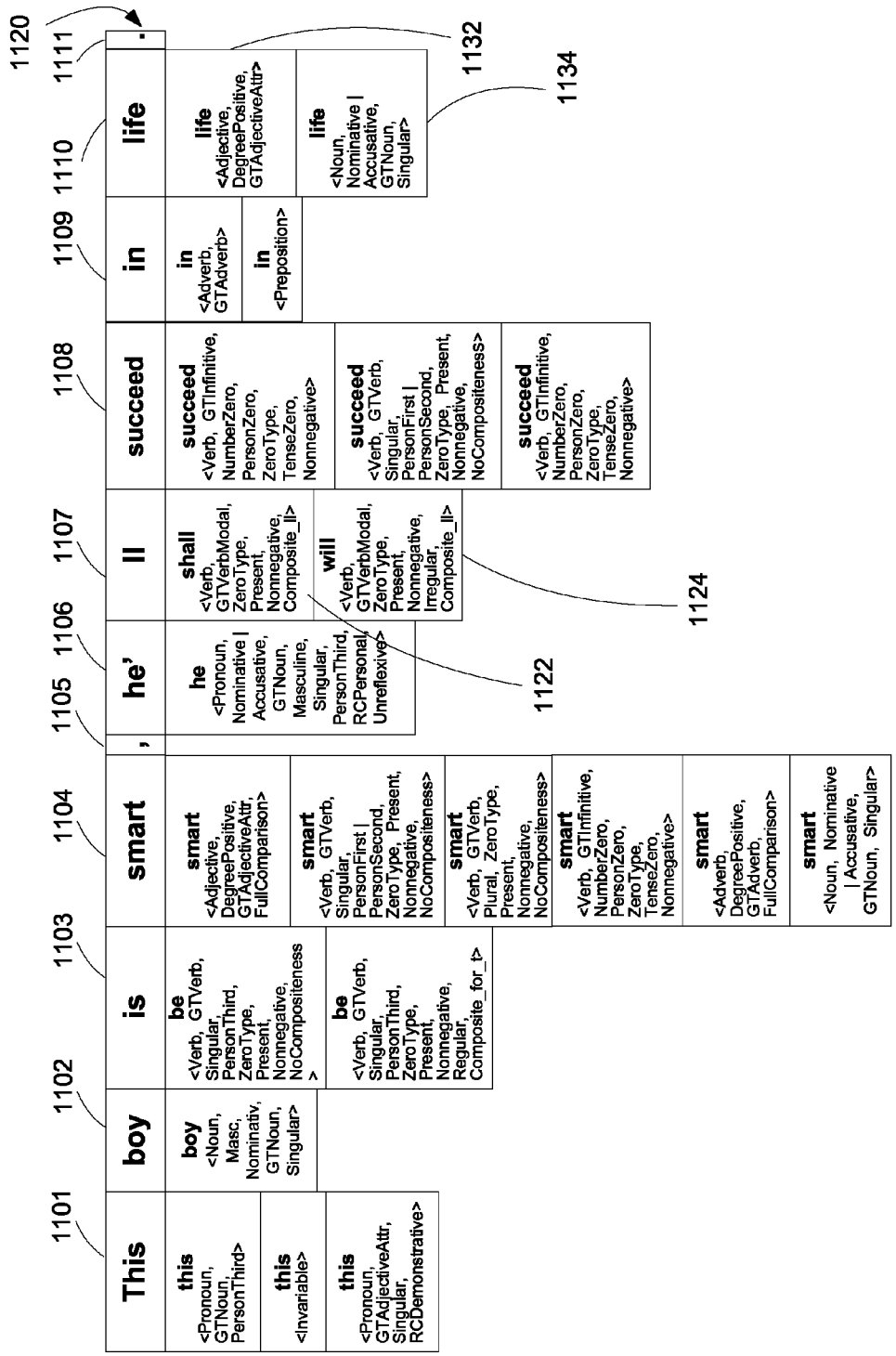
FIG. 11 is a lexical-morphological structure for an exemplary sentence "This boy is smart, he'll succeed in life." according to one embodiment of the invention.

FIG. 11 illustrates an example of the lexical-morphological structure for the sentence "This boy is smart, he'll succeed in life." according to one embodiment of the invention. The lexical-morphological structure has a complete set of pairs of "lexical meaning-grammatical value" for each unit of this sentence. For example, "ll" may mean "shall" 1122 and "will" 1124 as its lexical meanings 1012. For the lexical meaning of "shall" 1122, the grammatical values 1008 is <Verb, GTVerbModal, ZeroType, Present, Nonnegative, Composite_ll>, as shown in FIG. 11. As another example, the grammatical value 1008 for the lexical meaning "will" 1124 is <Verb, GTVerbModal, ZeroType, Present, Nonnegative, Irregular, Composite_ll>.

During the initial stage of the lexical-morphological analysis 520, lemmatization (searching and assigning lexemes) and obtaining pairs of lexical meaning-grammatical value are concurrently made. The lexeme of the word form, its lemma, and morphological grammatical values for all elements for the source sentence 112 are searched and found by using the lexical descriptions 503. If there may be various grammatical values 1008 for a word form found for a single category, the lexical-morphological structure may include all the possible grammatical values 1008 connected by "or".

For example, six pairs of "lexical meaning-grammatical value" are found for the word form "smart", as shown in FIG. 11. As a result, the word form "smart" may have the same lexical meaning of "smart" but six (6) different grammatical values 1008. Depending on its presence in different parts of speech, the word form "smart" may be Adjective, Verb, Adverb, Noun, etc., and there may be three different grammatical values for Verb as the value of the "Part of speech" category, as shown in FIG. 9. As another example, the word form "life" may have two lexical meaning-grammatical value pairs generated having the lexical meaning 1132 of "life" paired with the grammatical value of <Adjective, DegreePositive, GTAdjectiveAttr> and lexical meaning 1134 of "life" paired with <Noun, Nominative|Accusative, GTNoun, Singular>.

In addition, different lexical meanings may correspond to the same lexeme, for example, the lexeme "smart" as an adjective has the following lexical meanings with different semantics (as given, for example, in the Oxford Thesaurus), including 1) "well dressed, well turned out, fashionably dressed, etc."; 2) "fashionable, stylish, high-class, exclusive, chic, fancy, etc."; 3) "clever, bright, intelligent, sharp, sharp-witted, quick-witted, etc.", among others. These different lexical meanings may have different language-independent semantic parents, proper deep models, and proper surface models. During the lexical analysis stage, all these lexical meanings are generalized, but the whole list of these lexical meanings is stored/saved in order to use their surface and deep models for further analysis.

Since every lexical meaning in any given language goes back to the parent semantic class and inherits some its characteristics, a corresponding lexical description 503 with its surface model 810 and deep model 912 can be found in the lexical-semantic dictionary 1004. All the lexical descriptions 503 and the morphological descriptions 501 related to all the lexical meanings 1012 of all word forms of the source sentence 112 are used in the lexical-morphological analysis 520. Once a complete set of pairs of "lexical meaning-grammatical value" for the source sentence 112 are made, merging of the grammatical values 1008 are performed.

Once the lexical-morphological structure is constructed and generalized grammatical values, if generalization/merging is possible, are provided for each word form, a syntactic analysis is performed. The syntactic analysis may be performed in two steps, the rough syntactic analysis 530 and the precise syntactic analysis 540, which are performed bottom-up and top-down, respectively.

Rough Syntactic Analysis

Figure 12:
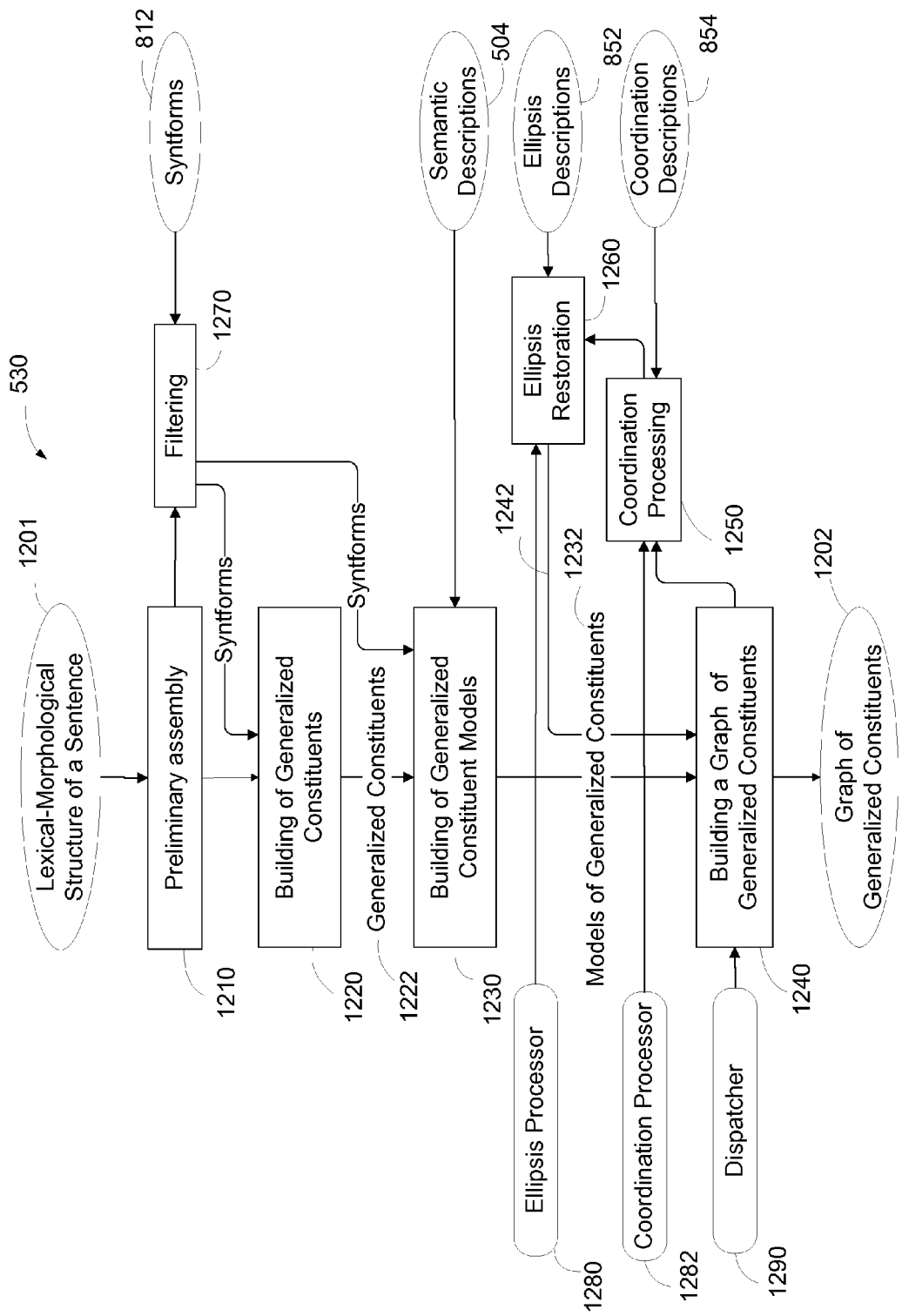
FIG. 12 is a process flow diagram illustrating rough syntactic analysis according to one or more embodiments of the invention.

During the rough syntactic analysis, as shown on FIG. 12, a graph 1202 of generalized constituents is built from the lexical-morphological structure 1201 of the source sentence 112. All the possible surface syntactic models for each element of lexical-morphological structure 1201 are applied, and all the possible constituents are built and generalized. A rough syntactic analyzer or its equivalents is adapted to generate the graph 1202 of the generalized constituents from the lexical-morphological structure 1201 using the surface models 810, the deep models 912, and the lexical-semantic dictionary 1004.

In one embodiment, all the possible syntactic descriptions and syntactic structures for the source sentence 112 are considered and generalized. As a result, the graph 1202 of the generalized constituents is built, having each constituent generalized from all the possible constituents for each element of the source sentence 112, and building generalized constituents for all the elements of the source sentence 112. The graph 1202 of generalized constituents reflects, on a surface model level, all hypothetical possible syntactic relationships between the words of the source sentence 112.

To build all possible constituents, every element of the source sentence 112 which is not a space or a punctuator is viewed as a potential core of a constituent. The building of the graph 1202 of generalized constituents starts with building those constituents which have only the core word form and further expands to build constituents of the next level by including neighboring constituents. For each pair of "lexical meaning-grammatical value" which corresponds to a non-trivial arc of lexical-morphological structure, its surface model 810 is initialized, attempting to attach other constituents in the surface slots 815 of the syntforms 812 of its surface model 810 to the right and the left neighboring constituents. If an appropriate syntform 812 is found in the surface model 810 of the corresponding lexical meaning, the selected lexical meaning may be the core of a new constituent.

The building of the graph 1202 of generalized constituents starts with building those constituents which have only the core word form and further expands to build constituents of the next level by including neighboring constituents. For each pair of "lexical meaning-grammatical value" which corresponds to a non-trivial arc of lexical-morphological structure, its surface model 810 is initialized, attempting to attach other constituents in the surface slots 815 of the syntforms 812 of its surface model 810 to the right and the left neighboring constituents. If an appropriate syntform 812 is found in the surface model 810 of the corresponding lexical meaning, the selected lexical meaning may be the core of a new constituent.

The graph 1202 of generalized constituents is first built as a tree, from the leaves to the root (bottom up). Building of additional constituents is performed bottom-up by attaching child constituents to parent constituents via filling the surface slots 815 of parent constituents to cover all the initial lexical units of the source sentence 112.

The root of the tree is the main clause, represented by a special constituent corresponding to various types of maximal units of a text analysis (complete sentences, enumerations, titles, etc.). The core of the main clause is generally a predicate. During this process, the tree actually becomes a graph, because lower-level constituents (the leaves) can be included into different upper-level constituents (the root).

Some of the constituents which are built for the same element of the lexical-morphological structure may be generalized to obtain generalized constituents. Constituents are generalized by the lexical meanings 1012, by the grammatical values 814, for example, by parts of speech, by their boundaries, among others. Constituents are generalized by the boundaries, since there may be very different syntactic relationships in the sentence, and the same word may be included in different constituents. As a result of the rough syntactic analysis 530, the graph 1202 of generalized constituents is built which represents the whole sentence.

FIG. 12 illustrates in further detail the rough syntactic analysis 530 according to one or more embodiments of the invention. The rough syntactic analysis 530 generally includes preliminary assembly 1210 of the constituents, building 1220 of generalized constituents, filtering 1270, building 1230 of generalized constituent models, building 1240 a graph of generalized constituents, coordination processing 1250, and restoring ellipsis 1260, among others.

The preliminary assembly 1210 of the constituents during the rough syntactic analysis 530 is performed on the lexical-morphological structure 1201 of the sentence to be analyzed, including certain word groups, the words in brackets, inverted commas, etc. Only one word in the group (the constituent core) can attach or be attached to constituents outside the group. The preliminary assembly 1210 is performed early during the rough syntactic analysis 530 before building 1220 of generalized constituents and building 1230 of the generalized constituent models to cover all the boundaries of the whole sentence.

Building 1220 of generalized constituents generally require that all possible pairs of the lexical meaning 1012 and the grammatical value 814 are found or assigned for each of the constituents and attach the surface slots of the child constituents thereof to each of the constituents. Lexical units of the source sentence 112 can form into core constituents at bottom levels. Each constituent can be attached to a constituent at a higher level if the surface slots 815 of the constituent at the higher level can be filled. Thus, the constituents are further expanded to include the neighboring constituents built at previous constituent building process until all of the possible constituents have been built to cover the entire sentence.

During rough syntactic analysis 530, the number of the different constituents which may be built and the syntactic relationships among them are considerably large, some of the surface models 810 of the constituents are chosen to be filtered through the process of filtering 1270 prior to and after the building the constituents in order to greatly reduce the number of the different constituents to be considered. Thus, at the early stage of the rough syntactic analysis 530, the most suitable surface models and syntforms are selected on the basis of a prior rating. Such prior rough ratings include ratings of lexical meanings, ratings of fillers, ratings of the correspondence to semantic descriptions, among others.

The filtering 1270 during the rough syntactic analysis 530 include filtering of a set of syntforms 812 performed prior to and during the building 1220 of generalized constituents. The syntforms 812 and the surface slots 815 are filtered a priori, and constituents are filtered after they are built. The process of the filtering 1270 distills out a number of syntforms including, but not limited to, those syntforms that do not correspond to the grammatical values of the constituent, those syntforms where none of the core slots can be filled, those syntforms with special slots which describe grammatical movement, among others. A special slot, such as relativization and question, presupposing a special lexeme (relative or interrogative pronoun), is filtered out if the special lexeme is not present in the sentence.

In general, the syntax forms (syntforms 812) which do not have fillers for at least one surface slot can be filtered and discarded. In addition, those lexical meanings 1012 which do not have syntforms 812 with filled surface slots 815 are filtered and discarded. The rough syntactic analysis 530 is impossible to succeed if there is no syntform and no filled surface slot, and as such the filtering 1270 is performed.

Once all possible constituents are built, the generalization procedure is performed for building 1220 of the generalized constituents. All possible homonyms and all possible meanings for elements of the source sentence which are capable of being present in the same part of a speech are condensed and generalized, and all possible constituents built in this fashion are condensed into generalized constituents 1222.

A generalized constituent 1222 describes all the constituents with all the possible boundaries in a given source sentence which have a word form as the core constituent and various lexical meanings of this word form. Since the constituents are generalized, a single constituent for each lexical meaning corresponding to each entity of a sentence, including homonyms, is built, and their syntactic forms may be analyzed simultaneously.

Generalized constituent models are built 1230, and a set of models 1232 of generalized constituents having generalized models of all generalized lexemes are built. A generalized constituent model of a lexeme contains a generalized deep model and a generalized surface model. A generalized deep model of a lexeme includes the list of all of the deep slots which have the same lexical meaning for a lexeme, together with the descriptions of all the requirements for the fillers of the deep slots. A generalized surface model contains information about the syntforms 812, where the lexeme may occur, about the surface slots 815, about the diatheses 817 correspondences between surface slots 815 and deep slots 914, and about the linear order description 816.

The syntforms 812 and the surface slots 815 that are significant for this lexeme are selected with the help of the bit-mask. In addition, models of the generalized constituents are built because a constituent is generalized not only by lexical meanings and syntactic forms of its core, but also by the fragments it fills. The use of the models of the generalized constituents reduces the number of wrong relationships and helps to optimize the process to extract a syntactic tree so that all possible boundaries are considered.

The generalized diatheses are built during the rough syntactic analysis 530 as the correspondences between generalized surface models and generalized deep models. The list of all possible semantic classes for all the diatheses 817 of the lexeme is calculated for each surface slot 815.

As shown in FIG. 12, information from the syntforms 812 of the syntactic descriptions 502 as well as the semantic descriptions 504 are used to build the models 1232 of the generalized constituents. For example, dependent constituents are attached to each lexical meaning of a sentence unit and the rough syntactic analysis 530 may also need to determine whether a "candidate" constituent as a dependent constituent can be a filler of the corresponding deep slot of the deep model 912 for a core constituent. Such compatibility analysis allows the wrong syntactic relationships to be discarded early.

The building 1240 of the graph of the generalized constituents is performed. The graph 1202 of generalized constituents which describes all possible syntactic structures of the entire sentence is built by linking and assembling the generalized constituents 1222 to each other. The building 1240 of the graph of the generalized constituents is organized via generating and processing of the queue of requests to attach one constituent to another constituent. In general, contact pairs of constituents representing contact groups of words in the sentence can be included in the request queue.

A constituent can be attached to different surface slots of another constituent and a child constituent can be attached to different parent constituents. In each case, a request for attachment of one constituent to another constituent can be generated. The requests can be processed by a subsystem, such as a dispatcher 1290. If attachment to the selected surface slot is performed or found impossible, the request is removed from the queue of active request of the dispatcher 1290.

The dispatcher 1290 or any devices, systems, computer-readable media, adapted to perform the building 1240 of the graph of the generalized constituents can wait and search for new constituent pairs in order to put these constituent pairs into the dispatcher queue, such as by keeping the right and left directions of the neighboring constituents of a constituent. For example, during attaching a child constituent to the parent constituents, the left constituent pair of the child constituent is added to the left of the parent constituent and the right constituent pair of the child constituent is added to the right of the parent constituent.

As shown in FIG. 12, the coordination processing 1250 is also performed on the graph 1202 of the generalized constituents. Coordination is a language phenomenon which is presented in sentences with enumeration and/or a coordinating conjunction, such as "and", "or", "but", etc. A simple example of a sentence with coordination—"John, Mary and Bill came home." In this case only one of coordinated child constituent is attached in the surface slot of a parent constituent during building 1240 the graph of the generalized constituents. If a constituent, which may be a parent constituent, has a surface slot filled for a coordinated constituent, all coordinated constituents are taken and an attempt is made to attach all these child constituents to the parent constituent, even if there is no contact or attachment between the coordinated constituents. During coordination processing 1250, the linear order and multiple filling possibility of the surface slot are determined. If the attachment is possible, a proform which refers to the common child constituent is created and attached. As shown in FIG. 12, the coordination processor 1282 or other algorithms, devices, and computer subsystems can be adapted to perform the coordination processing 1250 using coordination descriptions 852 in the building 1240 of the graph of generalized constituents.

The building 1240 of the graph of the generalized constituents can be impossible without ellipsis restoration 1260. Ellipsis is a language phenomenon which is represented by the absence of core constituents. Ellipsis can also be related with coordination. The process of the ellipsis restoration 1260 is also needed to restore a missing constituent. An example of an elliptical English sentence is "The president signed the agreement and the secretary [signed] the protocol." As discussed above, the ellipsis restoration 1260 can be used to generate the new request and new constituent pairs.

As shown in FIG. 12, the ellipsis processor 1280 or other algorithms, devices, and computer subsystems can be adapted to perform the ellipsis restoration 1260. In addition, the ellipsis descriptions 852 which contain proform models can be adapted to aid the ellipsis processor 1280 and process core ellipsis to build the graph 1202 of generalized constituents. Proforms may be auxiliary elements inserted into a sentence when establishing non-tree links. A proform model may include templates (patterns) of syntforms. These proform templates determine the required surface slots and their linear order. All constituents in the sentence for each proform are searched and the possibility to attach the constituent to the first of the required slots of the syntform-template is determined.

The coordination processing 1250 and the ellipsis restoration 1260 are performed during each program cycle of the dispatcher 1290 after the building 1240 of the graph of the generalized constituents and the building 1240 may continue, as indicated by an arrow of returning back 1242. If the ellipsis restoration 1260 is needed and called upon during the rough syntactic analysis 530 due to, for example, the presence of constituents left alone without any parent constituents being attached to, only these constituents are processed.

The dispatcher 1290 stops when the active request queue is empty and cannot be refilled. The dispatcher 1290 can be a device, system, or algorithm, which keeps all the information about the constituents that have been modified. A constituent is considered modified if changes have been introduced to any of its properties which describe the sub-tree, including boundaries and the set of pre-child constituents. In addition, during the building 1240 of the generalized constituents 1222, clause substitution is performed. Clauses for direct speech and proper names are substituted.

Figure 13:
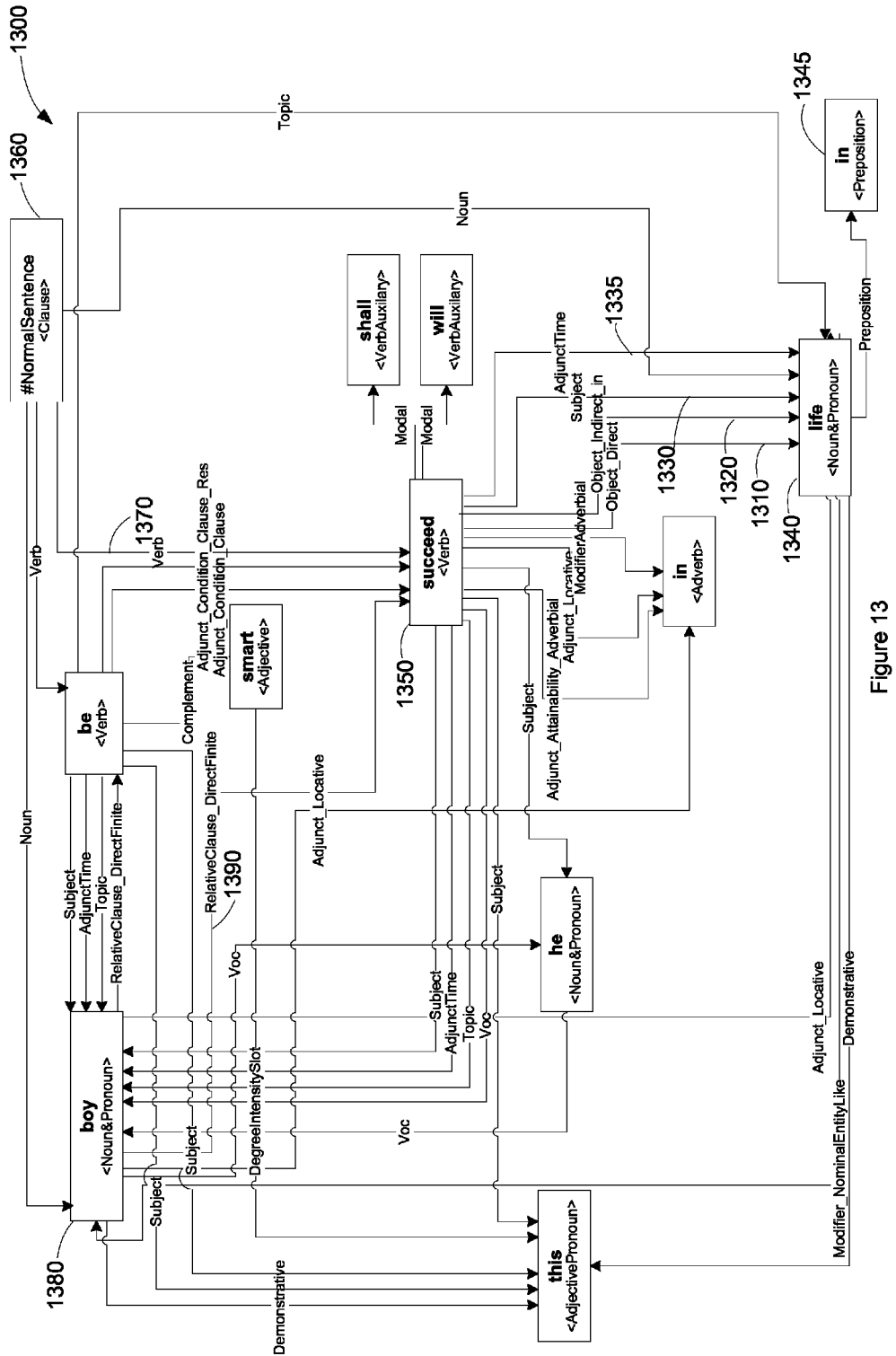
FIG. 13 is an exemplary graph of generalized constituents for the sentence "This boy is smart, he'll succeed in life." according to one embodiment of the invention.

FIG. 13 is an example of a graph 1300 of generalized constituents for the sentence "This boy is smart, he'll succeed in life." The constituents are represented by rectangles, each constituent having a lexeme as its core. Morphological paradigm (as a rule, the part of speech) of a constituent core is expressed by grammemes of the part of speech and displayed in broken brackets below the lexeme. A morphological paradigm as a part of word-inflection description 710 of morphological description 501 contains all information about word-inflection of one or more part of speech. For example, since "life" can have two parts of speech: <Adjective> and <Noun> (which is represented by the generalized morphological paradigm <Noun&Pronoun>), two constituents for "life" are shown in the graph 1300.

Links in the graph 1300 represent filled surface slots of constituent cores. Slot names are displayed on the arrows of the graph. Any constituent is formed by a lexeme-core which may have outgoing named arrows which denotes surface slots 815 filled by child constituents. An incoming arrow means attaching this constituent to a surface slot of another constituent. The graph 1300 is so complicated and has so many arrows, because it shows all relationships which can be established between constituents of the sentence, "This boy is smart, he'll succeed in life." Among them there are many relationships in the graph 1300 which, however, will be discarded. A value of said prior rough rating is saved by each arrow denoting a filled surface slot. Surface slot and relationships with high rating scores are selected hierarchically during the next step of syntactic analysis.

Often several arrows may connect the same pairs of constituents. It means that there are different acceptable surface models for this pair of constituents, and several surface slots of the parent constituent may be independently filled by this child constituent. So, four surface slots named Object_Direct 1310, Object_Indirect_in 1320, Subject 1330 and Adjunct-Time 1335 of the parent constituent "succeed<Verb>" 1350 may be independently filled by the child constituent "life<Noun&Pronoun>" 1340 in accordance with surface model of the constituent "succeed<Verb>". Thus, roughly speaking "in <Preposition>" 1345 and "life<Noun&Pronoun>" 1340 form a new constituent with the core "life" and it, in turn, form with "succeed<Verb>" 1350 four variants of another new constituents with the core "succeed<Verb>" which is attached to another parent constituent, for example, to #NormalSentence<Clause> 1360 in the surface slot Verb 1370, and to "boy<Noun&Pronoun>" 1390 in the surface slot RelativClause_DirectFinite 1390 The marked element #NormalSentence<Clause>, being the "root", corresponds to the whole sentence.

Precise Syntactic Analysis

Figure 14:
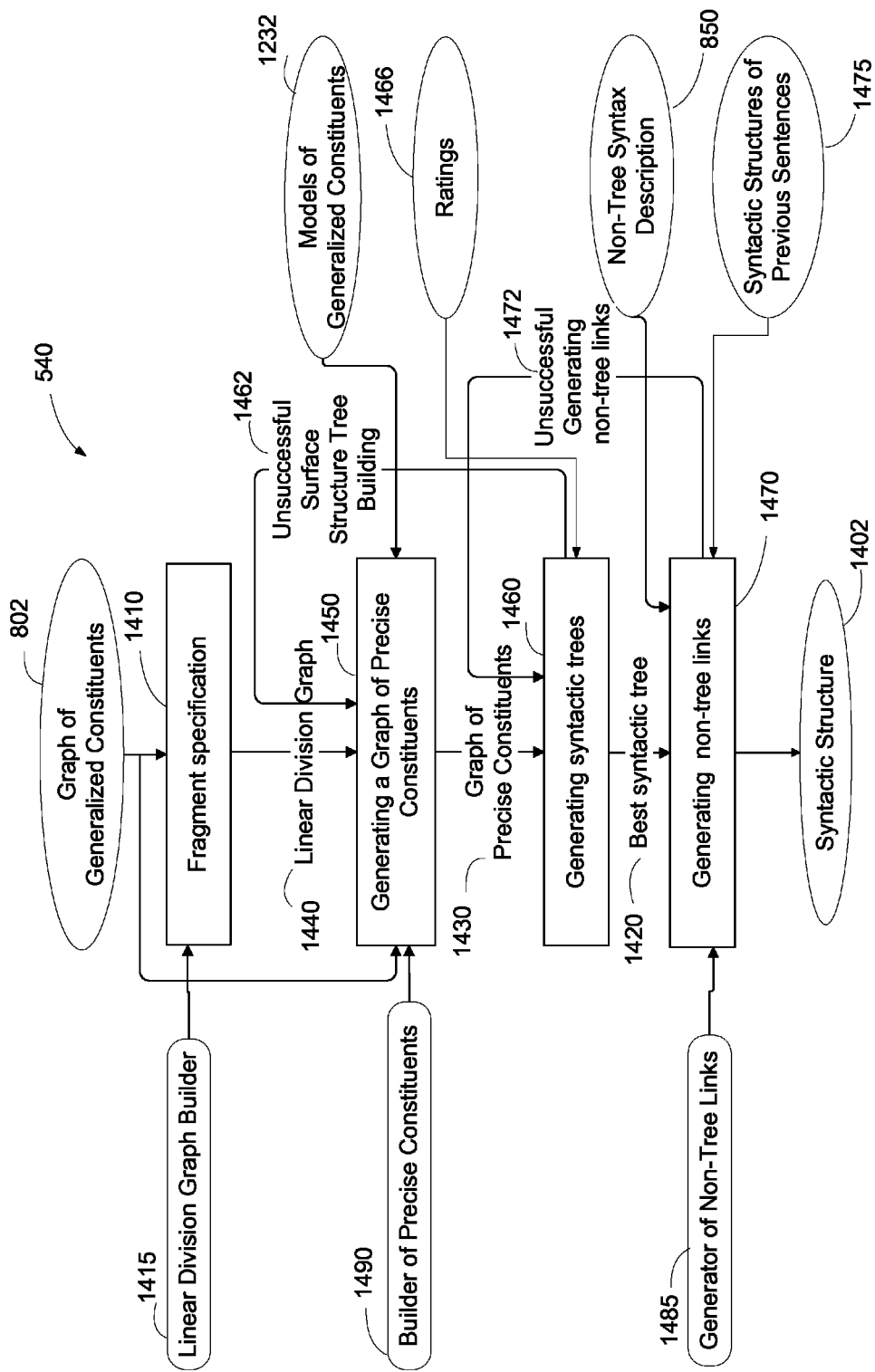
FIG. 14 is a process flow diagram illustrating precise syntactic analysis according to one or more embodiments of the invention.

FIG. 14 illustrates in detail the precise syntactic analysis 540 performed to select the best syntactic structure 1402 according one or more embodiments of the invention. The precise syntactic analysis 540 is performed top-down from the higher levels to the bottom lower levels, from the node of the potential top of the graph 1202 of the generalized constituents down to its bottom-level child constituents.

The precise syntactic analysis 540 is performed to build a syntactic tree, which is a tree of the best syntactic structure 1402, for the source sentence. During the precise syntactic analysis 540 lexical ambiguities must be resolved, i.e., a lexical selection is performed to select only one lexical class (lexical meaning) and its model for each node of the syntactic tree from possible classes (homonyms) and a selection of the only surface slot for each relation (arc) connecting the nodes of the syntactic tree. Information about the lexical selection is saved and may be used during further steps of translation.

The task of the lexical selection consists in the following. For example, a human meets the word "table" in a text or in speech. Depending of context or topic he/she can easy interpret it as 1) a furniture; 2) food provided in a restaurant or household; 3) a meeting place or forum for formal discussions; 4) facts or figures systematically displayed, especially in columns, especially, electronic table, tables in data bases etc. Really, if it is a matter of data bases or bookkeeping it is more probably to interpret "table" in the meaning 4). Accordingly, depending on its syntactical role and position in the sentence, the human easily can interpret the word "table" as a noun, an adjective or a verb. The system of MT has to generate and to verify several hypotheses, and it is desirable, from most probable ones to less probable ones. During verifying a hypothesis, one of possible lexical class (from semantic classes, such as FURNITURE, BOARD_AS_FOOD, ROUND_TABLE, LIST_OF_DATA correlated with the occurrence of the word "table."

Many syntactic structures can be built and the most probable syntactic structure is obtained as the best syntactic structure 1402. The best syntactic structure 1402 is obtained on the basis of calculating ratings using a priori ratings 1466 from the graph 1202 of the generalized constituents. The priori ratings 1466 include ratings of the lexical meanings, such as frequency (or probability), ratings of each of the syntactic constructions (e.g., idioms, collocations, etc.) for each element of the sentence, and the degree of correspondence of the selected syntactic constructions to the semantic descriptions of the deep slots 914. If the topic (pragmatic class or a set of pragmatic classes) of the translated text is known a priori, special types of ratings, such as the ratings of lexical classes according to pragmatic classes may be taken into account.

The lexical-semantic dictionary 1004 contains statistic of occurrence lexical classes in texts of different subject matters and topics. Roughly speaking, this is a logarithm P(word|topic) of probability to meet the lexical class in a text of the defined topic. It may be implemented as bonuses which are added to rating scores of lexical meanings. Since the lexical meaning may be found in texts of several topics, there may be several pragmatic classes, so there may be a set of rating scores for each lexical meaning regarding to corresponding pragmatic classes. Overall bonus is calculated as a weighed sum of rating scores of the lexical class regarding pragmatic classes which are multiplied by current weights of pragmatic classes (current weight of the pragmatic classes means, for example, a degree for the text to belong to the pragmatic class).

Overall Rating Scores are Calculated and Obtained/Stored.

Hypotheses about the overall syntactic structure of the sentence are generated. Each hypothesis is represented by a tree which is a subgraph of the graph 1202 of the generalized constituents to cover the entire sentence, and rating is calculated for each syntactic tree. During the precise syntactic analysis 540, hypotheses about the syntactic structure of the source sentence are verified by calculating several types of ratings. These ratings are calculated as the degree of correspondence of the fillers of the surface slots 815 of the constituent to their grammatical and semantic descriptions, such as grammatical restrictions (e.g., the grammatical values 814) in the syntforms 812 and semantic restrictions on the fillers of the deep slots 914 in the deep models 912. Another types of ratings are the degree of correspondence of the lexical meanings 1012 to the pragmatic descriptions 940, which may be absolute and/or relative probability ratings of the syntactic constructions as denoted by the surface models 810, and the degree of compatibility of their lexical meanings, among others. Also, information about pragmatic characteristics of lexical meanings selected for nodes of the tree of the sentence and, maybe, of its environment, for example, paragraph, page or the whole text, may be used to define a pragmatic context.

The calculated rating scores for each hypothesis may be obtained on the basis of a priori rough ratings found during the rough syntactic analysis 530. For example, a rough assessment is made for each generalized constituent in the graph 1202 of the generalized constituents and ratings scores can be calculated. Various syntactic trees can be built with different ratings. Rating scores are obtained, and these calculated rating scores are used to generate hypotheses about the overall syntactic structure of the sentence. To achieve this, the hypotheses with the highest rating are selected. These hypotheses are generated by advancing hypotheses about the structure of the child constituents which are most probable in order to obtain the most probable hypothesis about the overall syntactic structure of the sentence. Ratings are performed during precise syntactic analysis until a satisfactory result is obtained and a best syntactic tree having highest rating can be built.

Those hypotheses with the most probable syntactic structure of a whole sentence can also be generated and obtained. From syntactic structure variants with higher ratings to syntactic structure variants with lower ratings, syntactic structure hypotheses are generated during a precise syntactic analysis until a satisfactory result is obtained and a best syntactic tree which has the highest possible rating can be built.

The best syntactic tree is selected as the syntactic structure hypothesis with the highest rating value available from the graph 1202 of the generalized constituents. This syntactic tree is considered as the best (the most probable) hypothesis about the syntactic structure of the source sentence 112. Non-tree links in the tree are assigned, and accordingly, the syntactic tree is transformed into a graph as the best syntactic structure 1402, representing the best hypothesis about the syntactic structure of the source sentence 112. If non-tree relationships cannot be assigned in the selected best syntactic tree, the syntactic tree with the second-best rating is selected as the best syntactic tree for further analysis.

When the precise syntactic analysis 540 is unsuccessful or the most probable hypotheses cannot be found after initial precise syntactic analysis, returning back 544 denoting unsuccessful syntactic structure building from the precise syntactic analysis 540 back to the rough syntactic analysis 530 is provided and all syntforms, not just the best syntforms, are considered during the syntactic analysis. If no best syntactic trees are found or the system has failed to define non-tree relationships in all the selected "best" trees, additional rough syntactic analysis 530 may be performed taking into consideration "bad" syntform which were not analyzed before for the method of the invention.

As shown in FIG. 14, the precise syntactic analysis 540 may contain various stages, including a preliminary stage, a stage 1450 for generating a graph of precise constituents, a stage 1460 for generating syntactic trees and differential selection of the best syntactic tree, a stage 1470 for generating non-tree links and obtaining a best syntactic structure, among others. The graph 1202 of generalized constituents is analyzed during the preliminary stage which prepares the data for the precise syntactic analysis 540.

The preliminary stage of the precise syntactic analysis 540 may include fragment specification 1410 and generating 1450 of a graph of precise constituents to obtain a graph of linear division 1440 and a graph of precise constituents 1430, respectively. A linear divisional graph builder 1415 and builder 1490 of precise constituents may be adapted to process the fragment specification 1410 for obtaining the graph of linear division 1440 and the graph of precise constituents 1430. In addition, the models 1232 of the generalized constituents can be used during the building 1450 of the graph of precise constituents.

During the precise syntactic analysis 540, the precise constituents are built recursively. Proper constituents are generated backwardly and recursively. The precise constituents are built from the generalized constituents 1222 to initially perform the fragment specification 1410 thereon. The building 1450 of the graph of precise constituents may include reviewing the graph 1440 of linear division, recursively building the graph 1430 of the precise constituents which may contains fixed but not yet filled child slots, recursive performing the fragment specification 1410 for each graph arc lying on the way, and recursive filling a child slot to attach a child precise constituent built previously, among others. The generalized constituents 1222 are used to build the graph 1430 of precise constituents for generating one or more trees of precise constituents. For each generalized constituent, it is possible boundaries and their child constituents are marked.

The stage 1460 for generating the syntactic trees is performed to generate the best syntactic tree 1420. The stage 1470 for generating non-tree links may use the rules of establishing non-tree links and the information from syntactic structures 1475 of previous sentences to analyze one or more best syntactic trees 1420 and select the best syntactic structure 1402 among the various syntactic structures. A generator 1485 for generating non-tree links is adapted to perform the stage 1470.

As shown in FIG. 14, the fragment specification 1410 of the precise syntactic analysis 540 is performed initially to consider various fragments which are continuous segments of a parent constituent. Each generalized child constituent can be included into one or more parent constituent in one or more fragments. The graph of linear division 1440 (GLD) can be built as the result of the fragment specification 1410 to reflect the relationships of the parent constituent fragments with the core and child constituents. Additionally, the surface slot for the corresponding child constituents is assigned. The graph of linear division 1440 is the framework for building the graph 1430 of precise constituents. Precise constituents are nodes of the graph 1430 and one or more trees of precise constituents are generated on the basis of the graph 1430 of precise constituents.

The graph 1430 of precise constituents is an intermediate representation between the graph 1202 of generalized constituents and syntactic trees. Unlike a syntactic tree, the graph 1430 of precise constituents can still have several alternative fillers for a surface slot. The precise constituents are formed into a graph such that a certain constituent can be included into several alternative parent constituents in order to optimize further analysis for selecting syntactic trees. Such an intermediate graph structure is rather compact for calculating structural ratings.

During the recursive stage 1450 for generating the graph of the precise constituents, the precise constituents are built traversally on the graph 1440 of linear division via the left and right boundaries of the core constituents. For each built path on the graph 1440 of linear division, the set of syntforms is determined; linear order is checked (verified) and rated for each of the syntforms. Accordingly, a precise constituent is created for each of the syntforms, and the building of precise child constituents is recursively initiated.

When a precise child constituent is built, an attempt is made to attach the precise child constituent to the precise parent constituent. When attaching child constituents, restrictions which the child constituents impose on the set of meanings of a parent constituent are taken into account, and the upper lexical rating of the link is calculated. When trying to attach each child constituent, two types of restrictions, which are represented by means of bit masks, are formed: the restriction (mask) on grammatical values of the parent constituent, which is received with the help of the agreement rule, and the restriction (mask) on grammatical values of the child constituent, which is received with the help of the agreement or government rule. For each description of a deep slot which may have diathesis correspondence to the current surface slot, the following restrictions are obtained: the restriction on the lexical meanings of the parent constituent, the restriction on the possible lexical meanings of the child constituent and the restriction on the preferred lexical meanings of the child constituent (the set of preferred semantic classes in the description of the deep slot). Additionally, deep rating is obtained as a degree of conformity of the deep slot with these restrictions.

If there is a suitable identifying word combination in the sentence, for example, an idiom, which meets the restriction on parent lexical meanings, the rating of the word combination is added to the deep rating. If none of the lexical meanings of child constituent meets the deep restrictions of this deep slot, attachment to this deep slot is impossible. Then, the possibility of attachment to the other deep slots is checked. A deep slot which has the maximal value of the deep rating is selected.

The masks of grammemes for all child constituents which could be attached are merged. The mask on grammatical values of the parent constituent is used for calculating its grammatical value. For example, when child constituents are attached, the grammatical value of the syntactic form according to its correspondence with the child constituents is defined more precisely.

Coordination is also processed when a child constituent attached during the stage 1450. For slots filled by coordination, there exists a need to check that not only the apex of coordination can be attached but its other components as well.

Additionally, ellipsis is also processed when a child constituent attached during the stage 1450. Surface slots which are required in the syntform and do not permit ellipsis may be empty. In this case, when generating a precise constituent, a proform is placed in the empty slot.

As result of the stage 1450, the graph of the precise constituents 1430, which covers the whole sentence, is built. If the stage 1450 for generating the graph of the precise constituents has failed to produce the graph of the precise constituents 1430 which would cover the entire sentence, a procedure which attempts to cover the sentence with syntactically-separate fragments is initiated. In this case, a dummy (fictitious) generalized constituent is generated, where all generalized constituents of the sentence may be attached.

As shown in FIG. 14, when the graph of precise constituents 1430, which covers the sentence, was built, one or more syntactic trees can be generated at the step of generating 1460 during the precise syntactic analysis 540. Generating 1460 of the syntactic trees allows generating one or more trees with a certain syntactic structure. Since surface structure is fixed in a given constituent, adjustments of structural rating scores, including punishing syntforms which are difficult or do not correspond to the style, or rating the communicative linear order, etc., may be made.

The graph of precise constituents 1430 represents several alternatives according to different fragmentation of the sentence and/or different sets of surface slots. So, the graph of precise constituents represents a set of possible trees—syntactic trees, because each slot can have several alternative fillers. The fillers with the best rating may form a precise constituent (a tree) with the best rating. Thus the precise constituent represents unambiguous syntactic tree with the best rating. At the stage 1460, these alternatives are searched and one or more trees with a fixed syntactic structure are built. Non-tree links in the built trees are not defined yet. The result of this step is a set of best syntactic trees 1420 which have the best rating values.

The syntactic trees are built on the basis of the graph of precise constituents. For these precise constituents, syntactic forms, the boundaries of the child constituents and the surface slots are determined. The different syntactic trees are built in the order of descending of their structural rating. Lexical ratings cannot be fully used because their deep semantic structure is not defined yet. Unlike the initial precise constituents, every resulting syntactic tree has a fixed syntactic structure, and every precise constituent in it has only one filler for each surface slot.

During the stage 1460, the best syntactic tree 1420 may generally be built recursively and traversally from the graph 1430 of precise constituents. The best syntactic subtrees are built for the best child precise constituents, syntactic structure is built on the basis of the given precise constituent, and child subtrees are attached to the generated syntactic structure. The best syntactic tree 1420 can be built, for example, by selecting a surface slot with the best quality among the surface slots of a given constituent and generating a copy of a child constituent whose sub-tree is the best quality sub-tree. This procedure is applied recursively to the child precise constituent.

On the basis of each precise constituent, the best syntactic tree with a certain rating score can be generated. This rating score can be calculated beforehand and specified in the precise constituent. After the best syntactic tree is generated, a new precise constituent is generated on the basis of the previous precise constituent. This new precise constituent in its turn generates a syntactic tree with the second-best value of the rating score. Accordingly, on the basis of the precise constituent, the best syntactic tree may be obtained, and a new precise constituent may be built.

For example, two kinds of ratings can be kept for each precise constituent during the stage 1460, the quality of the best syntactic tree which can be built on the basis of this precise constituent, and the quality of the second-best syntactic tree. Also, the rating of the precise constituent includes the rating of the best syntactic tree which can be built on the basis of this precise constituent.

The rating of a syntactic tree may be calculated on the basis, but not limited to, of the following values: structural rating of the constituent; upper rating for the set of lexical meanings; upper deep rating for child slots; ratings of child constituents, etc. When a precise constituent is analyzed to calculate the rating of the syntactic tree which can be generated on the basis of the precise constituent, child constituents with the best rating are analyzed in every surface slot.

During the stage 1460, rating calculation for the second-best syntactic tree differs, but not limited to, in the fact that for one of the child slots, its second-best child constituent is selected. Any syntactic tree with a minimal rating loss relative to the best syntactic tree must be selected during this stage 1460.

When the stage 1460, additional restrictions on constituents may be taken into account. Each precise constituent which gets into the best tree may be checked for additional restrictions. If a constituent or one of its child constituents does not meet the restrictions, the constituent may receive a mark that its best tree does not meet the additional restrictions. A check may be performed to determine whether this subtree meets the additional restrictions.

The rules of additional restrictions are checked during the stage 1460 to make sure whether a constituent meets the restrictions but also suggest the steps which should be taken in certain slots so that the constituent will meet the restrictions. This approach can also significantly increase task-orientation of the search. The restrictions used during the stage 1460 can be defined for any surface slot and the corresponding deep slot. On the basis of the specified restrictions, the difference in quality between the best and second-best tree for this surface slot is calculated. As a result, a generation method is provided whereby a tree which meets the additional restrictions can be found as soon as possible.

Near the end of the stage 1460, a syntactic tree with a fully-defined syntactic structure is built, i.e., the syntactic form, child constituents and surface slots that they fill are defined. Since this tree is generated on the basis of the best hypothesis about the syntactic structure of the initial sentence, this tree is called the best syntactic tree 1420. The returning back 1462 from generating 1460 the syntactic trees to the building 1450 of the graph of precise constituents is provided when there are no syntactic trees with satisfactory rating generated, or the precise syntactic analysis is unsuccessful.

Figure 15:
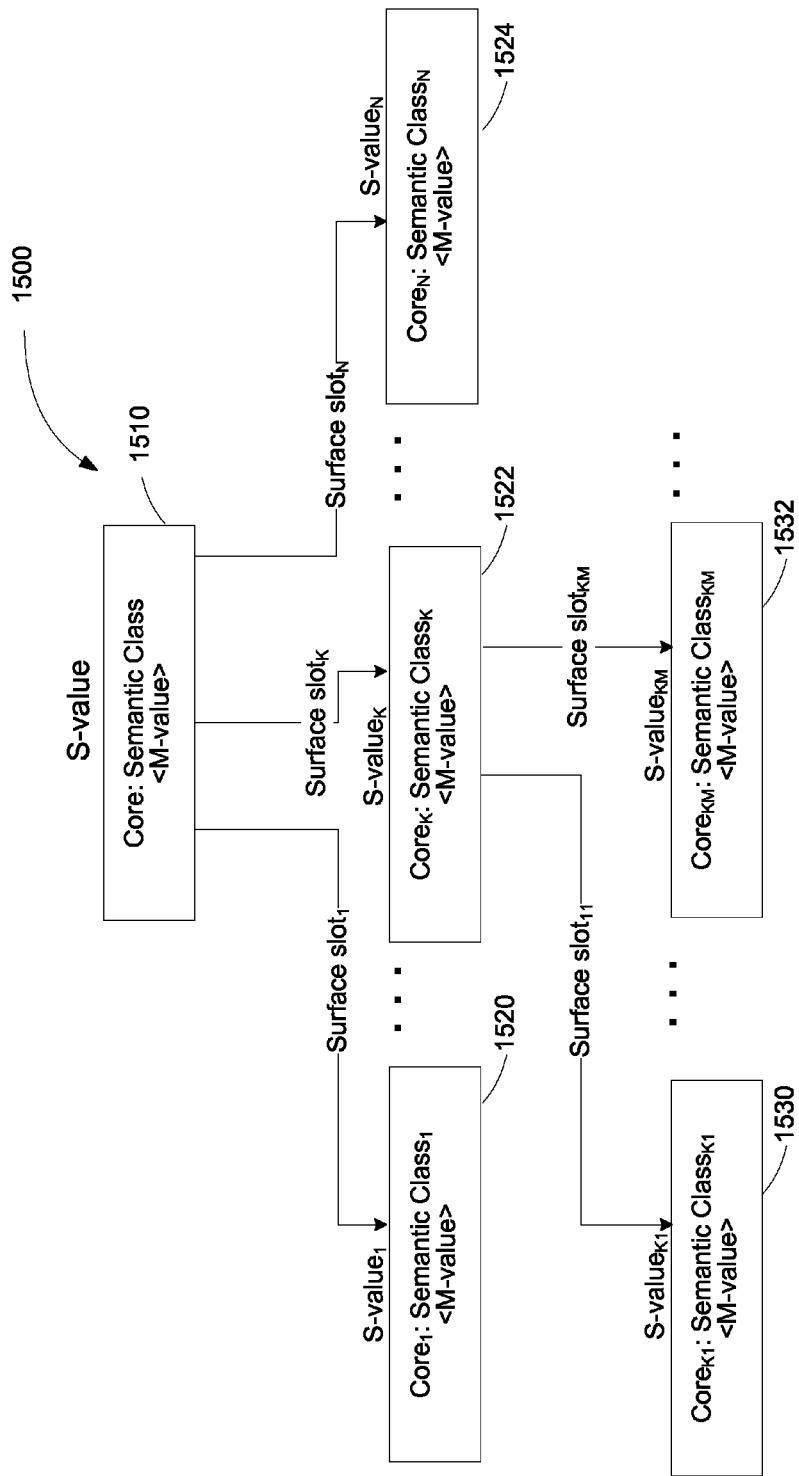
FIG. 15 is an exemplary schematic representation of a syntactic tree according to one embodiment of the invention.

FIG. 15 illustrates schematically an exemplary syntactic tree according to one embodiment of the invention. In FIG. 15, constituents are shown as rectangles, arrows show filled surface slots. A constituent has a word at its core (Core) with its morphological value (M-value) and semantic parent (Semantic class) and can have smaller constituents of the lower level attached. This attachment is shown by means of arrows named Surface Slot. Each constituent has also a syntactic value (S-value), expressed as the grammemes of the syntactic categories thereof. These grammemes are the properties of the syntactic forms selected for the constituent during the precise syntactic analysis 540.

Figure 16:
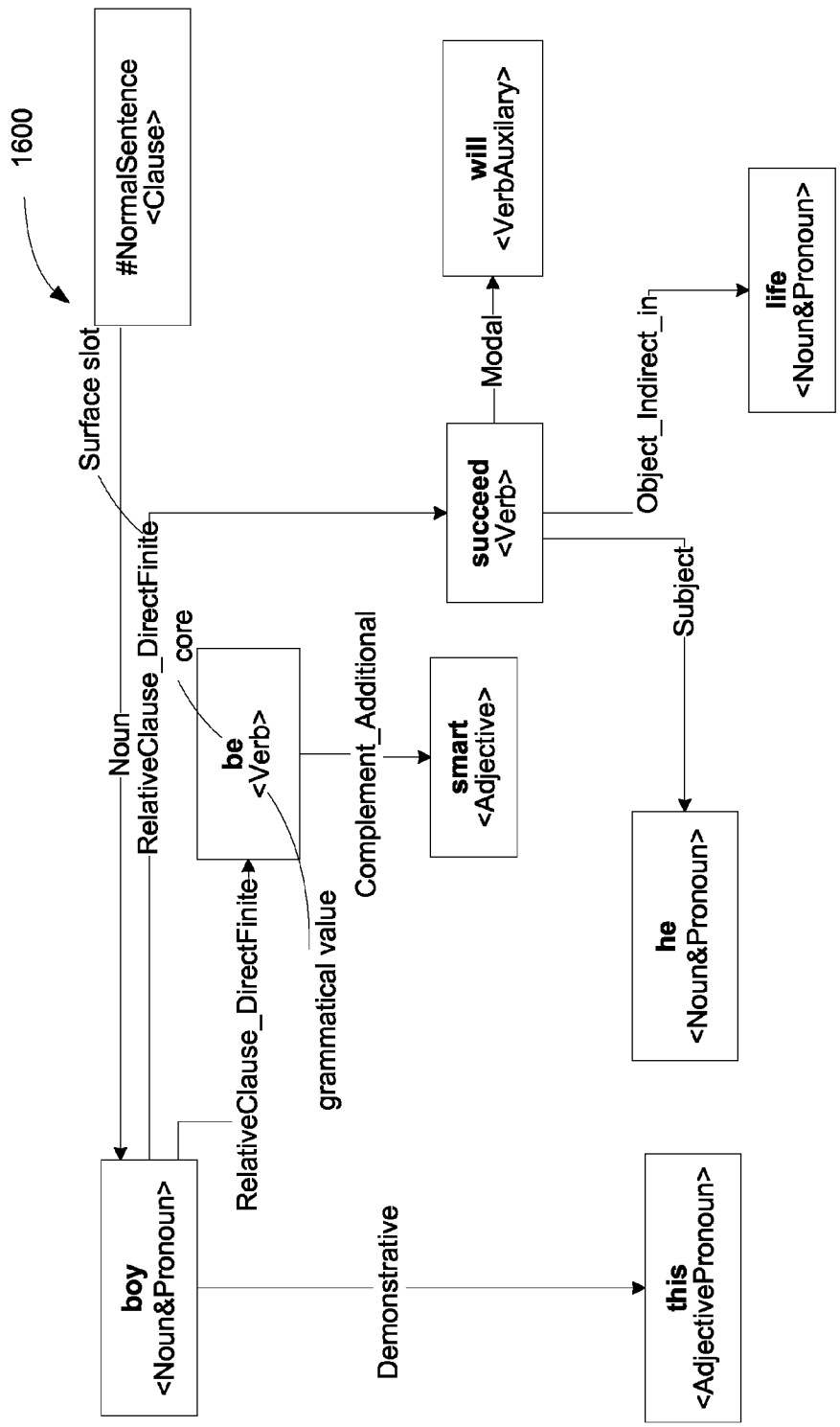
FIG. 16 is an exemplary syntactic tree of the above mentioned sentence "This boy is smart, he'll succeed in life."

FIG. 16 is an example of syntactic tree of the above mentioned sentence "This boy is smart, he'll succeed in life." This syntactic tree is first generated as a result of stage 1460 of generating syntactic trees of the precise syntactic analysis 540 performed on the graph 1300 of the generalized constituents shown in FIG. 13, and can be represented as a subgraph of the graph 1300 of the generalized constituents, according to one or more embodiments of the invention.

A rectangle shows a constituent with the selected lexical meaning of the core and its morphological paradigm in broken brackets, for example, Verb or Noun&Pronoun. The root of the syntactic tree 1600 is a particular value #NormalSentence, which serves as a clause value. The arrows are marked by the names of the surface slots, such as Modal, Verb, Subject, Demonstrative, etc., and for some of the surface slots, the corresponding rating scores are shown.

During the stage 1470, non-tree links are specified for the best syntactic tree 1420. Since, as a rule, non-tree links appear on the syntactic tree, and it is not a tree anymore, it is called a syntactic structure after the stage 1470. Since many different non-tree links may be specified, several syntactic structures with defined non-tree links, i.e., with a fully-defined surface structure, may be obtained. The stage 1470 may result a syntactic structure 1402 with the best rating—the best syntactic structure. During the stage 1470, proforms are inserted into the best syntactic tree 1420, non-tree links are specified, such as by performing ellipsis description 852 and coordination description 854. Additionally, the grammatical agreement between each element of the sentence, which may be as a relationship of control, for example, a controller and a controlled element, using the referential and structural control description 856, is checked. Additionally, syntactic structures 1475 of previous sentences may be used.

Non-tree links are established on the best syntactic tree 1420—the tree of constituents with unambiguously fixed fillers of child slots. However, during the stage 1470, many different non-tree links for the syntactic tree, which may be the best at the current moment, can be generated. Accordingly, several different syntactic structures with non-tree links may be built for each syntactic tree. These syntactic structures or syntactic structure variants generated from different syntactic trees may vary in the inserted proforms, their positions in the tree, and non-tree links To be able to define an antecedent in the previous text, several of the syntactic structures 1475 of previous sentences from the previous syntactic analysis can be saved. The syntactic structure with the best rating is selected as the best syntactic structure 1402. If the stage 1470 is unsuccessful, the returning back 1472 to the stage 1460 is provided to obtain the next-best syntactic tree 1420 with the next value of rating score.

If the stage 1470 of establishing of non-tree links for a sentence is unsuccessful, it may denote that a wrong lexical selection for some words was made. In this case, the list of lexical variants for each word is kept, and then it may be used for defining the topic of the text. After a first pass of analysis is finished, statistic data is processed. During this process 1) new weights of pragmatic classes are calculated; 2) words for which lexical selection can be changed are detected; 3) bonuses to lexical classes for these words are calculated; 4) a list of sentences that should be translated over again is made. After that, a precise analysis of the sentences from the list is executed over again.

Figure 17:
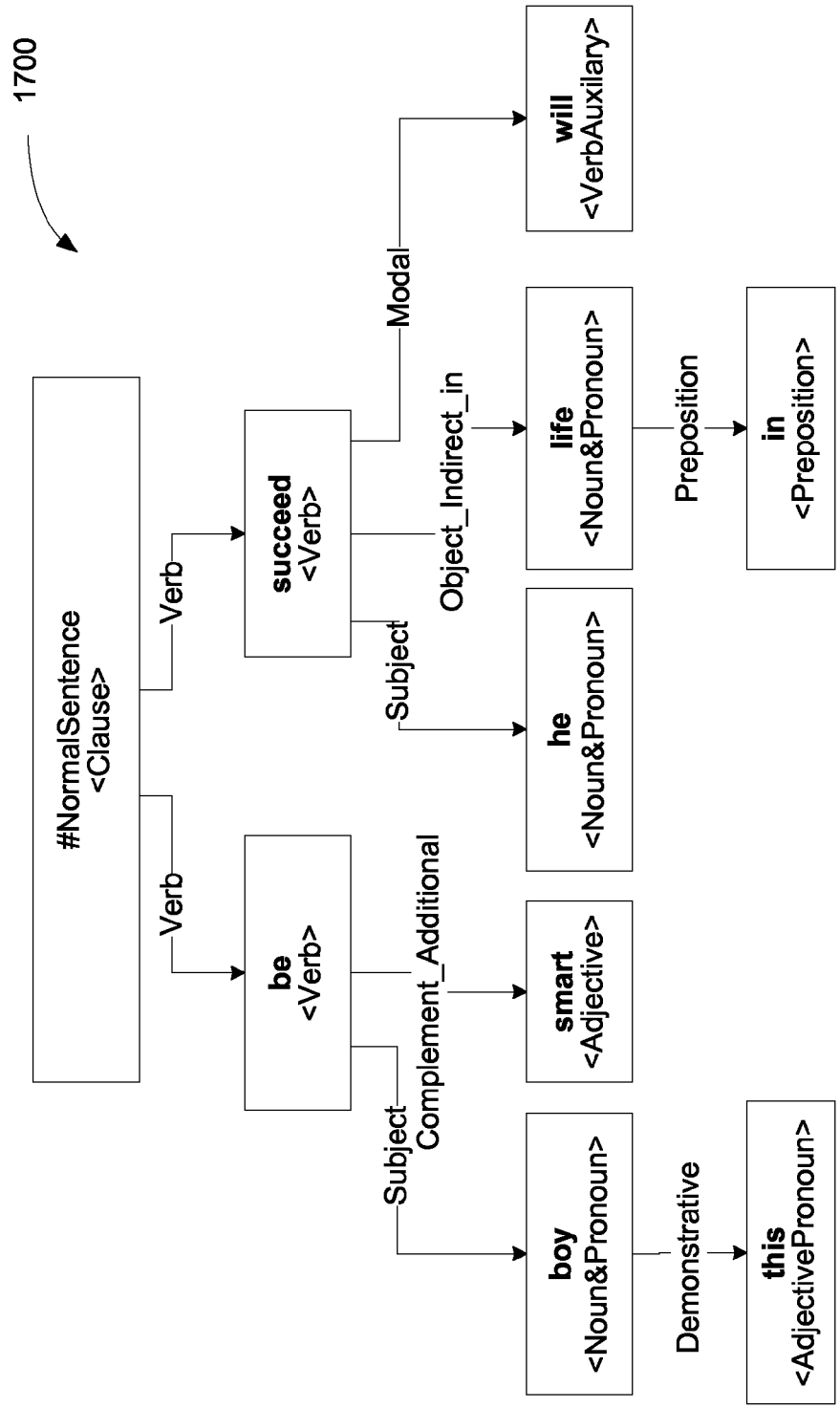
FIG. 17 is a best syntactic tree for the exemplary sentence extracted from the graph of generalized constituents from FIG. 13.

Many other syntactic trees may be generated during a precise syntactic analysis 540. These trees can be generated one after another, when or while the stage 1470 to generate non-tree links on the previous syntactic tree is unsuccessful. The difference between these syntactic trees lies in their structures, filled surface slots for some constituents, and/or the morphological paradigms for some constituents. For example, during the precise syntactic analysis 540 of the abovementioned sentence ("This boy is smart, he'll succeed in life."), the stage 1470 was unsuccessful on the tree 1600 and some other syntactic trees. FIG. 17 shows one of the syntactic trees for the sentence extracted from the graph of generalized constituents from FIG. 13, and it is the first from generated trees which eventuate successfully from stage 1470. The tree 1700 may be considered as the best syntactic tree.

Figure 18:
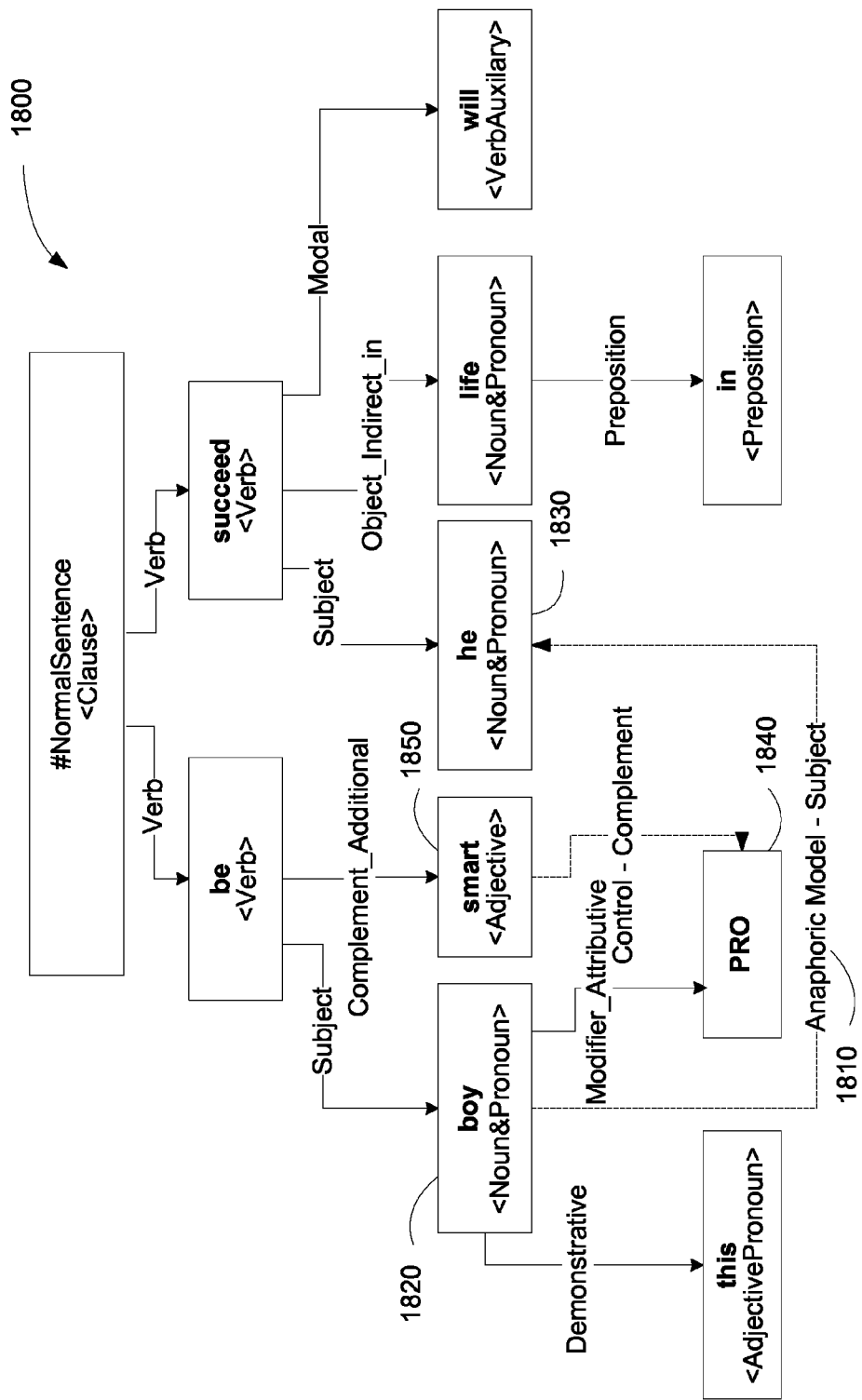
FIG. 18 is an exemplary best syntactic structure for the exemplary sentence with non-tree links generated on the basis of a syntactic tree shown on FIG. 17.

FIG. 18 is one example of a syntactic structure 1402, which is obtained near the end of the stage 1470 for the sentence "This boy is smart, he'll succeed in life." with non-tree links generated on the basis of the best syntactic tree which is shown on FIG. 17. A non-tree link of type "Anaphoric Model—Subject" 1810 is established from the constituent "boy" 1820 to the constituent "he" 1830 to identify the subjects of the two parts of the complex sentence. Additionally, a proform PRO 1840 is inserted to establish a link between the controller ("boy") 1820 and the controlled element ("smart") 1850. As a result, the complement "smart" 1850 fills the surface slot "Modifier_Attributive" 1860 of the controller "child" 1820 by means of a link of type "Control-Complement" 1870.

During the stage 1470, proforms are inserted. For every element of the sentence which can be a controller, its own proform is inserted. If a pronoun (or a proform substituted during the rough syntactic analysis) is controlled, a copy of the pronoun is uniformly made. As a result, every controlled element has a single controller. A controller can have several controlled element variants as different alternatives. Ideally, all available proforms are inserted. However, in the final syntactic tree, there may be only one of the control element variant remained. In addition, the set of meanings for a controlled element may be calculated from the controller; for example, a set of lexical meanings may be taken from the controller, a set of grammatical values may be limited by the agreement rule, etc. In general, the initial mask of a proform results in all the available meanings, whereas the initial mask of a pronoun may permit some meanings, e.g., as restricted by the morphological form of each element of the sentence. For example, after checking with agreement rules, the mask of a pronoun can be empty such that any linking or pairing up between the controller and its proform cannot be established. For example, in some cases, the gender of the controller and the pronoun may not agree; in these cases, only limited numbers of proforms inserted.

At the stage 1470, the possibility to attach the controlled element to the surface slot is determined in a similar way as in attaching a child precise constituent in order to narrow the numbers of the qualified meanings of the controlled element. In general, the parent constituent may be left unchanged for a period of time without changing its grammatical value, and the lexical meaning of the parent constituent may be checked again at a later stage. Similarly, the controller may not be modified until a later stage.

The referential and structural control description 856 contains rules which can generate several alternative controlled elements during the stage 1470. The search for controlled elements can be organized as a call of all the rules in the slots of the syntactic tree which have already been filled. Proforms may be sorted by their quality rating. Proforms which were substituted during the rough syntactic analysis but have not received a controller can be deleted from the syntactic structure.

During the stage 1470, for every syntactic tree, a best syntactic structure with attached non-tree links can be generated, as a result. If no valid non-tree links have been generated, the syntactic structure of the best syntactic tree 1420 may be invalid. In this case, the second-best syntactic tree 1420 may be analyzed. If non-tree links have not been successfully established, a returning back 1472 to the stage 1460 is provided to obtain the next syntactic tree, which may have a different rating score, for generating another syntactic structure with non-tree links as the best syntactic structure. If none of the returning backs 1462 and 1472 for the precise syntactic analysis 140 is successful, the returning back 544 to the rough syntactic analysis 530 is provided. Additional rough syntactic analysis 530 can be performed with additional consideration of any syntforms which may not have been analyzed previously.

As a result of the rough syntactic analysis 530 and the precise syntactic analysis 540, the syntactic structure with specified surface and deep slots is built. There may be some ambiguity left in grammatical values. The syntactic structure represents a full syntactic analysis of the sentence, indicates its surface and deep slots, and lexical meanings which have been unambiguously selected by this stage. Presence of non-tree links in the sentence determines, in the general case, generation of several different final structures according to different variants of establishing non-tree links Final syntactic structures are sorted in the order of descending rating.

Figure 19:
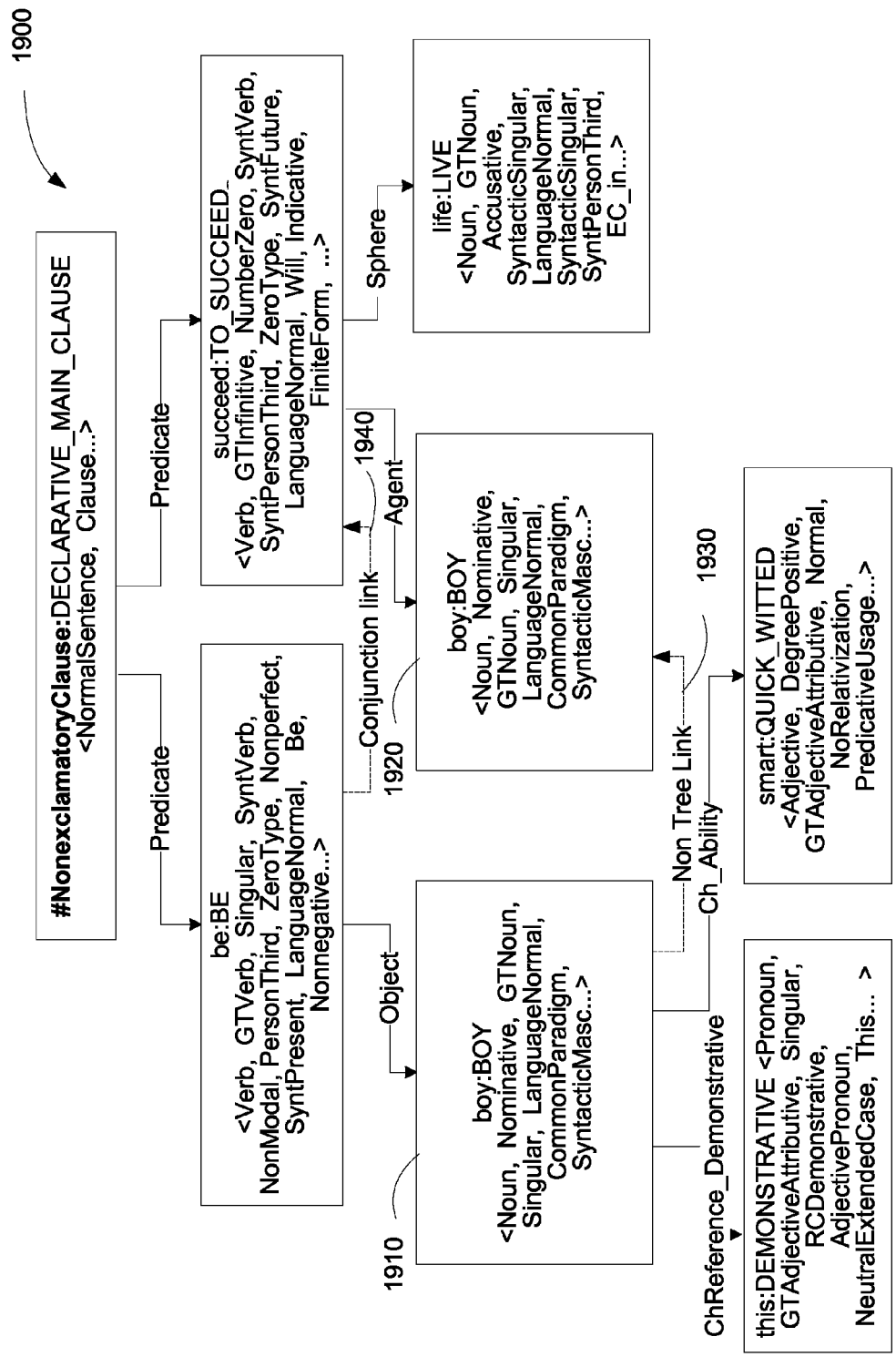
FIG. 19 is one example of the best syntactic structure with semantic parents of lexical meanings and their grammemes, non-tree links generated and deep slots for the exemplary sentence.

FIG. 19 illustrates a best syntactic structure 1900 with semantic parents of lexical meanings and their grammemes generated for the sentence "This boy is smart, he'll succeed in life." during the precise syntactic analysis 540. The best syntactic structure 1900 contains non-tree links 1930 and 1940, the lexical meanings 1012 with semantic classes as their semantic parents (1002), and their grammatical values 1008. The semantic parents of the lexical meanings are shown by means of a colon and capital letters, for example, "life: LIVE". Grammatical values are displayed in broken brackets. Because the deep slots have already been determined in the end of precise analysis 540, instead of the surface slots the corresponding deep slots are displayed in FIG. 19: Agent, Locative, Agent, etc. To identify the elements "boy" 1920 and "he" 1930 by means of the non-tree link 1930, as it was displayed in FIG. 19, the element "boy:BOY" 1910 is copied to the element 1920, keeping the morphological value "Pronoun" in its grammatical value.

Semantic Analysis

Figure 20:
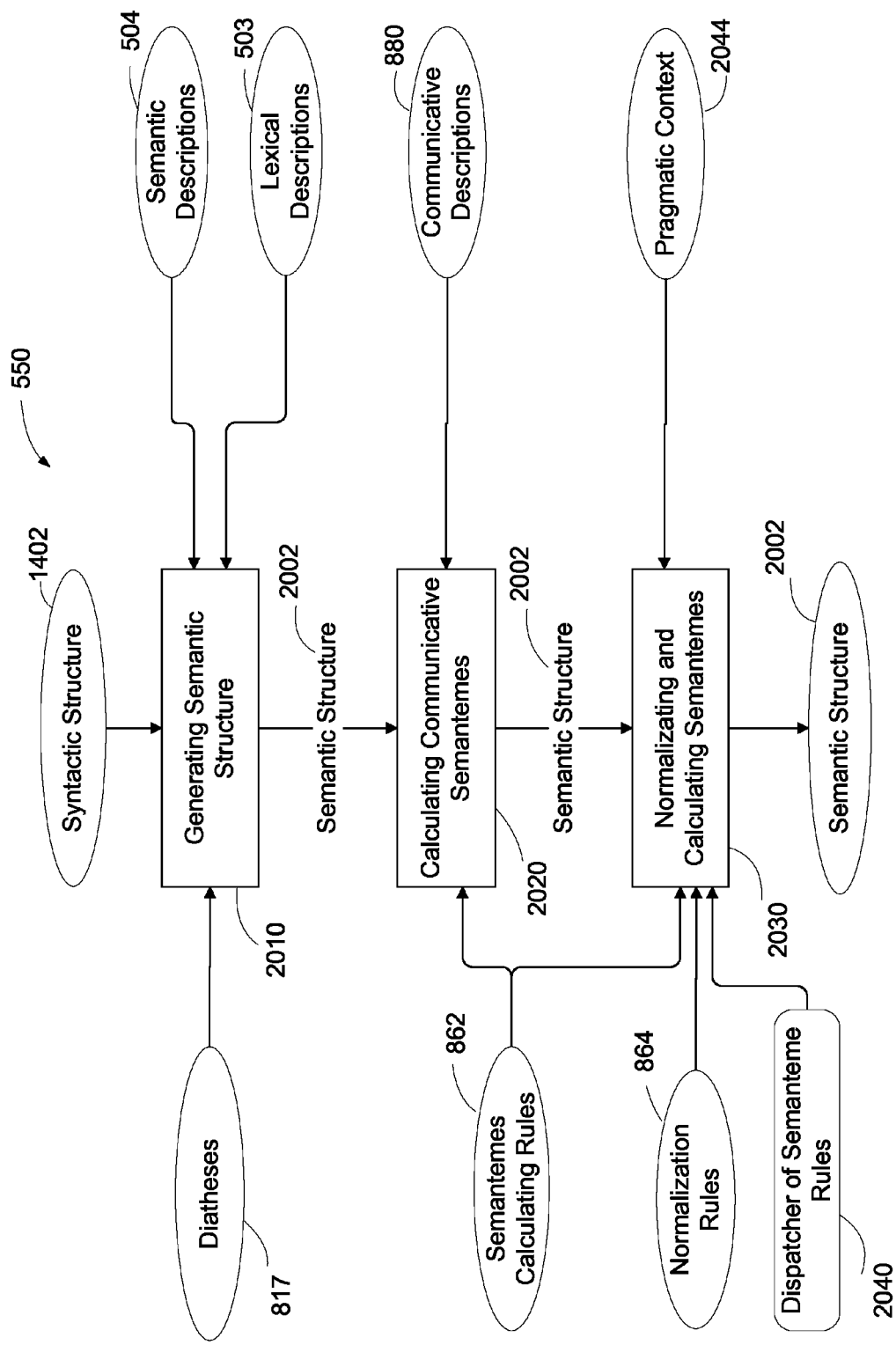
FIG. 20 is a process flow diagram illustrating semantic analysis according to one or more embodiments of the invention.

As shown in FIG. 5, the semantic analysis 550 is performed after precise syntactic analysis 540 when one or more the syntactic trees are formed and the best one with the highest rating score found. FIG. 20 is an exemplary process flow diagram illustrating the semantic analysis 550 according to one or more embodiments of the invention. During semantic analysis 550 a semantic structure 2002 of the source sentence 112 is build. The resulting semantic structure 2002 of the source sentence 112 is built from the best syntactic structure 1402 according to various applicable analysis rules. Constituents for the semantic structure 2002 are constructed by applying diathesis correspondences between the surface (syntactic) and deep (semantic) slots of the constituents from the syntactic structure 1402 and by applying the rules of semantic interpretation of the grammatical values of the constituents against a set of semantemes of various semantic categories. In one aspect, the semantic structure 2002 includes a tree of deep constituents, each deep constituent having one semantic class.

The language-independent semantic structure 2002 is generated during the semantic analysis 550 using the diatheses 817, the deep models 912, the analysis rules 860 (such as semanteme calculation rules 862 and normalization rules 86corrected/mjc, semantic descriptions 504 and lexical meanings descriptions 503 of the source language as well as pragmatic context 2044 (as part of pragmatic descriptions 940) and communicative descriptions 880. The semantic analysis treats the syntactic structure of a sentence in any language as a surface representation of a language-independent semantic structure.

A semantic structure 2002 is built from the selected syntactic structure 1402 by performing steps 2010, 2020, 2030 of generating semantic structure, calculating communicative semantemes, and normalizing (normalizing) and calculating semantemes, among others. The syntactic structure 1402 as the input data of the semantic analysis 550 may include specified deep slots and selected lexical meanings, the semantic structure 2002 may be generated by substituting each lexical meaning in the source language with its language-independent semantic class and confirming the linear order of the all the lexical meanings. Once the linear order is confirmed, the surface slots can be deleted when generating the semantic structure 2002 since only the deep slots 914 and deep slots descriptions, etc., are remained during the building of the semantic structure 2002.

During the semantic analysis 550 to transform the syntactic structure 1402 into the semantic structure 2002, deep correspondences for structural elements of the syntactic structure 1402 are established, the grammatical values of the constituents from the syntactic structure 1402 are interpreted against semantemes to represent language-independent semantic meanings, each lexical meaning is substituted with its language-independent semantic class, and semantemes with semantic features are generated. The resulting semantic structure 2002 is a tree (containing established non-tree links), with language-independent semantic classes as nodes and a set of semantemes and deep slots as branches.

During the step 2010, the semantic structure 2002 is generated from the best syntactic structure 1402 using the semantic descriptions and the lexical descriptions 503, and the diathesis correspondences 817 between the surface slots 815 and the deep slots 914 for each constituent of the syntactic structure.

At the step 2020, communicative semantemes for constituents in the semantic structure 2002 are calculated using semantemes calculating rules 862 and communicative descriptions 880. The semantemes calculating rules 862 can be used to semantically interpret the grammatical values of the constituents against a set of semantemes of various semantic categories. Once the communicative semantemes are calculated at step 2020, all other semantemes can be calculated, replacing grammemes with the resulting calculated semantemes. The communicative semantemes are used to express the communicative properties of a sentence, such as the standard linear order, the inverse linear order of a relative clause, or the linear order of an interrogative sentence.

At the step 2030 semantemes are normalized and further calculated. The pragmatic context 2044 and the analysis rules 860, such as the semantemes calculating rules 862 and normalization rules 864, may be used during semantemes normalization to remove language asymmetries. The semantic normalization rules 864 are applied to remove language asymmetries. For example, "all of any of the following functions" can be normalized to "all of the following functions". As another example, "each of all of us" can be normalized to "each of us". As still another example, "He can do it, can't he?" can be normalized to "He can do it."; since the deep slot of TagQuestion is filled and saved in the semantic structure, the constituents "can't he" are removed.

The semantic normalization rules 864 are lexicalized and linked to specific semantic classes and lexical meanings. There are two types of the semantic normalization rules 864: rules to be used prior to calculating the semantemes for generating the semantic structure 2002; rules to be used after calculating the semantemes. A semantic class is connected with ordered lists of transformation rules of the first and second type. Thus, the semantic normalization rules 864 can be used prior to calculating the semantemes and after calculating the semantemes using the respective semantic normalization rules 864.

In general, rules used during the semantic analysis 550 are applied to the constituents of the semantic structure 2002 from the top down, from a parent constituent to child constituents. A constituent is analyzed with rules connected to the semantic class of its core, in the order of description. Rules connected with a certain class are used for all its children. In a child class there is a possibility to re-define inherited rules: add new rules, change the order of application, forbid inherited rules, etc.

The normalization rules 864 are applied to the semantic structure and modify it. Some of the semantemes calculating rules 862 may be used cyclically as long as their conditions are met. Use of semantemes calculating rules 862 leads, in particular, to substitution of language-dependent characteristics, grammemes, with universal characteristics—semantemes.

When the semantemes for different constituents are calculated at the step 2030 of normalizing and calculating semantemes, an additional procedure may be used. A semantemes calculating rule can check the presence of certain semantemes of other constituents. Such a rule can only work after all the semantemes which are specified in this rule have been calculated. To cope with this situation, the rules are started from the child constituents to the parent constituents. If a production refers to constituent semantemes which have not yet been calculated, the rule stops with a special value which says that the rule completion must be postponed. A traversal of the tree from the top down is made, starting the rules which were postponed at the first stage. Once again, a traversal of the tree from the child constituents to the parent is made by starting the rest of the postponed rules.

The result of the semantic analysis 550 is the semantic structure 2002 of the source sentence built from the best syntactic structure 1402 according to rules for the semantic analysis 550. A semantic structure, unlike a syntactic structure, uses universal language-independent concepts and components, such as semantic classes, semantemes, deep slots, among others.

As shown in FIG. 20, a dispatcher 2040 for dispatching semanteme rules is adapted to execute the normalization of the semantic structure 2002 and calculating semantemes by applying the analysis rules 860. As a result, every lexical meaning in the semantic structure 2002 is substituted with its universal parent—a semantic class. Any possible differences of the child lexical meanings are saved in a list semantemes generated during the application of the analysis rules 860. A description of a constituent in the final semantic structure 2002 includes semantic classes which are parents for lexical meanings represented in the best syntactic structure 1402, semantemes which are calculated according to the analysis rules 860 or assigned to corresponding parent semantic classes, and child constituents. When there is a link to a child constituent, the deep slot that can be filled is specified. The semantic structure 2002 is language-independent and may include, but is not limited to, a tree of deep constituents, deep constituents, and semantic classes which are the fillers of deep slots. Accordingly, the semantic structure 2002 can be applied to describe the meanings of a sentence from any natural or artificial languages.

Figure 21:
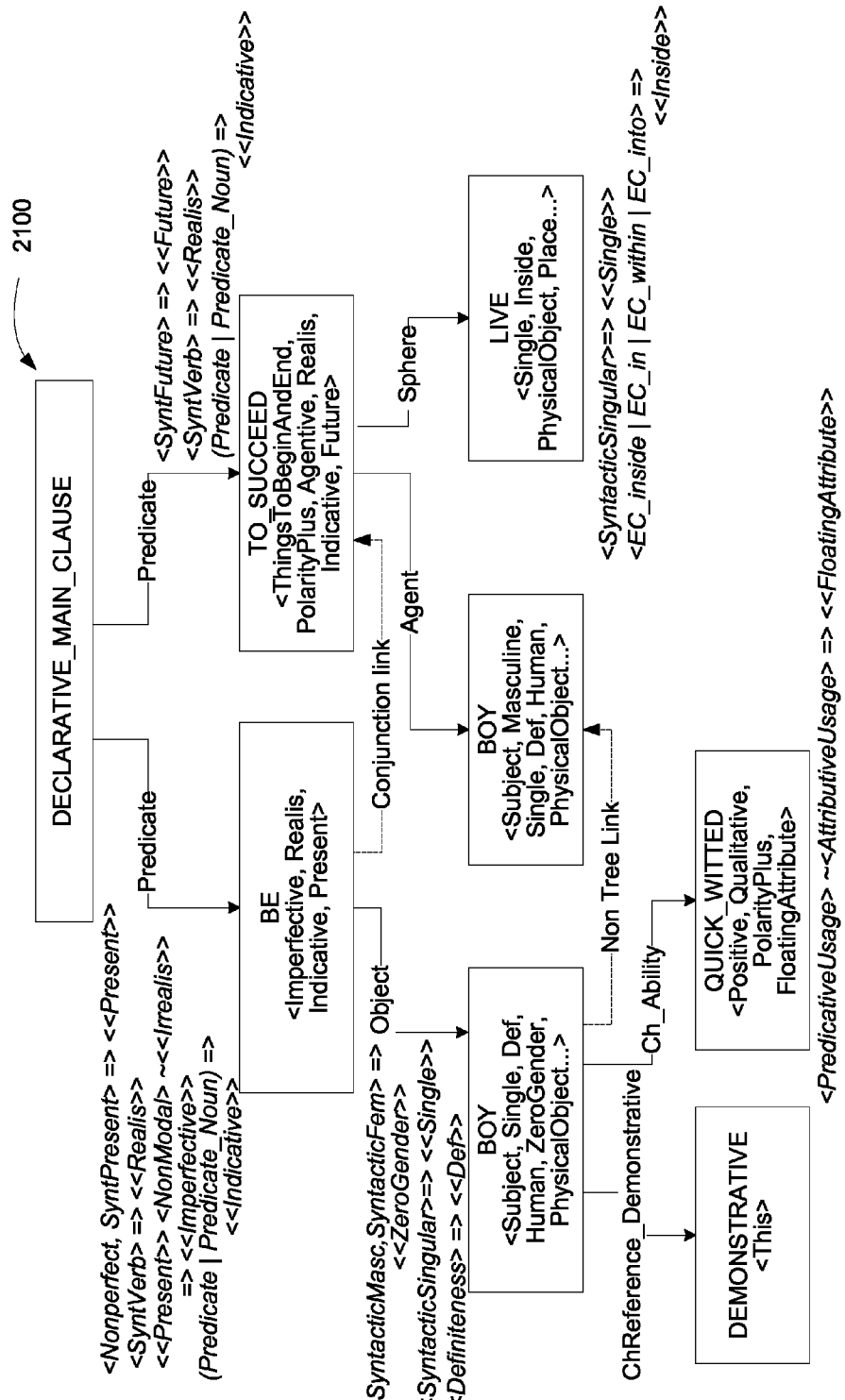
FIG. 21 is an exemplary semantic structure with semantemes and exemplary analysis rules according to one or more embodiments of the invention.

FIG. 21 illustrates an exemplary resulting semantic structure 1700 of the sentence "This boy is smart, he'll succeed in life." The deep constituents are represented by rectangles with a semantic class indicated inside, for example, DECLARATIVE_MAIN_CLAUSE, TO_SUCCEED, BOY, LIVE, etc. The semantemes which are calculated after applying the analysis rules 860 are displayed in broken brackets for each semantic class. For example, <Imperfective, Reals, Indicative, Present> is the semantemes for the node with semantic class BE 2110. Some of the applied analysis rules are displayed near rectangles with the semantic class. Deep slots are represented as arrows and named; for example, Object, Agent, Locative, etc. Non-tree links are represented as dotted arrows.

Natural Language Sentence Synthesis

Figure 22:
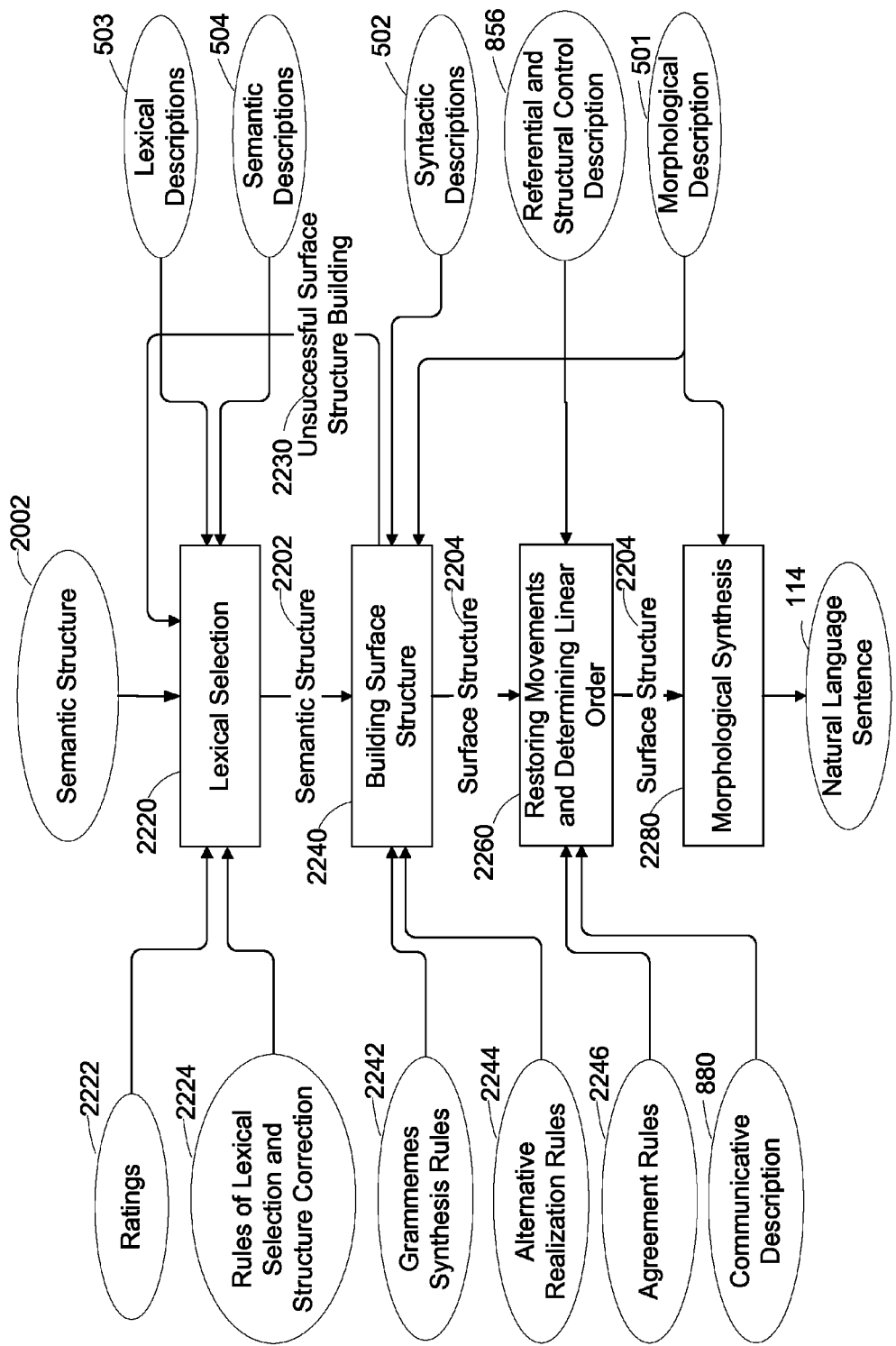
FIG. 22 is a process flow diagram illustrating an output natural language sentence synthesis according to one or more embodiments of the invention.

FIG. 22 illustrates one example of a method 2200 exemplifying process flow diagram of synthesis 560 of an output natural language sentence. The step is illustratively described below can be configured to generating a surface syntactic structure of a sentence in an output language from a language-independent semantic structure, such as a language-independent semantic structure generated after analyzing a source sentence in a source language. However, it should be understood that the invention has utility in other system configurations, such as other computer systems, algorithms, and any other data processing systems, including those systems configured to analyze, generate, and/or translate language sentences and language descriptions.

The method 2200 for generating a natural language sentence 114 in an output language may include a step 2220 of performing a lexical selection on a semantic structure 2002, a step 2240 of building a surface structure 2204 of a sentence to be generated from the semantic structure 2002 with selected lexical meanings, a step 2260 of restoring movements and determining linear order on the surface structure 2240, and a step 2280 of performing morphological synthesis on the surface structure 2204 in the output language.

For a semantic structure 2002, the lexical selection 2220 and building 2240 a surface structure are performed, and for the obtained surface structure 2204 of a sentence to be generated restoring 2260 movements and determining the linear order are performed, and the morphological synthesis 2280 is executed to generate the output sentence 114 in any natural language, for which all the necessary language descriptions have been created. The output sentence must express that meaning (sense) in the given natural language, which is represented by the source language-independent semantic structure. All these method steps may be performed by the methods, software, algorithms, computer systems, computer-readable media, and devices according to embodiments of the invention. For example, each of these method steps thereof can be adapted to be stored as software, algorithms, and computer-readable media, or alternatively, within computer systems and devices. As another example, one or more algorithms, computer systems, or subsystems can be used to perform one or more method steps as described in FIG. 22.

Lexical selection 2220 is selecting one or more lexical meanings for a deep constituent core. Any constituent has a word at its core and can include child constituents at lower levels. As a rule, the grammatical, syntactical and morphological properties of the deep constituent, expressed by means of a set of semantemes, are the same as the properties of its core. At the step of the lexical selection 2220 in the semantic class of the core the lexical class of the target language is selected. As lexical meanings 1012 in lexical description 503 have their semantic values 1010 which are also expressed by means of a set of semantemes, and those lexical meanings in the semantic class are selected, which have a most number of semantemes of the constituent core.

Also, deep models 912 as a part of semantic description 504 are used at the step of the lexical selection 2220, because semantic classes of the fillers of the child and parent deep slots are taken into account. Accordingly, those lexical meanings in the semantic class are selected, which have deep slots, and those semantic classes of deep slot fillers in their deep models 912, which correspond to the deep slots and semantic classes of deep slot fillers of the constituent core.

As a rule, for the cores only those lexical meanings are selected which are linked to the semantic class in the semantic hierarchy 910 by means the relation of mutual semantic representability. The mutual semantic representability means that it is possible the transition not only from the lexical meaning to the semantic class, but from the semantic class to the lexical meaning. Any semantic class always has at least one such lexical meaning-representative in the given natural language.

Additionally, various ratings 2222 may influence on the lexical selection 2220, such as, rating of the lexical meaning, rating of the deep slots filling, ratings of identifying word-combinations, ratings of deep slots correspondences, bonus for derivational semantemes, rating of correspondence to the local and global pragmatic context, rating of correspondence to the terminological sphere, rating of correspondence to the previous selection. Pair ratings may take into account not only the relations between the parent and child constituents but non-tree links too. Since there may be many lexical meanings meeting the conditions of lexical selection 2220, lexical meanings having a best rating are selected at first.

As a rule, at the step of lexical selection 2220 among lexical meanings actually the one or more is selected, which realizes the most semantemes assigned to the constituent core, on the basis of ratings 2222 of lexical meanings and ratings of pair correspondence. There are cases, however, when the rules 2224 of lexical selection and structure correction have to be used. These rules are used when the semantic structure needs correction in order to overcome the asymmetries between the universal semantic description and the language-specific syntactic structure. Rules 2224 of lexical selection and structure correction are connected with deep slots 914 and transform a sub-tree with the current constituent at the top. During this process the rules can substitute a new parent constituent.

The semantic structure correction rules may be used during the lexical selection in the case when the algorithm of selection of the lexical meaning for a semantic class cannot be described with the standard means, for example, during the lexical selection the system has to take into account the deep slot to be filled, or the semantic class of the child constituent, etc. For example, the rule for the English language named SingleChoice, containing the instructions: <<Elective>>=>"single one:SOLE"; <<ZeroElective>>=>"single:SOLE"; allows the system to make a selection of the lexical meaning "single one" from the semantic class "SOLE" if the semanteme of electiveness is assigned to the constituent, or of the lexical meaning "single" if this semanteme is not assigned. Since the category of electiveness is calculated and not assigned in the lexical description 503, this selection condition cannot be described in the semantic hierarchy 910 but can only be specified with the help of the rule 2224 of lexical selection and structure correction.

As another example, when the rules 2224 of lexical selection and structure correction may be used, the deep structure of a certain language differs from the "normalized" language-independent structure, for example, it has an additional constituent or a different direction of government between its constituents, etc. For example, suppose a universal semantic structure has a constituent which has the semantic class "NEWS" as its core and a child constituent filling the "Quantity" deep slot. In order to synthesize the syntactically and stylistically correct English phrase "two pieces of news", the following structure correction rule may be used: "NEWS" [Quantity: x, ?y]=>new "piece:CLASSIFIER" [QuantifiedEntity:this][x][y], which transforms the tree in such a way that the parent constituent has the piece:CLASSIFIER" lexical meaning, while "NEWS" becomes the child constituent and fills the QuantifiedEntity slot of the parent constituent.

If the rules 2224 of lexical selection and structure correction are applied, the lexical selection 2220 may entail the transformation of the semantic stricture 2002; besides, the rule may change the deep properties of some constituents, such as, semantic value, semantic class of the core, etc. These rules are lexicalized, i.e., they are connected with (assigned to) certain objects of the semantic hierarchy 910 and are only called when such an object is the core of the initial constituent.

As a result, during the lexical selection 2202 the source semantic structure 2002 may be transformed and each constituent has one or more lexical meaning selected for its core. On such specified semantic structure 2002 with specified lexical meanings of the constituents the building 2240 the surface structure is performed. As shown on FIG. 22, various specific language descriptions, such as, syntactic description 502, referential and structural control description 856, grammemes synthesis rules 2242, alternative realization rules 2244, and agreement rules 2246, among others, may be used during the building 2240 the surface structure.

The surface structure 2204 is built by means of a top-down traversal of the semantic structure. During this traversal, semantic, lexical and syntactic properties of each constituent are specified more accurately, and, first of all, the surface slots corresponding to the deep slots are determined, the linear order is defined, movements are restored, structural and referential control are checked.

Figure 23:
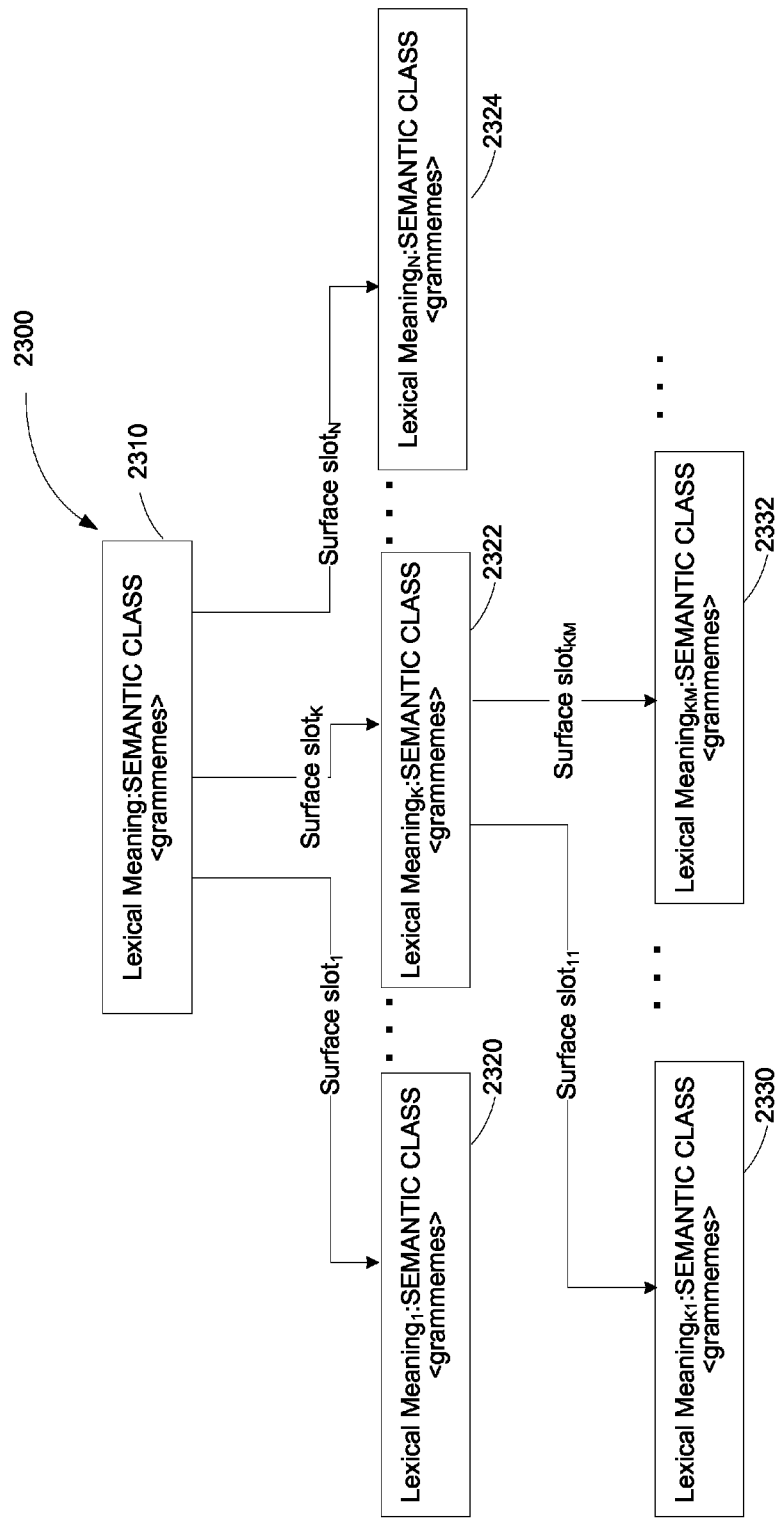
FIG. 23 is a diagram exemplifying various components of a syntactic structure of synthesized sentence according to one or more embodiments of the invention.

FIG. 23 is a diagram schematically illustrating the idea of a surface structure 2300 of a synthesized sentence according to one or more embodiments of the invention. In FIG. 23, constituents of the surface structure 2204 are shown as rectangles, arrows show filled surface slots. A constituent has a lexical meaning at its core with its semantic parent (SEMANTIC CLASS) and can have smaller constituents of the lower level attached in some surface slots. This attachment is shown by means of arrows named Surface Slot. Each constituent may also include syntactic values and grammatical values, expressed via the grammemes of the syntactic categories thereof. These grammemes are the properties of the syntactic forms selected for the constituent during the building 2240 the surface structure.

Since any lexical meaning 1012 in its lexical description 503 has a deep model 912 and a surface model 810 connected by means of diatheses 817, for each lexical meaning corresponding to the constituent core, the following actions may be performed. For each deep slot of the parent constituent in its diathesis all surface slots are searched for which meet the diathesis restrictions. At least one slot may be found. If no slot has been found, the returning back 2230 to the stage of lexical selection 2220 is provided, and the lexical meaning which has the next-best rating in the semantic class is selected.

Since there may be many surface slots 815 meeting the conditions of diatheses 817 for each lexical meaning 1012, each of these surface slots may be considered as a hypothesis related to a surface structure of a corresponding constituent. Such hypothesis may have a rating. Those hypotheses that may result in a best rating are served at first. For each surface slot 815, syntactic forms 812 which meet the requirements of the surface slot are searched for. If a suitable syntactic form has not been detected, this hypothesis is penalized by means of rating reduction. An additional rating for the correspondence of the semantemes of the part of speech and the grammatical type to the corresponding grammemes of syntform 812 for each hypothesis is calculated.

The hypotheses about surface structure of a constituent are analyzed during building 2240 the surface structure in the order of descending rating. If a suitable syntactic form for an analyzed hypothesis isn't found, an alternative realization rule 2244 may be applied. Such rule is applied if the lexical meaning which during lexical selection 2220 is selected hasn't suitable grammatical forms. Alternative realization rules 2244 usually substitute some semantic class as the parent constituent and/or transform the semantic structure 2002 what enable to build the surface structure with another lexical meaning.

Alternative realization rules 2244 are lexicalized, i.e., they are connected with (assigned to) certain objects of the semantic hierarchy 910 and are a part of lexical description 503. If some alternative realization rule 2244 was applied and its application has resulted in the substitution of a semantic class or a new lexical meaning as the parent constituent, this hypothesis is removed from the queue of hypotheses, all the previous step (searching for syntax forms) are repeated with it, and thus new hypotheses are generated. These hypotheses are added to the list of hypotheses, and ratings of the hypotheses are taken into consideration. The repeated lexical selection is performed as follows: the lexical meanings which have a syntactic form which is suitable for the parent surface slot, and the lexical selection 2220 in the sub-tree of this constituent is started.

During building 2240 the surface structure, grammemes synthesis rules 2242 are applied. Grammemes synthesis rules 2242 calculate grammemes, representing grammatical and morphological values of a constituent, on the basis a set of semantemes, taking into account the initial grammatical value of the lexical meaning, parent surface slot and syntactic form. As a result of these rules applying, semantemes may be substituted by grammemes. Generally, this rules may have a production form, a left part of the rule describing a condition of the rule applying—one or more semantemes and, additionally, surface slot name, which a constituent must have, and a right part of the rule containing one or more grammemes, which the constituent are assigned as result of the rule applying. As the order of the grammemes synthesis rules 2242 applying may be determined by presence not only some semantemes, but grammemes too, so, not only semantemes but, additionally, grammemes may be included in the condition of a rule applying.

The grammemes synthesis rules 2242 allow the system to detect a grammatical value of the lexical meaning which realizes as many semantemes as possible, and to calculate the value of all semantic grammatical categories. Each applied rule determines more accurately the grammatical meaning of the constituent as it is written in the applied productions. If a production tries to assign to a constituent a grammatical value that contradicts the value that the constituent already has, such a production will not work even if its requirement is met by the current constituent.

Semantemes may be realized not only grammatically but also lexically, namely by substitution of the parent or child constituents. Some semantemes may be realized only by means of substituting auxiliary words into the parent constituent, for example, modal or auxiliary verbs. In this case, the rule creates and substitutes a new parent constituent. The new parent constituent contains a semantic class which is attached to a slot of the initial parent constituent. Additionally, the rule must move the semantemes which must be realized by the syntactic form of the substituted parent constituent (for example, aspect-tense) to the parent constituent and delete these semantemes from the current constituent. The rule must attach the current constituent to the deep slot of the substituted parent constituent. For the semantic class of new parent constituent the lexical selection 2220 in the sub-tree of this constituent is executed.

During building 2240 the surface structure, for each hypothesis about surface structure of a constituent all syntactic forms which correspond to the calculated grammatical value are detected, and each hypothesis is considered separately for each detected syntactic form. Each separated in such a way hypothesis is verified according to morphological description 501 whether the core of this constituent can be synthesized on the basis of its partially calculated grammatical value. If this cannot be done, the hypothesis is deleted. A preliminary rating for each hypothesis is calculated and they are arranged in the order of descending rating scores.

The syntactic forms are analyzed in the order of descending rating. If a constituent has deep slots which are filled without diathesis correspondence, a corresponding alternative realization rule 2244 is called for each such slot. This algorithm may be performed recursively for each child constituent. During backward recursion the structure control rules (they are a part of referential and structural control description 856), related to the surface slots of this constituent, are checked, and, if the control rule has not detected a suitable non-tree link, the constituent is deleted. Otherwise, the movements which are described in the surface slots of this constituent are restored. If the movement cannot be restored, the constituent is deleted.

In the end of the considering of each hypothesis about surface structure of a constituent final rating of the hypothesis is calculated. If the final rating of the current hypothesis is higher than the preliminary rating of the next hypothesis, the search is stopped. This algorithm of building 2240 the surface structure is a two-level search with independent selection and filtering at each level. At the upper level hypotheses are generated and assigned their ratings. These hypotheses consist of three components: lexical meaning, surface slot, and syntactic form. At the lower level hypotheses corresponding to specific syntactic forms are analyzed. The best hypothesis is represented by a best surface structure, which is a tree (best surface tree), the nodes of which are constituents with selected lexical meanings and corresponding syntax forms and the branches are the surface slots. As a result of the step 2240, the surface structure of the sentence to be generated with the best rating is build.

Figure 24:
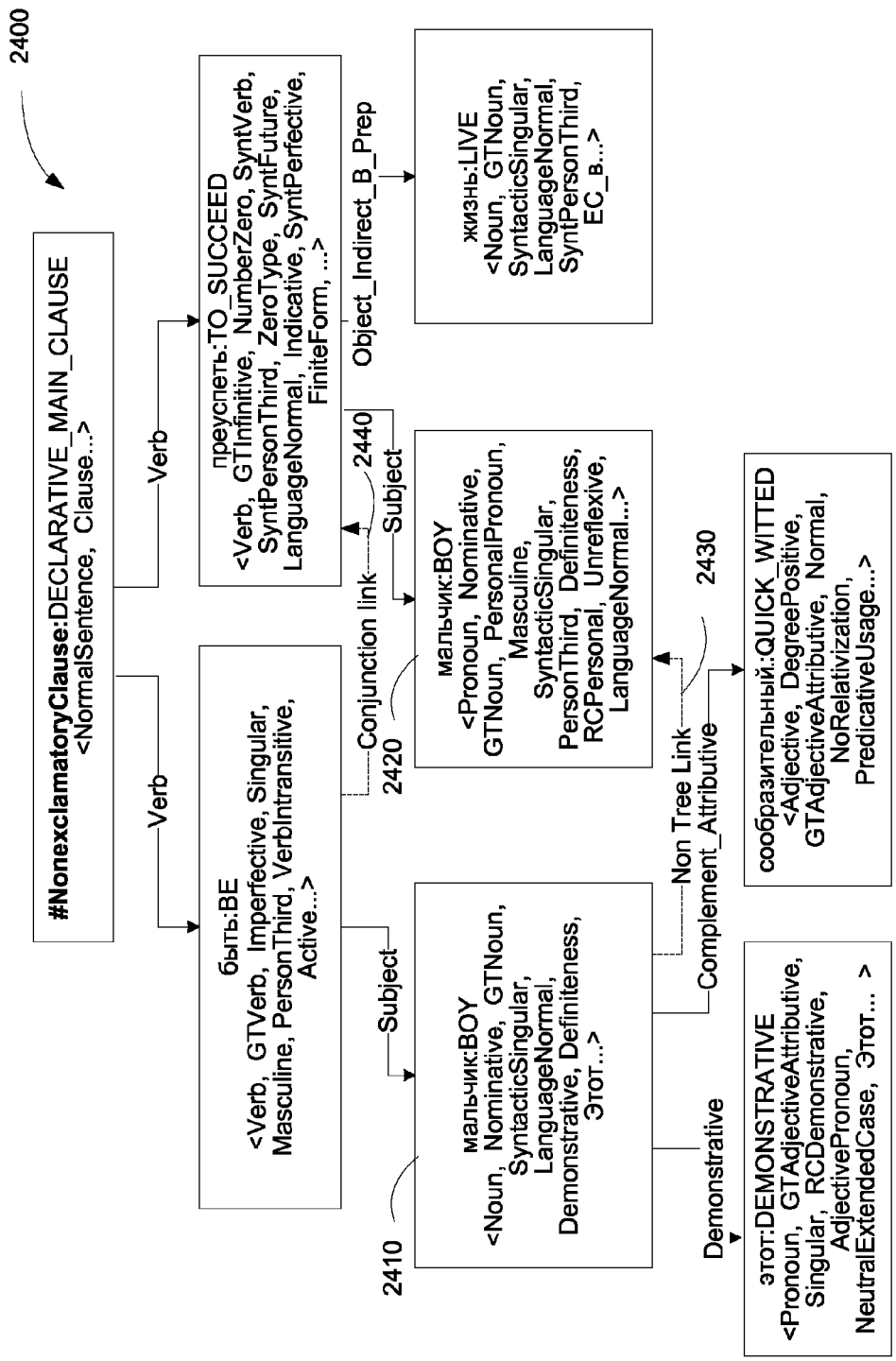
FIG. 24 is an exemplary surface (syntactic) structure for a synthesized Russian sentence which correspond to English sentence "This boy is smart, he'll succeed in life." according to one embodiment of the invention.

FIG. 24 is an exemplary best surface (syntactic) structure of the Russian sentence which is obtained as result of translating the English sentence "This boy is smart, he'll succeed in life." according to one embodiment of the invention on the basis of the semantic structure which is shown on FIG. 21. Restoring 2260 movements and determining the linear order is performed for the best surface structure. During this step referential and structural control is checked and movements are restored. The relations of control may be represented in the surface structure by means of non-tree links Some non-tree links may be described in the semantic structure 2002, for example, in case, when the semantic structure 2002 was obtained as result of analysis of some sentence. The movements may be represented in the surface structure by means of non-tree links too, or otherwise, corresponding non-tree links may be restored by means of special structural control rules.

A movement is a phenomenon of various natural languages. The movements which must be restored, may be of different types, such as, communicative movements (subject rise, cleft-constructions), stylistic movements (object rise), grammatical movements (relativization, interrogatory sentences, etc.), among others. Accordingly, the different types of movement may express different communicative or stylistic aspects, for example, to mark out the focus or emphasis of the sentence to be generated. This may entail a modification of a linear order. As a result, the sentence to be generated may be more colloquial and close to real time situation and a natural language. For example, the sentence "John is a good boy and it seems that John loves Mary." may be generated, but "John is a good boy and seems to love Mary." is more real and spoken, and the later may be generated through movement of "John" because of a co-ordination.

The other example of sentence which may be generated from the language-independent semantic structure formally following the English language rules is "I've met a boy my sister likes [whom]." This sentence may be transformed into more usable variant "I've met a boy whom my sister likes." by movement of "whom".

The referential and structural control description 856 is used in non-tree links generation, during which proforms may be inserted, non-tree links may be established, and all rules of correspondence between the controller and controlled object are checked. Structural control check allows filtering out wrong surface structures. The relations between the controlling constituent—controller—and the constituent controlled by it are checks. For example, a verb attribute of a noun phrase can generally be expressed by a participial clause or a relative clause. This element (the verb attribute) is represented in surface structure by auxiliary element named a proform which is inserted by a structure control rule and may be controlled by the noun phrase. If the controlled proform is related to the subject, both the variants are possible, otherwise only a relative clause is possible. An attempt to use a participial clause in order to realize a verb attribute of a noun phrase in the control rule fails, and thus such a variant is discarded. Non-tree links which have not been interpreted by structure control rules get interpreted by referential control rules at the corresponding proforms. Consequently, every lexical meaning connected with a proform may have its referential control rule.

The non-tree links on the surface (syntactic) structure for the Russian sentence which is obtained as result of translating the above mentioned English sentence "This boy is smart, he'll succeed in life." according to one embodiment of the invention are shown on FIG. 24. The non-tree links are shown as dotted arrows. These non-tree links may be kept in the language-independent semantic structure, for example, in the case when this language-independent semantic structure was obtained as result of analysis of the sentence in the same or another natural language. In the other case, the non-tree links may be restored according the referential and structural control description 856. A non-tree link of type "Anaphoric Model—Subject" 2410 is established from the constituent " мальчик :BOY" 2420 to the constituent " мальчик :BOY" 2430 to identify the subjects of the two parts of the complex sentence. Additionally, a non-tree link of type "Conjunction link" joins two parts of the complex sentence.

Additionally, determining precise values of relational grammatical categories is executed. The relational grammatical categories may express grammatical properties of a child constituent, such as a gender, a number and so on, which depend on properties of the parent constituent. The agreement rules 2246 are used for determining precise values of relational grammatical categories. Sometimes for a full and unambiguous determining a grammatical meaning, control rules have to be taken into account. For example, there is not enough information in the surface structure 2204 to generate sentences "I met Mary with her daughters.", or "I met John with his daughters.", or "I met the Smith couple with their daughters." In these examples the gender or number of a possessive pronoun is determined by a controller (controlling element) therefore only control rules, which are included into referential and structural control description 856, can determine values of these categories. Transforming a proform into a personal, reflexive or relative pronoun, or into an empty proform is also performed at this stage. It is done by means of assigning to the proform a corresponding relational meaning by the control rule.

The linear order is determined after detecting relational grammatical meanings because they may affect the linear order (for example, the type of a pronoun). At this stage the syntform 812 which has corresponding linear order description 816 is already known. A communicative form which realizes communicative semantemes for the syntform must be selected on the basis of communicative description 880, and the order of slots is synthesized. Communicative forms are searched in the order of their description. The first form which meets all the requirements and includes all slots is selected. If the search has been failed to select a suitable communicative form, a neutral order is synthesized.

The result of the stage 2260 is a fully defined (specified) surface (syntactic) structure 2204 of the sentence to be generated where for each constituent a lexical meaning of the core, surface slots and their fillers, and their linear order are specified according to syntactic description 502, referential and structural control description 856, communicative description 880, agreement rules 2246, among others. This stage 2260 and the previous lexical selection 2220 on the basis of rules 2224 of lexical selection and structure correction allow the system to get the surface (syntactic) structure 2204, which express the semantic meaning of the sentence to be generated in the given natural language as fully and precisely(exactly) as possible.

The morphological synthesis 2280 of the constituent cores is performed on the basis of the morphological description 501. The grammatical value of a constituent core is determined on the basis of the grammatical value of the constituent and the already-detected syntactic form. Each syntactic form may have a rule of agreement of the grammatical value of the constituent and the morphological value of the core. This agreement rule determines the morphological value of the core.

Prior to generating a word form with the help of the morphological description 501, a lexeme must be selected which corresponds to the selected grammatical value. It is necessary because each lexical meaning may be associated with a set of lexemes which encode, for example, different dialects or even separate word forms of the lexical meaning. For example, the lexical meaning "cow" in English may be associated not only with the lexeme "cow", but with "bull" and "calf", among others. The required lexeme may be selected according to the value of grammatical category "Gender", and additionally, according to the presence of semanteme "Baby". The morphological value of the core is synthesized according to morphological grammemes, for example, for the noun—according to the grammemes of the number, the case must be taken into account in English, for the verb—the grammemes of the number, person, tense, participle type, among others. As a result of process steps 2220, 2240, 2260 and 2280, a sentence in the output natural language may be generated according to the language-independent semantic structure. For the above mentioned example, according to one embodiment of the invention, the result of translating the following English sentence into Russian, "This boy is smart, he'll succeed in life." is the sentence, "Этот мальчик сообразителен, он преуспеет в жизни"

In some cases, errors and incorrect translations may be discovered and corrected automatically by the system. The errors and incorrect translations may arise if an incorrect lexical selection is made at the step of performing a precise syntactic analysis 540 or during a lexical selection at the step of synthesizing the output sentence 560 from the language-independent semantic structure. The reason for such errors may be that a selected lexical meaning with a higher rating may be inapplicable in the specific domain. Not all text may be marked by specific topic. For example, the most frequent lexical meaning for the word "file" is "folder or box for holding loose papers" or "collection of data, programs, etc., stored in a computer's memory", but it is absolutely improper in a text about "fitter's tools" or "locksmithing," where "file" means a tool with a roughened surface or surfaces, typically of steel, used for smoothing or shaping a hard material (" мальчик " in Russian). To correct such errors, the repeated translation of a fragment (e.g., a sentence, a paragraph, a page, a chapter, etc., or the whole text) may be implemented.

Such errors may be identified by the system automatically when analyzing information about lexical selections. The system may suppose a presence of an error in a certain case, when 1) a selected lexical class does not correspond to the topic of the text; or 2) a lot of words with the same lemma are present in the surrounding fragment, but another lexical (and semantic) class was selected for them. In other words, if there are a lot of "files" (as files for computer) in the text, there is no chance to meet something like "machinist's file" (=" мальчик ", fitter's tool in Russian).

During the first pass, information about the lexical selection is collected and stored: for each word of the source text, selected lexical classes (e.g., meanings), which are selected in the trees of precise analysis, are kept. When a precise analysis ends, the final selected lexical class may be stored.

If a precise analysis of a sentence is unsuccessful, the list of lexical variants for each word is kept, and then the list may be used for defining the topic of the text. After a first pass of analysis finishes, statistic data are processed. During this process, 1) new weights of pragmatic classes are calculated; 2) words which translation can change are detected; 3) bonuses to lexical classes for these words are calculated; and 4) a list of sentences that should be translated over again is made. After that, the sentences from the list are translated over again.

The method and process flow as described herein can be adapted into one or more computer-readable media or one or more algorithms in order to convert a natural-language sentence into its language-independent semantic structure and to convert a language-independent semantic structure into an output natural-language sentence. The computer-readable media or one or more algorithms may be adapted to perform a translation process which includes one or more the lexical-morphological analysis 520, the rough syntactic analysis 530, the precise syntactic analysis 540, and the semantic analysis 550, and the building 560 the output sentence.

The one or more computer-readable media or one or more algorithms of the invention can be implemented on one or more analyzers, devices, or computer systems, adapted to perform a single analysis or just a couple of the analyses as described herein and linked together afterward. The algorithm of obtaining the semantic structure is fairly complex, as there are ambiguities at each step, and from a multitude of parsing variants only the most probable one is selected, based on the ratings which take into account semantic, stylistic and pragmatic factors and statistical data. In turn, the algorithm of obtaining the natural-language sentence on the semantic structure is complex too, as there are, in turn, many ambiguities at each step, and from a multitude of hypotheses only the most probable one is selected, based on the ratings which take into account semantic, syntactic and pragmatic factors and statistical data. The computer-readable media or one or more algorithms may be adapted to perform lexical selection, building a surface structure, restoring movements and determining the linear order, and the morphological synthesis.

During each step shown in FIG. 5 the user of the computer system can view and, if necessary, select each of the interim and resulting structures. By performing the lexical, morphological and syntactic analyses of a sentence, a syntactic structure as a tree of generalized constituents can be established. The syntactic structure of a sentence is transformed into a semantic structure by semantic interpretation of language-specific elements of the syntactic structure of the sentence and a tree of surface constituents are transformed into a tree of deep constituents and a language-independent semantic structure is formed. During the building 560 of the output natural language sentence by performing the lexical selection on the semantic structure, building a surface structure of the sentence to be generated in the given natural language the syntactic structure as a tree of surface constituents can be build. On the syntactic structure of a sentence movements are restored and the linear order is determined, the morphological synthesis of the cores of constituents is performed to obtain the natural language sentence.

A computer system implemented as a computer program with its own interface or as part of another system in accordance with the method of the invention includes means for entering natural-language text; means for segmenting text into sentences, words, letters, and non-text symbols; means for lemmatization and finding for each source word form a complete set of its grammatical and lexical meanings; means for constructing, in accordance with the model of each lexical meaning, constituents which are the realizations of these models in a given sentence; means for constructing one or more generalized constituents from constituents constructed by using various models available for each lexical meaning of a source word form; means for building a graph of generalized constituents covering all the hypotheses about the possible syntactic structures of the sentence; means for calculating a rough rating of constituents which are included into generalized constituents; means for generating hypotheses about the most probable precise structure of the sentence based on the rough ratings and for selecting the structure with the highest value of the rating; means for calculating the precise ratings for the selected, most probable syntactic structure constituents which are included into generalized constituents; means for establishing non-tree links; means for establishing correspondences for each surface slot of each constituent in the tree of constituents with deep slots; means for calculating the set of semantemes of each constituent on the basis of the set of grammemes; means for substituting each lexical meaning in the semantic tree with its language-independent semantic class; means for storing in a database the constructed semantic structure for further use in other applications.

In the computer system, each element of the lexical structure is considered as a potential lexical core of the constituent. The means for constructing a constituent may include means for determining all the possible boundaries of the constituents; means for matching the surface models of possible lexical meanings with selected fragments of a given sentence; means for initializing the surface models of possible lexical meanings.

In addition, the means for constructing generalized constituents from constituents constructed by using various models use data about the deep and surface models of the lexical meanings stored in a lexical-semantic dictionary may include means for generalizing surface models; means for generalizing deep models; means for constructing generalized diatheses. The means for building a graph of generalized constituents may include a means for linking the constructed constituents to the surface slots of the parent constituents taking into account the linear word order.

Further, the means for calculating ratings for the selected syntactic structure of a constituent are based on individual ratings of the lexical meanings, ratings of each of the syntactic constructions (e.g., idioms, collocations, etc.) for each element of the sentence, and the degree of conformity of the selected syntactic construction to the semantic descriptions of the deep slots. The means for building a graph of generalized constituents includes means for filtering the constituent models being generalized.

The means for generating hypotheses about the most probable precise structure of the sentence may include means for generating syntactic trees; means for generating the non-tree links; means for verifying the most probable hypothesis by generating specific hypotheses about the structure of dependent constituents; means for choosing the best syntactic structure, i.e., for selecting the tree from the generalized graph. Further, the means for establishing non-tree links for coordination processing, ellipsis, and referential relationships and the means for substituting each lexical meaning in the semantic tree with its language-independent semantic class with registering distinctive semantic features of the lexical meanings.

Further, the computer system in accordance with the method of the invention includes means for storing and displaying a semantic structure; means for the lexical selection of lexical meaning of the specific language for each constituent core; means for correction of semantic structure in any specific natural language; means for selecting, in accordance with the model of each lexical meaning, surface slots and syntactic forms which realize the deep slots of the semantic structure in the given specific language; means for calculating the set of grammemes of each constituent on the basis of the set of semantemes; means for an alternative realization of the lexical meaning by an another semantic class; means for building the hypotheses about the possible syntactic structures of the sentence; means for calculating a rating of hypotheses about the possible syntactic structures of the sentence; means for selecting a structure with the highest rating value; means for restoring movements; means for determining precise values of relational grammatical categories; means for determining the linear order on the basis of the communicative description; means for the selecting the grammatical forms; means for the morphological synthesis; means for displaying the obtained natural language sentence and storing it in a database for further use in other applications.

The means for calculating ratings for the selected syntactic structure of a constituent are based on individual ratings of the lexical meanings, ratings of each of the syntactic constructions (e.g., idioms, collocations, etc.) for each element of the sentence, and the degree of conformity of the selected syntactic construction to the semantic descriptions of the deep slots.

The means for generating hypotheses about the most probable surface structure of the sentence may include means for selecting surface slots and syntax forms on the basis the set of semantemes to realize as many grammemes as possible; means for verifying the hypotheses according to morphological description; means for arranging and analyzing hypotheses in the order of descending rating; means for restoring movements. Also, the computer system can implement all the methods, steps, actions automatically.

Figure 25:
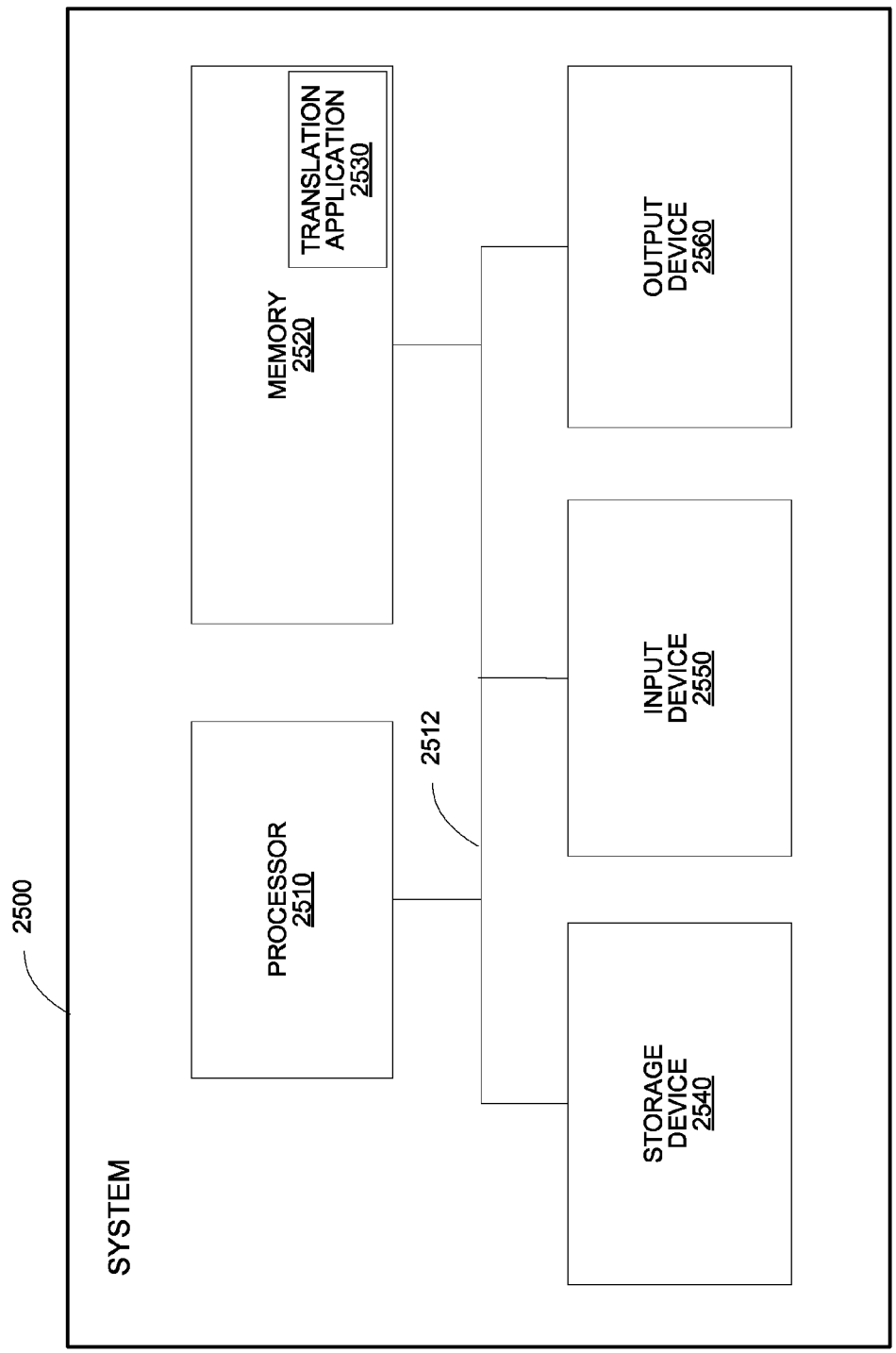
FIG. 25 is a block diagram of one illustrative embodiment of a computer system where a method of translating natural sentences can be implemented.

FIG. 25 illustrates an example of a suitable computing system environment on which the invention may be implemented. A system 2500 is provided and is only one example of a suitable computing environment and is not intended to suggest any limitation as to the scope of use or functionality of the invention. The computing environment or system 2500 should not be interpreted as having any dependency or requirement relating to any one or combination of components as illustrated herein.

The system 2500 may be a general purpose computing device in the form of a computer. Components of the system 2500 may include, but are not limited to, a processing unit, such as a processor 2510, a system memory 2520, and a system bus 2512 that couples various system components including the system memory 2520 to the processing unit 2510. The system bus 2512 may be any of several types of bus structures including a memory bus or memory controller, a peripheral bus, and a local bus using any of a variety of bus architectures.

The system 2500 may generally include a variety of computer readable media. Computer readable media can be any available media that can be accessed by the system 2500 and includes both volatile and nonvolatile media, removable and non-removable media. By way of example, and not limitation, computer readable media may comprise computer storage media (storage device) 2540 and communication media, such as an input device 2550 and an output device 2560.

The invention is operational with numerous other general purpose or special purpose computing system environments or configurations. Examples of well known computing systems, environments, and/or configurations that may be suitable for use with the invention include, but are not limited to, personal computers, server computers, mainframe computers, multiprocessor systems, hand-held or laptop devices, microprocessor-based systems, set top boxes, programmable consumer electronics, network PCs, minicomputers, distributed computing environments that include any of the above systems or devices, and the like.

The invention may be described in the general context of computer-executable instructions, such as program modules, being executed by a computer. Generally, program modules include routines, programs, objects, components, data structures, etc. The invention may also be practiced in distributed computing environments. In a distributed computing environment, program modules may be located in both local and remote computer storage media including memory storage devices. In one embodiment, various program applications, program modules, etc., such as a translation application 2530 are loaded into the memory 2520 and run by the processor 2510. The translation application may be adapted to perform the steps of the methods as described herein.

Figure 26:
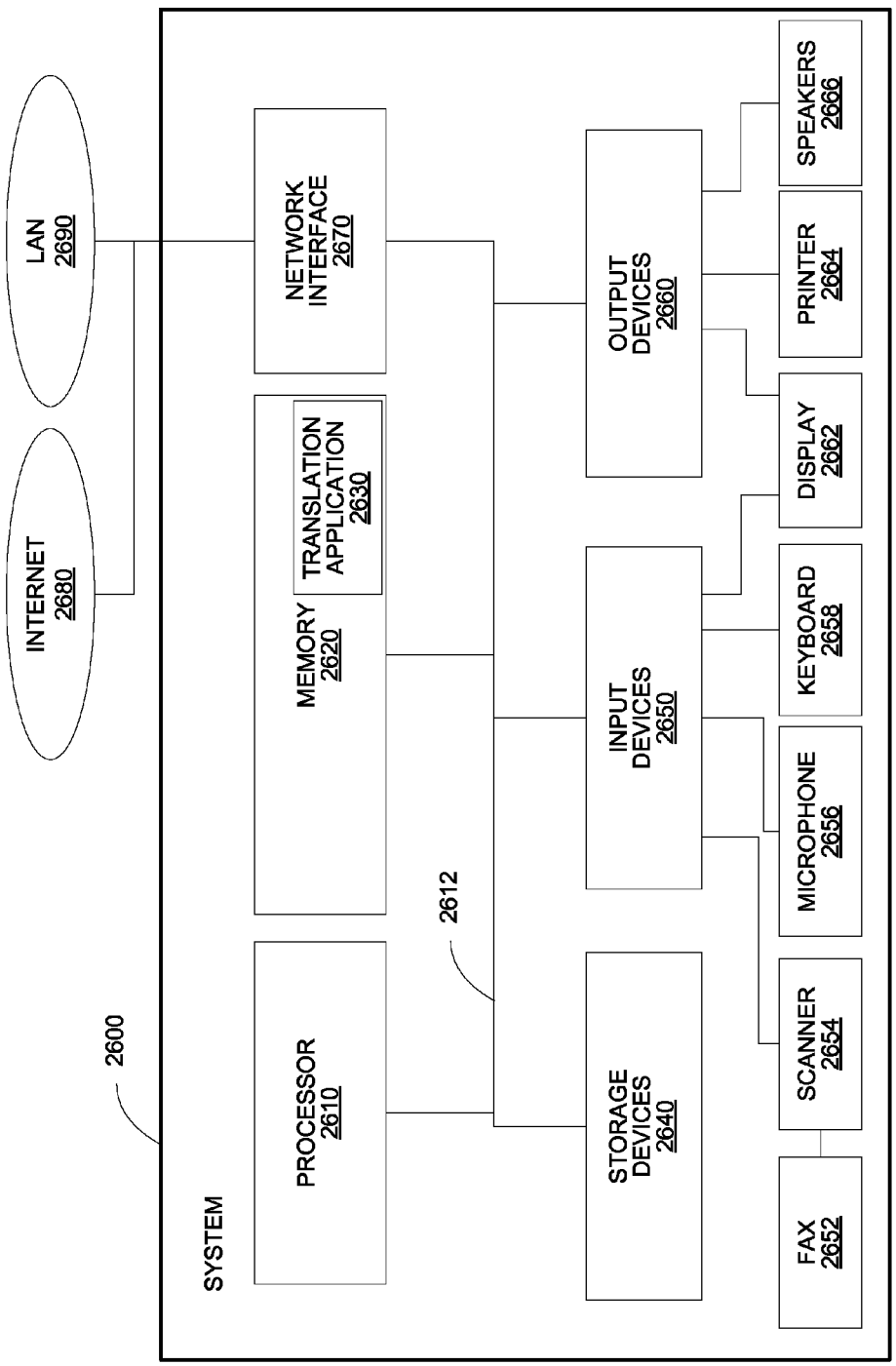
FIG. 26 is another block diagram illustrating a computer system in accordance with one embodiment of the invention.

FIG. 26 illustrates another example of a system 2600 in accordance with one embodiment of the invention. The system 2600 may include a processing unit, such as a processor 2610, a memory 2620 and a network interface 2670. The memory 2620 may include a translation application 2630 adapted to perform translation of a source sentence into an output sentence using methods as described herein according to one or more embodiments of the invention. The translation application 2630 may be, for example, a machine translation program for translating a sentence from an input language into an output language.

The memory 2620 may also include computer storage media in the form of volatile and/or nonvolatile memory such as read only memory (ROM) and random access memory (RAM). A basic input/output system (BIOS), containing the basic routines is typically stored in ROM. RAM typically contains data and/or program modules that are immediately accessible to and/or presently being operated on by the processor 2610. These data and/or program modules are located in the memory 2620 or is loaded into memory when a program is called upon. Then the program is started and executed by the processor 2610 under the control of an operating system. For example, RAM may contain the operating system, various application programs, such as the translation application 2630, other program modules, and program data.

The system 2600 further include storage devices 2640 and/or various computer storage media, including both volatile and nonvolatile, removable and non-removable storage media implemented in any method or technology for storage of information, such as computer readable instructions, data structures, program modules or other data. The storage device 2640 includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the system 2600. For example, the storage device 2640 may include a hard disk drive, a magnetic disk drive, an optical disk drive, etc. Any other removable/non-removable, volatile/nonvolatile computer storage media can be used in the exemplary operating environment.

Communication media typically embodies computer readable instructions, data structures, program modules or other data in a modulated data signal, such as a carrier wave or other transport mechanism and includes any information delivery media. By way of example, and not limitation, communication media may include wired media such as a wired network or direct-wired connection, and any wireless media. Combinations of any of the above should also be included within the scope of computer readable media.

A user may enter commands and information into the system 2600 through input devices 2650, such as a keyboard 2658, a microphone 2656, a scanner 2654 and a pointing device, such as a mouse, trackball or touch pad. Other input devices (not shown) may include a joystick, game pad, satellite dish, scanner, or the like.

These and other input devices are often connected to the processor 2610 through a user input interface that is coupled to the system bus 2612, but may be connected by other interface and bus structures, such as a parallel port, game port or a universal serial bus (USB). A monitor, a display 2662, or other type of display device is also connected to the system bus 2612 via an interface, such as a video interface. In addition to the display 2662, the system 2600 may also include other peripheral output devices, such as speakers 2666 and printers 2664, which may be connected through an output peripheral interface.

A source sentence to be translated by the translation application 2630 may be for example, entered from the keyboard 2658 and selected on the screen of the display 2662. As another example, a source sentence to be translated by the translation application 2630 may be received after being recognized from a graphical input (for example, being recognized as PDF, TIF, JPG, BMP, and other files) through optical character recognition (OCR) applications or after being sent by the fax 2652 and then scanned by the scanner 2654, etc. A microphone 2656 and a speech recognition system can also be used and adapted for machine translation.

The system 2600 may operate in a networked environment using logical connections to one or more remote computers. The remote computer may be a personal computer, a handheld device, a server, a router, a network PC, a peer device or other common network node, and typically includes many or all of the elements described above relative to the system 2600. The network connections depicted in FIG. 26 can include, for example, a local area network (LAN) 2690 or a wide area network (WAN), such as the Internet 2680. Such networking environments are commonplace in offices, enterprise-wide computer networks, intranets, and the Internet.

When used in a LAN networking environment, the system 2600 is connected to the LAN through a network interface 2670 or adapter. When used in a WAN networking environment, the system 2600 may additionally include a modem or other means for establishing communications over the WAN, such as the Internet. It will be appreciated that the network connections shown are exemplary and other means of establishing a communications link between the systems and computers may be used.

Figure 27:
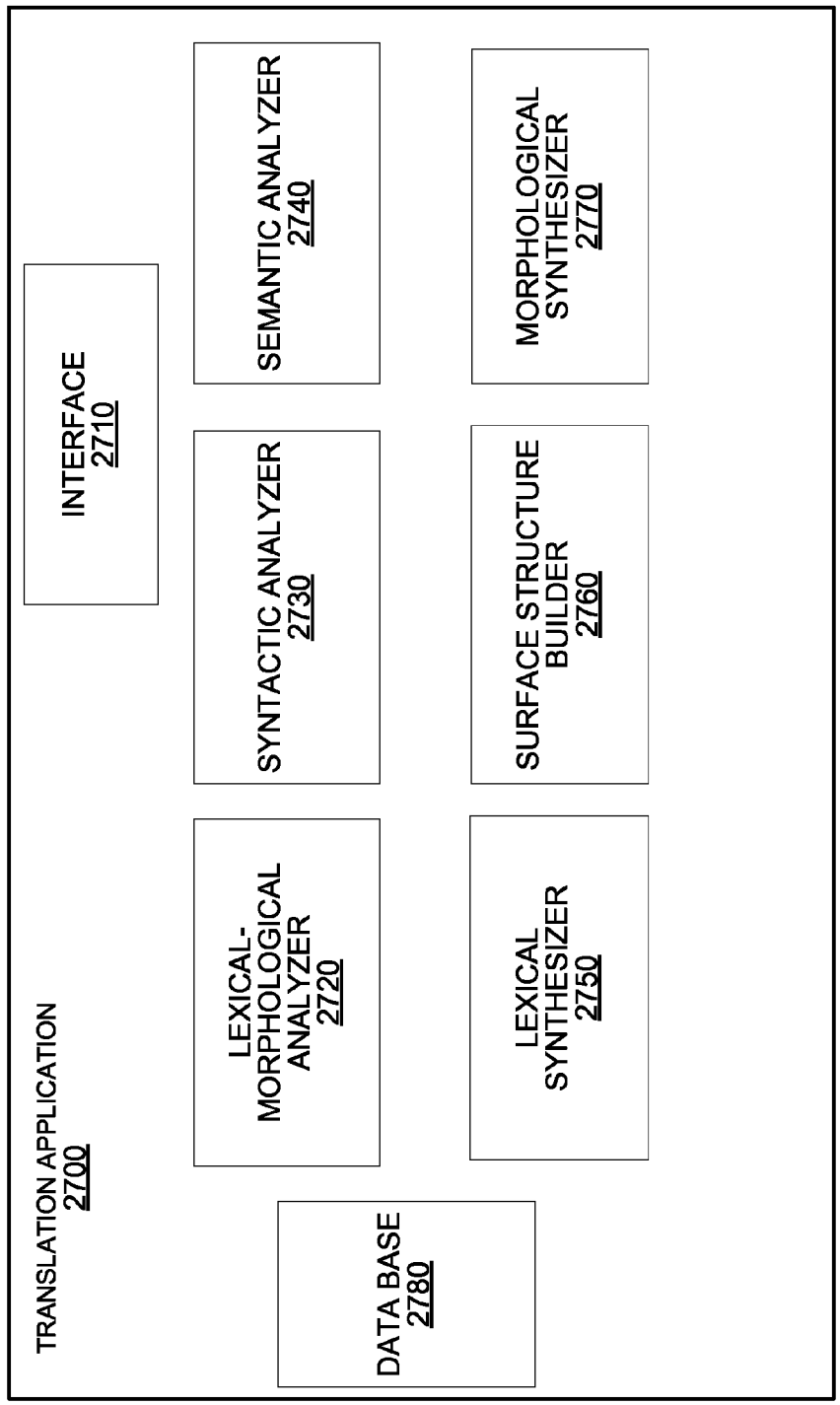
FIG. 27 is a block diagram of a machine translation system in accordance with one embodiment of the invention.

FIG. 27 illustrates another example of a translation application 2700, such as a machine translation program, in accordance with one embodiment of the invention. The translation application 2700 may include a lexical-morphological analyzer 2720 adapted to perform a lexical analysis and a lexical-morphological analysis on each element of the source sentence to generate a lexical-morphological structure of the source sentence, a syntactic analyzer 2730 adapted to perform a syntactic analysis on the lexical-morphological structure of the source sentence, and a semantic analyzer 2740 adapted to perform a semantic analysis on the source sentence and generate a language-independent semantic structure for the source sentence.

The translation application 2700 may also include a lexical synthesizer 2750 adapted to perform a lexical selection on the language-independent semantic structure of the source sentence using lexical descriptions and semantic descriptions in the output language, and a surface structure builder 2760 adapted to build a surface structure from the language-independent semantic structure using syntactic descriptions and lexical descriptions of the output language and construct the output sentence in the output language. The translation application 2700 further includes a morphological synthesizer 2770 adapted to perform a morphological synthesis on the surface structure using morphological descriptions of the output language and synthesize the output sentence. Additionally, the translation application 2700 may also include a user interface 2710 for input/output and a database 2780 for storing various linguistic descriptions and intermediate information, for example ratings, pragmatic information, semantic structures of previous sentences, etc.

Figure 28:
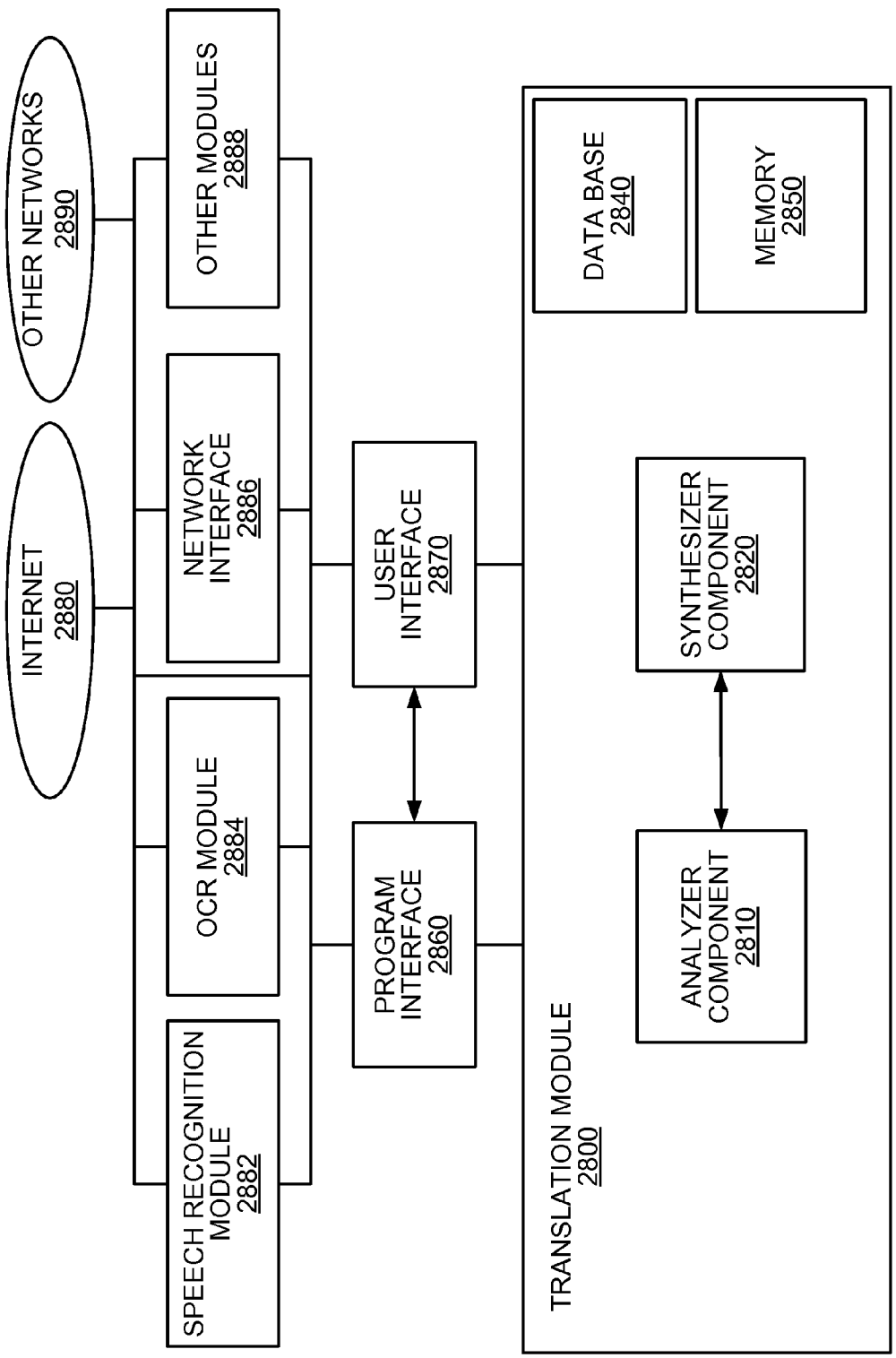
FIG. 28 is another block diagram of a machine translation system and its interaction with other applications in accordance with one embodiment of the invention.

FIG. 28 is another example of a translation module 2800 according to one embodiment of the invention. The translation module 2800 may include a analyzer component 2810 to translate a source sentence in an input language into a language-independent semantic structure and a synthesizer component 2820 to synthesize an output sentence in an output language from the language-independent semantic structure of the source sentence using various linguistic descriptions. The translation module 2800 may also interface with a program interface 2860 and a user interface 2870 to interact with other programs and a user, respectively. Additionally, the translation module 2800 may include a memory 2850 or/and a database 2840 for storing various intermediate information.

The translation module 2800 may interact via the program interface 2860 with other applications. For example, the translation module 2800 may receive a source sentence from a speech recognition application 2882 after converting the source sentence into a text after speech recognition. As another example, a source sentence may be received from an optical character recognition (OCR) application 2884 after converting an image of the source sentence into a text after optical recognition of the image. The program interface 2860, the user interface 2820, and the network interface 2886, etc., are used to provide communication between the translation module 2800 and its users via a LAN or WAN, such as the Internet.

A typological analysis for the invention was performed for various linguistic families, including Indo-European (Slavic, Germanic, and Romanic languages), Finno-Ugrian, Turkic, Oriental, and Semitic. Embodiments of the invention may be applied to many languages, including, but not limited to, English, French, German, Italian, Russian, Spanish, Ukrainian, Dutch, Danish, Swedish, Finnish, Portuguese, Slovak, Polish, Czech, Hungarian, Lithuanian, Latvian, Estonian, Greek, Bulgarian, Turkish, Tatar, Hindi, Serbian, Croatian, Romanian, Slovenian, Macedonian, Japanese, Korean, Chinese, Arabic, Hindi, Hebrew, Swahili, among others.

The invention extends the known art as it uses various natural language descriptions which can reflect all the complexities of a language, rather than simplified or artificial descriptions. As a result, one or more sentences in a given natural language are generated from a generalized data structure, such as a semantic structure.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

We claim:

1. A computer-implemented method of translating a source text in a source language into an output language, comprising:
   obtaining, using a processor, the source text in the source language from an input detected in a device;
   dividing, using a processor, the source text into sentences;
   translating, using a processor, each sentence of the source text, said translating comprising:
      executing a first syntactic analysis, said first syntactic analysis including
         generating a set of possible relationships between words of the respective sentence and building a graph of generalized constituents;
      executing a second syntactic analysis of each sentence, said second syntactic analysis comprising:
         putting forward at least one hypothesis related to a syntactic structure of the sentence, wherein the putting forward the at least one hypothesis comprises performing a lexical selection to select a first lexical meaning from a first lexical class for a node of a syntactic tree of the sentence from a set of possible lexical classes; and
         verifying the hypothesis about the syntactic structure of the sentence;
      generating a language-independent semantic structure of the sentence based at least in part on the verified hypothesis;
      generating a syntactic structure of an output sentence in the output language based at least in part on the generated language-independent semantic structure; and
      performing a morphological synthesis of the output sentence in the output language based at least in part on the generated syntactic structure of the output sentence;
   generating, using a processor, a text in the output language based on said translating of each of the sentences of the source text;
   detecting, using a processor, a translation error associated with incorrect lexical selection comprising
      comparing the first lexical class of the selected first lexical meaning to a topic of the source text; and
   repeating, using a processor, translation of the identified sentences with a second lexical meaning from a second lexical class, wherein the second lexical class is different from the first lexical class.

2. The method of claim 1, wherein verifying the hypothesis about the syntactic structure of the sentence further comprises performing a lexical disambiguation.

3. The method of claim 1, wherein performing a lexical selection comprises selecting a lexical model corresponding to the selected first lexical meaning.

4. The method of claim 3, wherein the lexical selection is performed on the basis of information about at least one of a style, genre, topic or field of the translated text in the output language.

5. The method of claim 1, wherein information about the lexical selection for each node of the syntactic tree is saved for possible use during other steps of translating the text from the source language into another language.

6. The method of claim 1, wherein performing the lexical selection is performed on a basis of rating for the first lexical meaning.

7. The method of claim 6, wherein the ratings are related to "a priori" ratings, statistical ratings, or "a priori" and statistical ratings.

8. The method of claim 6, wherein said rating for the first lexical meaning comprises ratings for the first lexical meaning according to a pragmatic class.

9. The method of claim 6, wherein an overall rating of the first lexical meaning is calculated based on a weighed sum of rating scores of the first lexical meaning regarding pragmatic classes, wherein said rating scores of the first lexical meaning are multiplied by current weights of respective pragmatic classes calculated for a corresponding portion of the translated text.

10. The method of claim 9, wherein the overall rating of the first lexical meaning is stored in a memory.

11. The method of claim 6, wherein information about the lexical selection and pragmatic characteristics of the first lexical meaning selected for a node of the syntactic tree of the sentence and its textual environment is processed and stored, wherein said information defines a pragmatic context.

12. The method of claim 1, wherein verifying the hypothesis about the syntactic structure of the sentence further comprises establishing possible non-tree links.

13. The method of claim 12, wherein the verifying the hypothesis about the syntactic structure of the sentence further comprises making another lexical selection when the establishing non-tree links is unsuccessful.

14. The method of claim 13, wherein the making another lexical selection further comprises:
   storing a list of lexical variants for each word;
   calculating new weights for pragmatic classes regarding respective translated text or text fragments;
   detecting words for which lexical selection can be changed;
   calculating bonuses to lexical classes for said words; and
   repeating the second syntactic analysis for each sentence.

15. A computer-implemented method for disambiguation during translating a source text from a source language into an output language, comprising:
   obtaining, using a processor, the source text in the source language from an input detected in a device;
   dividing, using a processor, the source text into sentences;
   translating, using a processor, each sentence of the source text, wherein translating comprises:
      generating a set of possible relationships between words in respective sentences;
      building a graph of generalized constituents for respective sentences;
      putting forward at least one hypothesis related to a syntactic structure of each sentence; and
      verifying the hypothesis about the syntactic structure of the sentence;
      generating a language-independent semantic structure of the source text;
      generating a syntactic structure of an output text in the output language, comprising:
         making a lexical selection to select a first lexical meaning from a first lexical class for a node of the semantic structure from a set of possible lexical classes; and
         performing a morphological synthesis of an output sentence in the output language;
   obtaining, using a processor, a text in the output language based on the output sentences obtained as result of said translating;
   identifying, using a processor, the output sentences that include one or more errors by comparing the first lexical class of the selected first lexical meaning to a topic of the source text;
   repeating, using a processor, translation of the identified sentences with a second lexical meaning from a second lexical class, wherein the second lexical class is different from the first lexical class.

16. The computer-implemented method of claim 15, wherein the input text includes text detected in a device or on a Web site.

17. The method of claim 15, wherein the identifying of the output sentences that include one or more errors is at least in part based on analysis of information about the lexical selection wherein the information comprises: information about words with a same lemma in a surrounding fragment or a lexical and semantic class selected for either the selected lexical class or the same lemma.

18. The method of claim 15, wherein repeating translation of identified sentences includes calculating new weights of pragmatic classes associated with the text in the output language or a fragment of the text in the output language.

19. One or more physical non-transitory computer accessible media encoded with instructions for performing a method, the method comprising:
   obtaining, using a processor, a source text in a source language from an input detected in a device;
   dividing, using a processor, the source text into sentences;
   translating, using a processor, each sentence of the source text, said translating comprising:
      executing a first syntactic analysis, said first syntactic analysis including generating a set of possible relationships between words of the respective sentence and building a graph of generalized constituents;
      executing a second syntactic analysis of each sentence, said second syntactic analysis comprising:
         putting forward at least one hypothesis related to a syntactic structure of the sentence, wherein the putting forward the at least one hypothesis comprises performing a lexical selection to select a first lexical meaning from a first lexical class for a node of a syntactic tree of the sentence from a set of possible lexical classes; and
         verifying the hypothesis about the syntactic structure of the sentence;
      generating a language-independent semantic structure of the sentence based at least in part on the verified hypothesis;
      generating a syntactic structure of an output sentence in an output language based at least in part on the generated language-independent semantic structure; and
      performing a morphological synthesis of the output sentence in the output language based at least in part on the generated syntactic structure of the output sentence;
   generating, using a processor, a text in the output language based on said translating of each of the sentences of the source text;
   detecting, using a processor, a translation error associated with incorrect lexical selection comprising
      comparing the first lexical class of the selected first lexical meaning to a topic of the source text; and
   repeating, using a processor, translation of the identified sentences with a second lexical meaning from a second lexical class, wherein the second lexical class is different from the first lexical class.

20. A computer-implemented method of translating a source text in a source language into an output language, comprising:
   obtaining, using a processor, the source text in the source language from an input detected in a device;
   dividing, using a processor, the source text into sentences;
   translating, using a processor, each sentence of the source text, said translating comprising:
      executing a first syntactic analysis, said first syntactic analysis including generating a set of possible relationships between words of the respective sentence and building a graph of generalized constituents;
      executing a second syntactic analysis of each sentence, said second syntactic analysis comprising:
         putting forward at least one hypothesis related to a syntactic structure of the sentence, wherein the putting forward the at least one hypothesis comprises performing a lexical selection to select a first lexical meaning from a first lexical class for a node of a syntactic tree of the sentence from a set of possible lexical classes; and
         verifying the hypothesis about the syntactic structure of the sentence;
      generating a language-independent semantic structure of the sentence based at least in part on the verified hypothesis;
      generating a syntactic structure of an output sentence in the output language based at least in part on the generated language-independent semantic structure; and performing a morphological synthesis of the output sentence in the output language based at least in part on the generated syntactic structure of the output sentence;

generating, using a processor, a text in the output language based on said translating of each of the sentences of the source text;

detecting, using a processor, a translation error associated with incorrect lexical selection comprising comparing the first lexical class of the selected first lexical meaning to a lexical class of another word with the same lemma as a word corresponding to the node; and repeating, using a processor, translation of the identified sentences with a second lexical meaning from a second lexical class, wherein the second lexical class is different from the first lexical class.

\* \* \* \* \*